United States Patent
Uchida et al.

(10) Patent No.: US 10,147,556 B2
(45) Date of Patent: Dec. 4, 2018

(54) POWER STORAGE DEVICE AND ELECTRONIC DEVICE

(71) Applicant: SEMICONDUCTOR ENERGY LABORATORY CO., LTD., Atsugi-shi, Kanagawa-ken (JP)

(72) Inventors: Aya Uchida, Kanagawa (JP); Teppei Oguni, Kanagawa (JP); Rie Yokoi, Kanagawa (JP); Jun Ishikawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 116 days.

(21) Appl. No.: 14/659,651

(22) Filed: Mar. 17, 2015

(65) Prior Publication Data
US 2015/0279577 A1    Oct. 1, 2015

(30) Foreign Application Priority Data

Mar. 31, 2014 (JP) .................. 2014-073556

(51) Int. Cl.
*H01G 11/24* (2013.01)
*H01G 11/28* (2013.01)
(Continued)

(52) U.S. Cl.
CPC ............ *H01G 11/62* (2013.01); *H01G 11/06* (2013.01); *H01G 11/60* (2013.01); *H01M 10/052* (2013.01); *H01M 10/0569* (2013.01); *H01G 11/28* (2013.01); *H01G 11/52* (2013.01); *H01M 2300/0045* (2013.01); *Y02E 60/13* (2013.01)

(58) Field of Classification Search
None
See application file for complete search history.

(56) References Cited

U.S. PATENT DOCUMENTS 8,404,387 B2   3/2013   Takami et al.
8,728,669 B2   5/2014   Takami et al.
(Continued)

FOREIGN PATENT DOCUMENTS

CN    101373847 A    2/2009
CN    102696085 A    9/2012
(Continued)

OTHER PUBLICATIONS

English translation of JP 2008305574 (2008).*
(Continued)

*Primary Examiner* — Yoshitoshi Takeuchi
(74) *Attorney, Agent, or Firm* — Nixon Peabody LLP; Jeffrey L. Costellia

(57) ABSTRACT

A power storage device with high capacity, a power storage device with high energy density, a highly reliable power storage device, and a long-life power storage device are provided. The power storage device includes a positive electrode, a separator, a negative electrode, and an electrolytic solution. The electrolytic solution contains an alkali metal salt and an ionic liquid. The separator is located between the positive electrode and the negative electrode. At least part of the positive electrode overlaps with the negative electrode. At least part of an end portion of the negative electrode is located inside a region between end portions of the positive electrode.

16 Claims, 58 Drawing Sheets

(51) Int. Cl.
*H01G 11/26* (2013.01)
*H01M 2/08* (2006.01)
*H01M 2/22* (2006.01)
*H01M 2/24* (2006.01)
*H01M 2/26* (2006.01)
*H01M 4/64* (2006.01)
*H01G 11/62* (2013.01)
*H01M 10/0569* (2010.01)
*H01G 11/06* (2013.01)
*H01G 11/60* (2013.01)
*H01M 10/052* (2010.01)
*H01G 11/52* (2013.01)

(56) References Cited

U.S. PATENT DOCUMENTS

| | | |
|---|---|---|
| 8,795,544 B2 | 8/2014 | Ito et al. |
| 8,951,664 B2 | 2/2015 | Ito et al. |
| 2006/0068272 A1* | 3/2006 | Takami ............. B60L 3/0046 429/62 |
| 2007/0099079 A1 | 5/2007 | Matsumoto et al. |
| 2007/0196732 A1* | 8/2007 | Tatebayashi ........ B60L 11/123 429/181 |
| 2009/0029249 A1* | 1/2009 | Takami ............. H01M 4/366 429/188 |
| 2010/0221607 A1* | 9/2010 | Hatanaka .......... H01M 2/1673 429/209 |
| 2012/0255858 A1 | 10/2012 | Maeshima et al. |
| 2012/0328960 A1 | 12/2012 | Ito et al. |
| 2013/0164609 A1 | 6/2013 | Ito et al. |
| 2013/0164610 A1 | 6/2013 | Itakura et al. |
| 2013/0288112 A1 | 10/2013 | Ito et al. |
| 2013/0323567 A1 | 12/2013 | Saki et al. |
| 2014/0099529 A1 | 4/2014 | Ishikawa et al. |
| 2014/0099558 A1 | 4/2014 | Itakura et al. |
| 2014/0212769 A1 | 7/2014 | Takami et al. |
| 2014/0377644 A1 | 12/2014 | Ishikawai et al. |
| 2015/0021698 A1 | 1/2015 | Ando et al. |
| 2015/0086860 A1 | 3/2015 | Yokoi et al. |
| 2015/0140449 A1 | 5/2015 | Ishikawa et al. |

FOREIGN PATENT DOCUMENTS

| | | | |
|---|---|---|---|
| CN | 103384937 A | 11/2013 | |
| CN | 105531815 A | 4/2016 | |
| EP | 2518744 A | 10/2012 | |
| JP | 2003-331918 A | 11/2003 | |
| JP | 2007087875 | * 4/2007 | ............ H01M 10/05 |
| JP | 2008-305574 A | 12/2008 | |
| JP | 2008305574 | * 12/2008 | .......... H01M 10/052 |
| JP | 2009-021134 A | 1/2009 | |
| JP | 2011-129794 A | 6/2011 | |
| JP | 2015-060714 A | 3/2015 | |
| KR | 2009-0006797 A | 1/2009 | |
| WO | WO-2005/063773 | 7/2005 | |
| WO | WO-2011/077663 | 6/2011 | |
| WO | WO-2015/007143 | 1/2015 | |
| WO | WO-2015/041096 | 3/2015 | |
| WO | WO-2015/076099 | 5/2015 | |

OTHER PUBLICATIONS

English translation of JP2007087875 (2007).*
International Search Report (Application No. PCT/IB2015/051927) dated Jul. 7, 2015.
Written Opinion (Application No. PCT/IB2015/051927) dated Jul. 7, 2015.
Matsumoto.H et al., "Fast cycling of Li/LiCoO2 cell with low-viscosity ionic liquids based on bis(fluorosulfonyl)imide [FSI]", Journal of Power Sources, Mar. 22, 2006, vol. 160, No. 2, pp. 1308-1313.
Shimizu.M et al., "Effect of Cation Structure of Ionic Liquids on Anode Properties of Si Electrodes for LIB", J. Electrochem. SOC. (Journal of the Electrochemical Society), 2014, vol. 161, No. 12, pp. A1765-A1771.
Chinese Office Action (Application No. 201580016644.2) dated Aug. 2, 2018.

* cited by examiner

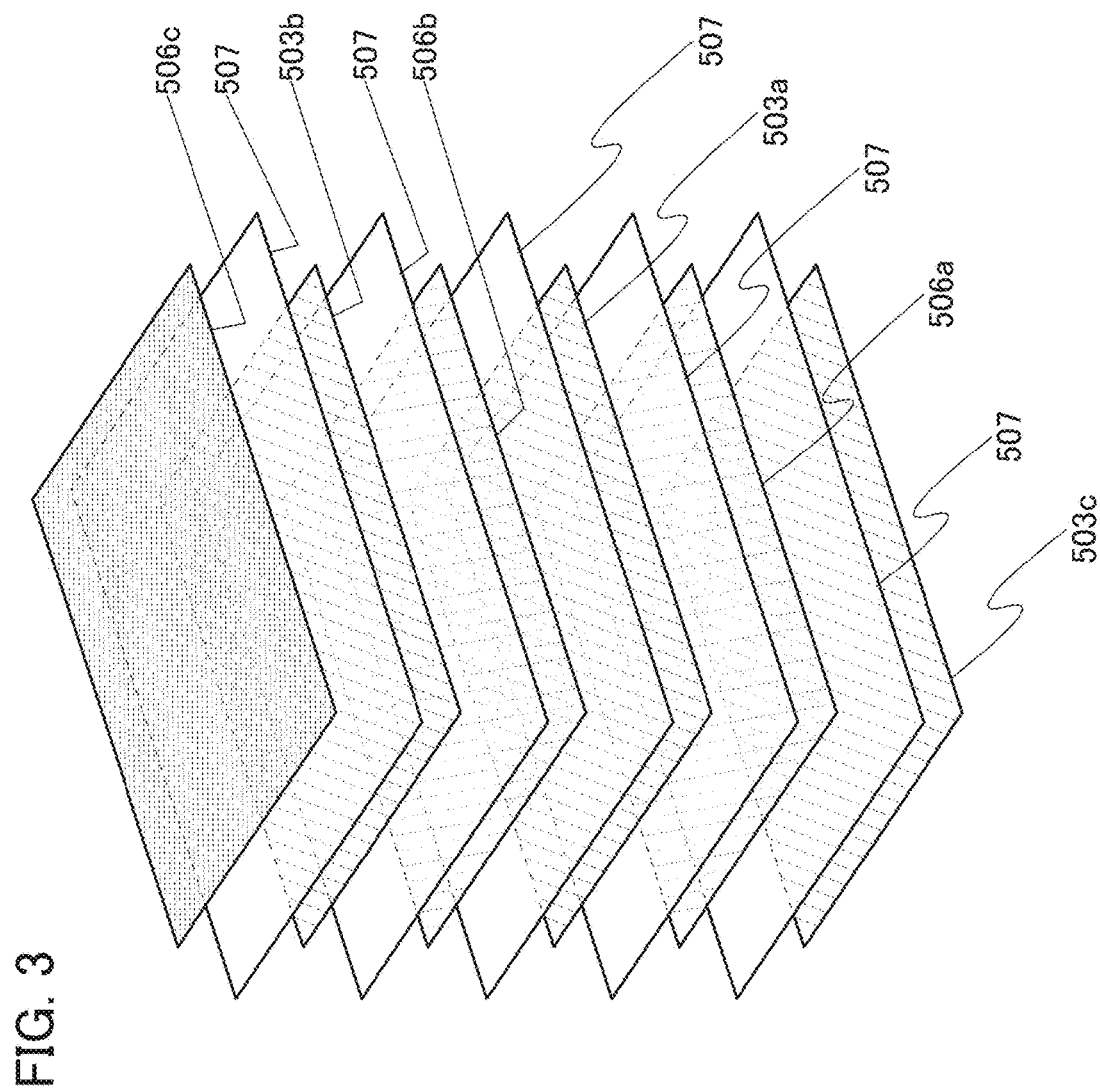

506a

FIG. 17A
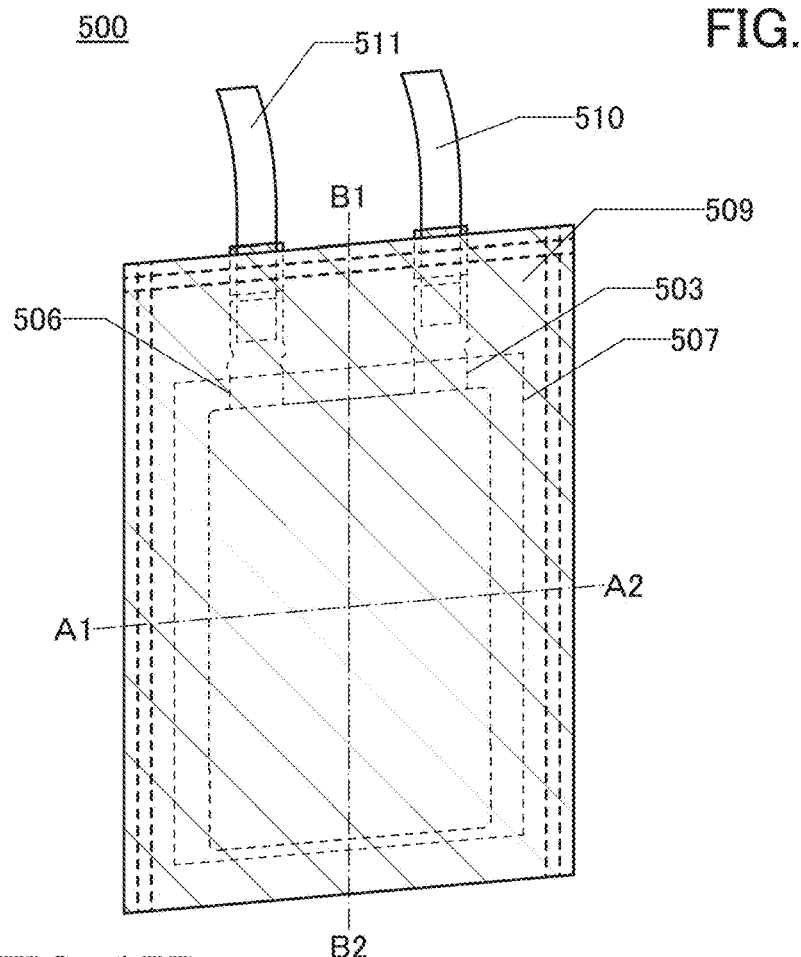
FIG. 17B
FIG. 17C
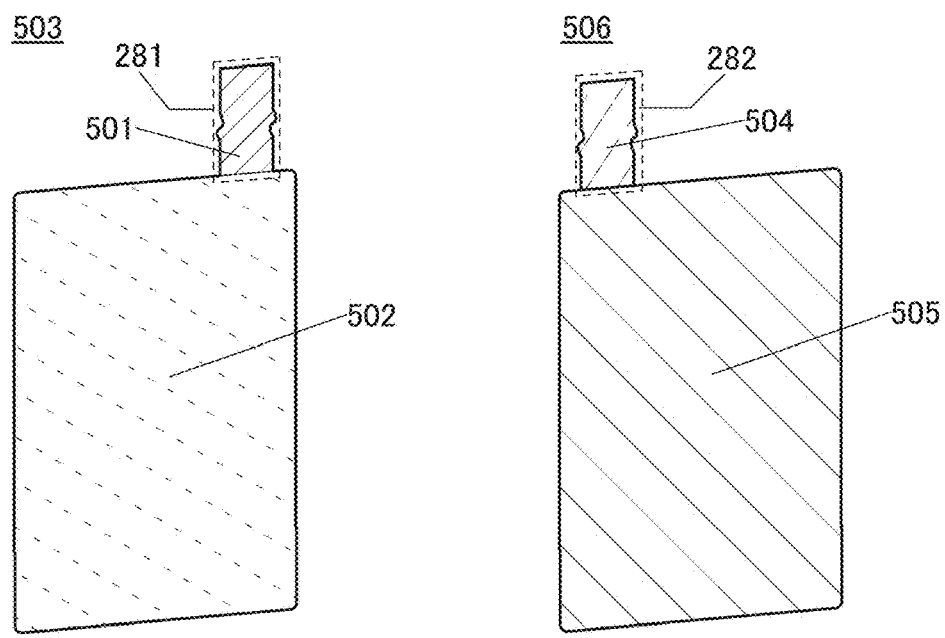

FIG. 29

<S21>
mix graphene oxide and solvent (mixture 1)

<S22>
add active material to mixture 1 and mix (kneading) (mixture 2)

<S23>
add PVdF to mixture 2 and mix (mixture 3)

<S24>
add solvent to mixture 3 and mix

FIG. 31

<S51>
1st charge
CC: 0.01C, 3.2V cut-off

<S52>
open exterior body and remove gas

<S53>
reseal

<S54>
2nd charge
CC: 0.05C, 4V cut-off

<S55>
discharge
CC: 0.2C, 2V cut-off

<S56>
charge-discharge
charge [CC: 0.2C, 4V cut-off]
discharge [CC: 0.2C, 2V cut-off]

<S57>
charge-discharge
charge [CC: 0.2C, 4V cut-off]
discharge [CC: 0.2C, 2V cut-off]

$LiFePO_4 \rightarrow FePO_4 + Li^+ + e^-$     $xC + Li^+ + e^- \rightarrow LiC_x$ $x \geqq 6$ $FePO_4 + Li^+ + e^- \rightarrow LiFePO_4$     $LiC_x \rightarrow xC + Li^+ + e^-$ $x \geqq 6$ FIG. 53A1 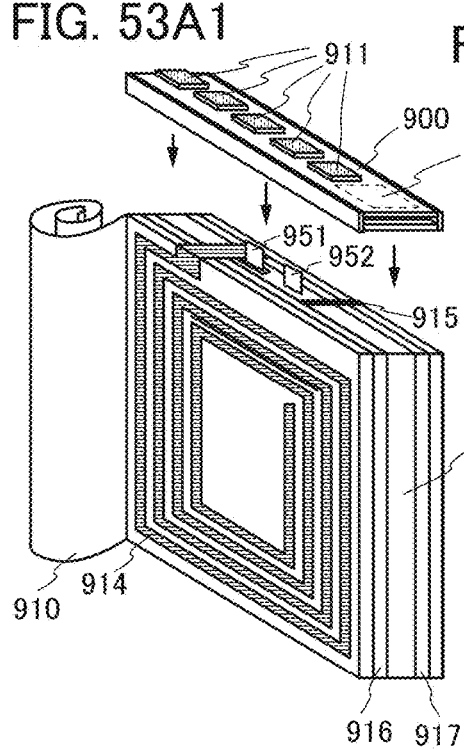
FIG. 53A2 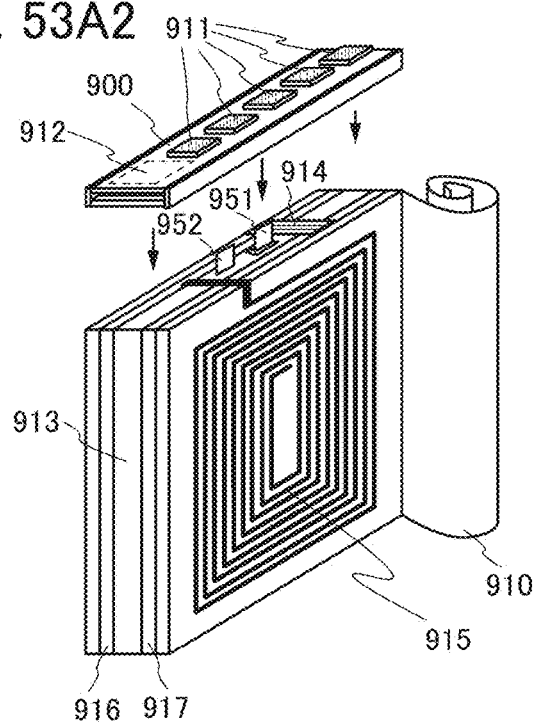
FIG. 53B1 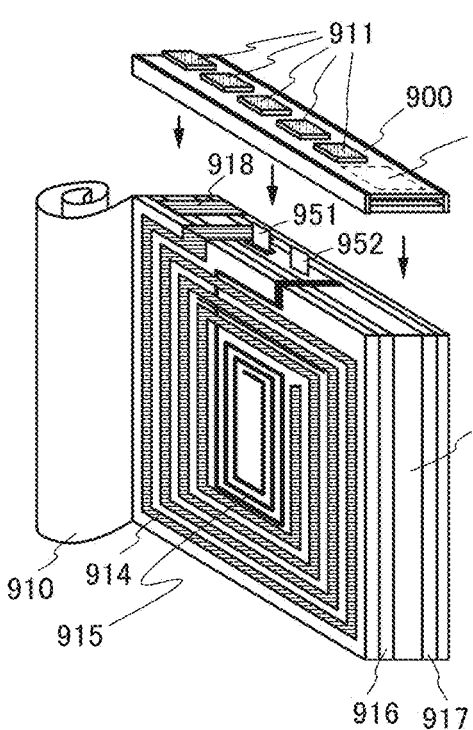
FIG. 53B2 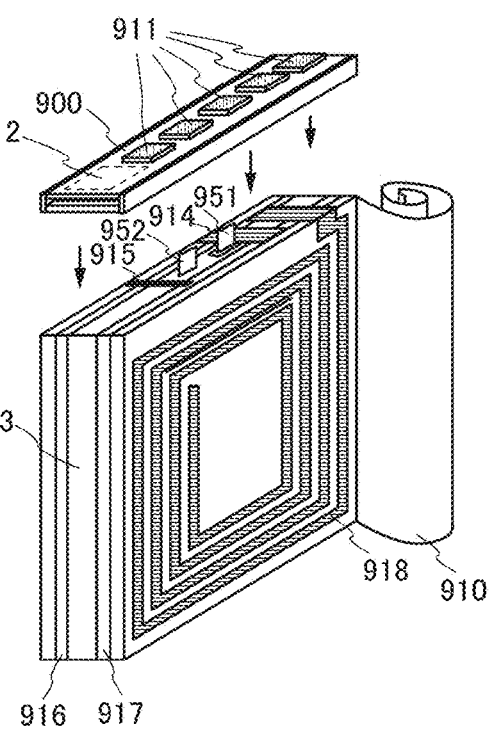

8400

8101

8021  8022  8500

POWER STORAGE DEVICE AND ELECTRONIC DEVICE

TECHNICAL FIELD

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a power storage device and a manufacturing method thereof.

Note that a power storage device in this specification refers to every element and/or device having a function of storing electric power. For example, a storage battery such as a lithium-ion secondary battery, a lithium-ion capacitor, and an electric double layer capacitor are included in the category of the power storage device.

BACKGROUND ART

In recent years, a variety of power storage devices, for example, secondary batteries such as lithium-ion secondary batteries, lithium-ion capacitors, and air cells have been actively developed. In particular, demand for lithium-ion secondary batteries with high output and high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

For the power storage devices, high capacity, high performance, safety in various operating environments, and the like are required.

To satisfy the above requirements, electrolytic solutions for power storage devices are under active development. Cyclic carbonates are used as organic solvents in electrolytic solutions for power storage devices. In particular, ethylene carbonate is often used because of its high dielectric constant and high ionic conductivity.

However, not only ethylene carbonate but also many other organic solvents have volatility and flammability. For this reason, in the case of using an organic solvent for an electrolytic solution for a power storage device, the temperature inside the power storage device might rise due to a short circuit, overcharge, or the like and the power storage device might burst or catch fire.

In view of the above, the use of an ionic liquid (also referred to as a room temperature molten salt) having non-flammability and non-volatility as a nonaqueous solvent for a nonaqueous electrolyte of a lithium-ion secondary battery has been proposed. Examples of such an ionic liquid include an ionic liquid containing an ethylmethylimidazolium (EMI) cation, an ionic liquid containing an N-methyl-N-propylpyrrolidinium (P13) cation, and an ionic liquid containing an N-methyl-N-propylpiperidinium (PP13) cation (see Patent Document 1).

Improvements have been made to an anion component and a cation component of an ionic liquid to provide a lithium-ion secondary battery that uses the ionic liquid with low viscosity, a low melting point, and high conductivity (see Patent Document 2).

REFERENCE

[Patent Document 1] Japanese Published Patent Application No. 2003-331918
[Patent Document 2] PCT International Publication No. WO2005/063773

DISCLOSURE OF INVENTION

An object of one embodiment of the present invention is to provide a power storage device with high capacity. Another object of one embodiment of the present invention is to provide a power storage device with high energy density. Another object of one embodiment of the present invention is to provide a highly reliable power storage device. Another object of one embodiment of the present invention is to provide a long-life power storage device.

Another object of one embodiment of the present invention is to provide a power storage device with reduced irreversible capacity. Another object of one embodiment of the present invention is to provide a power storage device in which the decomposition reaction of an electrolytic solution is inhibited and a decrease in capacity with the increasing number of charge and discharge cycles is prevented. Another object of one embodiment of the present invention is to reduce or inhibit the decomposition reaction of an electrolytic solution, which speeds up at high temperature and prevent a decrease in charge and discharge capacity by charge and discharge at high temperature, in order to extend the operating temperature range of a power storage device.

Another object of one embodiment of the present invention is to increase an yield of a power storage device. Another object of one embodiment of the present invention is to provide a novel power storage device, a novel electrode, or the like.

Note that the description of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a power storage device including a positive electrode, a separator, a negative electrode, and an electrolytic solution. The electrolytic solution contains an alkali metal salt and an ionic liquid. The separator is located between the positive electrode and the negative electrode. At least part of the positive electrode overlaps with the negative electrode. At least part of an end portion of the negative electrode is located inside a region between end portions of the positive electrode.

Another embodiment of the present invention is a power storage device including a positive electrode, a separator, a negative electrode, and an electrolytic solution. The electrolytic solution contains an alkali metal salt and an ionic liquid. The separator is located between the positive electrode and the negative electrode. At least part of the positive electrode overlaps with the negative electrode. The negative electrode has a smaller width than the positive electrode.

Another embodiment of the present invention is a power storage device including a positive electrode, a separator, a negative electrode, and an electrolytic solution. The electrolytic solution contains an alkali metal salt and an ionic liquid. The separator is located between the positive electrode and the negative electrode. At least part of the positive electrode overlaps with the negative electrode. The power storage device includes a portion where the distance between an end portion of the negative electrode and an end portion of the positive electrode is smaller than or equal to 0.5 mm.

Another embodiment of the present invention is a power storage device including a positive electrode, a separator, a negative electrode, and an electrolytic solution. The electrolytic solution contains an alkali metal salt and an ionic liquid. The separator is located between the positive electrode and the negative electrode. At least part of the positive electrode overlaps with the negative electrode. The area of the positive electrode is 98% or more of that of the negative electrode.

In the above structure, the area of a portion where the positive electrode and the negative electrode overlap with each other is preferably 90% or more of the area of the positive electrode.

Another embodiment of the present invention is a power storage device including a positive electrode, a separator, a negative electrode, and an electrolytic solution. The electrolytic solution contains an alkali metal salt and an ionic liquid. The separator is located between the positive electrode and the negative electrode. The positive electrode includes a positive electrode active material layer and a positive electrode current collector. The negative electrode includes a negative electrode active material layer and a negative electrode current collector. The negative electrode active material layer faces the positive electrode active material layer with the separator therebetween. At least part of an end portion of the negative electrode active material layer is located inside a region between end portions of the positive electrode active material layer.

In the above structure, the negative electrode includes a first region and a second region. The first region includes the negative electrode active material layer that is in contact with at least one surface of the negative electrode current collector. The second region includes a first layer that is in contact with the at least one surface of the current collector. The first layer is preferably thinner than the negative electrode active material layer and preferably has a higher resistance than the negative electrode active material layer. Furthermore, in the above structure, the first layer preferably contains one or more selected from polystyrene, poly(methyl acrylate), poly(methyl methacrylate), sodium polyacrylate, polyvinyl alcohol, polyethylene oxide, polypropylene oxide, polyimide, polyvinyl chloride, polytetrafluoroethylene, polyethylene, polypropylene, isobutylene, polyethylene terephthalate, nylon, polyvinylidene fluoride, polyacrylonitrile, styrene-butadiene rubber, styrene-isoprene-styrene rubber, acrylonitrile-butadiene rubber, butadiene rubber, ethylene-propylene-diene copolymer, carboxymethyl cellulose, methyl cellulose, ethyl cellulose, hydroxypropyl cellulose, diacetyl cellulose, regenerated cellulose, and starch.

Furthermore, in the above structure, the ionic liquid preferably contains a cation having a heteroaromatic ring.

Furthermore, in the above structure, the ionic liquid preferably contains an imidazolium cation.

Another embodiment of the present invention is an electronic device including the above-described power storage device.

Another embodiment of the present invention is an electronic device including the above-described power storage device and a display device.

According to one embodiment of the present invention, a power storage device with high capacity can be provided. According to another embodiment of the present invention, a power storage device with high energy density can be provided. According to one embodiment of the present invention, a highly reliable power storage device can be provided. According to one embodiment of the present invention, a power storage device with a long lifetime can be provided.

One embodiment of the present invention can provide a power storage device with reduced irreversible capacity. One embodiment of the present invention can provide a power storage device in which a decomposition reaction of an electrolytic solution is inhibited and a decrease in capacity with the increasing number of charge and discharge cycles is prevented. One embodiment of the present invention makes it possible to reduce or inhibit the decomposition reaction of an electrolytic solution, which speeds up at high temperature, and to prevent a decrease in charge and discharge capacity in charge and discharge at high temperature, in order to extend the operating temperature range of a power storage device.

According to one embodiment of the present invention, an yield of a power storage device can be increased. According to one embodiment of the present invention, a novel power storage device, a novel electrode, or the like can be provided.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF DRAWINGS

In the accompanying drawings:

FIG. 3 illustrates electrodes and separators that are stacked;

FIGS. 17A to 17C illustrate appearances of a thin storage battery and electrodes;

FIG. 29 shows a method for fabricating an electrode;

FIG. 31 shows a method for evaluating a storage battery;

FIGS. 53A1, 53A2, 53B1, and 53B2 each illustrate an example of a power storage system;

BEST MODE FOR CARRYING OUT THE INVENTION

Figure 1:
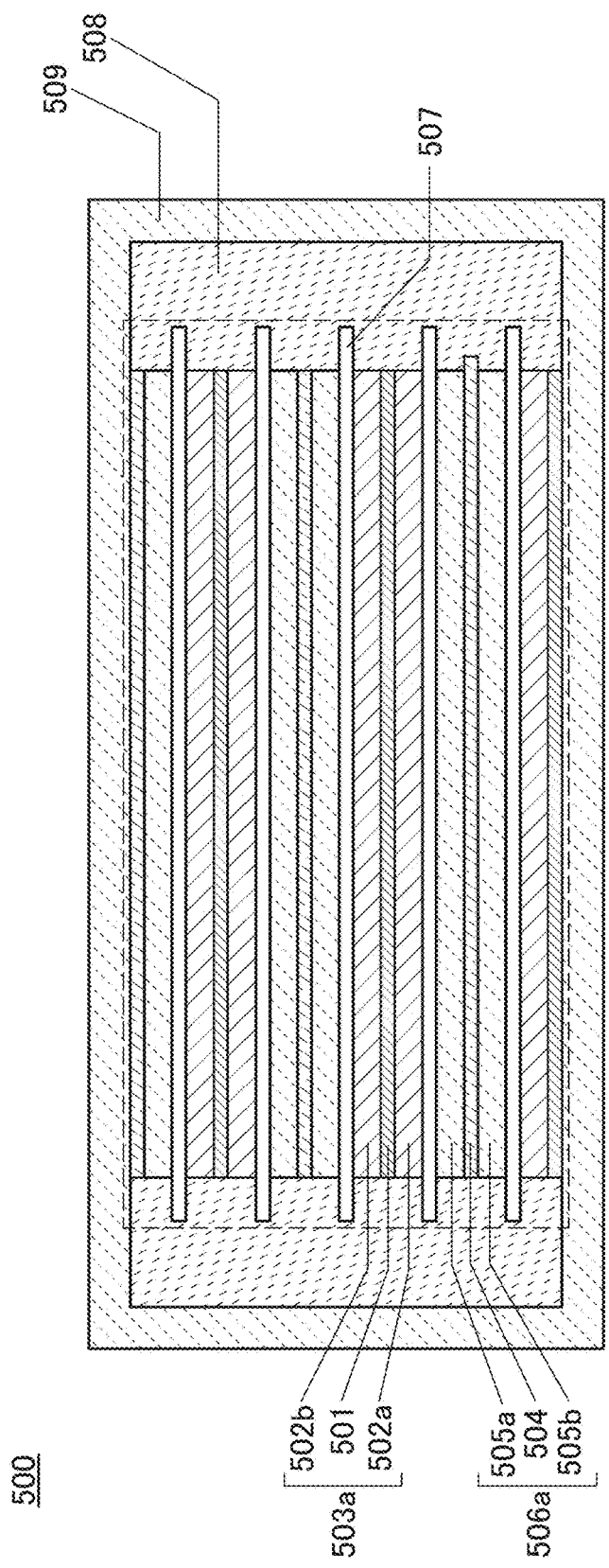
FIG. 1 is a cross-sectional view of a power storage device.

Hereinafter, embodiments and examples of the present invention will be described in detail with reference to the accompanying drawings. However, the present invention is not limited to the description of the embodiments and examples and it is easily understood by those skilled in the art that the mode and details can be changed variously. Accordingly, the present invention should not be interpreted as being limited to the description of the embodiments below.

Note that in drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as a power storage device electrode; in this case, the power storage device electrode refers to at least one of the positive electrode and the negative electrode for the power storage device.

Here, a charge rate and a discharge rate will be described. For example, in the case of charging a secondary battery with a certain capacity X [Ah] at a constant current, a charge rate of 1 C means the current value I [A] with which charging is terminated in exactly 1 h, and a charge rate of 0.2 C means I/5 [A] (i.e., the current value with which charging is terminated in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h).

(Embodiment 1)

In this embodiment, an example of the structure of a power storage device of one embodiment of the present invention will be described.

[Structure of Power Storage Device]

Figure 2:
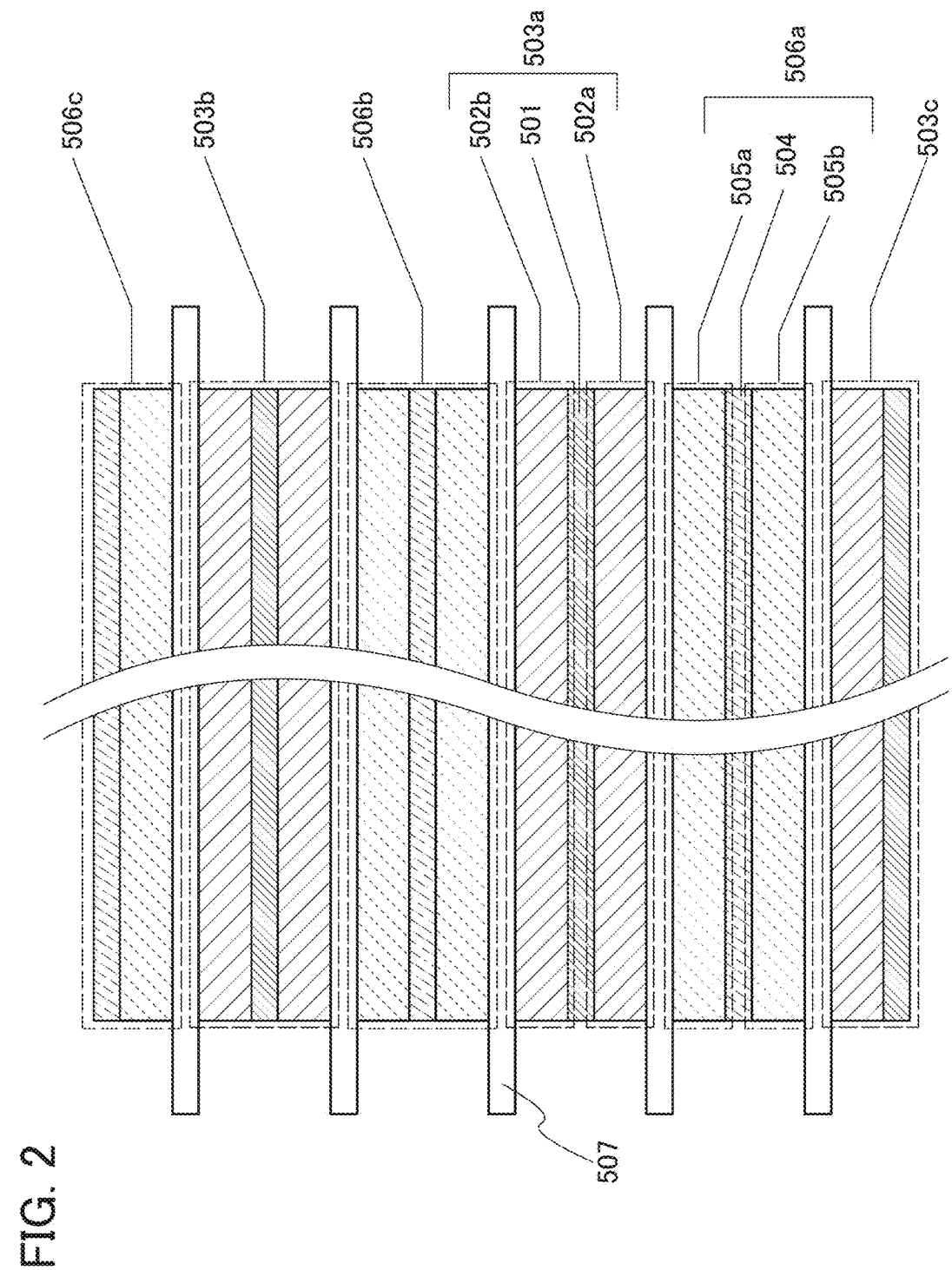
FIG. 2 is a cross-sectional view of a part of a power storage device.

Here, an example of the power storage device of one embodiment of the present invention will be described with reference to FIG. 1. FIG. 1 illustrates an example of a cross-sectional view of a power storage device 500. The power storage device 500 in FIG. 1 includes one or more positive electrodes, one or more negative electrodes, one or more separators 507 each sandwiched between the positive electrode and the negative electrode, an electrolytic solution 508, and an exterior body 509. The electrolytic solution 508 is contained in the exterior body 509. FIG. 2 is an enlarged view of a region surrounded by a broken line in FIG. 1 and is an enlarged cross-sectional view illustrating the positive electrodes, the negative electrodes, and the separators in the power storage device 500. The power storage device 500 includes positive electrodes 503a to 503c. Each positive electrode includes a positive electrode current collector and a positive electrode active material layer. The positive electrode 503a includes a positive electrode current collector 501, a positive electrode active material layer 502a, and a second positive electrode active material layer 502b. The power storage device 500 includes negative electrodes 506a to 506c. Each negative electrode includes a negative electrode current collector and a negative electrode active material layer. The negative electrode 506a includes a negative electrode current collector 504, a negative electrode active material layer 505a, and a second negative electrode active material layer 505b. The positive electrode active material layer 502a and the negative electrode active material layer 505a face each other with the separator 507 therebetween.

An active material refers only to a material that relates to insertion and extraction of ions that are carriers. In this specification and the like, a material that is actually an "active material" and materials for a conductive additive, a binder, and the like are collectively referred to as an active material layer.

A perspective view in FIG. 3 illustrates the state where the positive electrodes and the negative electrodes in the power storage device 500 are alternately stacked and separated by the separators. Although there are spaces between the positive electrode and the separator and between the separator and the negative electrode in FIG. 3 for easy understanding, they may be in contact with each other.

Here, the relation between the positive electrode and the negative electrode in the power storage device 500 in terms of the sizes and positions will be described. The areas of the positive electrode and the negative electrode in the power storage device 500 are preferably substantially equal.

For example, the areas of the positive electrode and the negative electrode that face each other with the separator therebetween are preferably substantially equal. In FIG. 2, the areas of the positive electrode 503a and the negative electrode 506a are substantially equal, in which case a region where the negative electrode does not overlap with the positive electrode can be reduced (or ideally, eliminated) and the irreversible capacity of the power storage device can be decreased.

Alternatively, the areas of the positive electrode active material layer and the negative electrode active material layer that face each other with the separator therebetween are preferably substantially equal. In FIG. 2, the areas of the positive electrode active material layer 502a and the negative electrode active material layer 505a are substantially equal.

For example, in the case where the positive electrode and the negative electrode have terminal portions, the area of a region of the positive electrode except the terminal portion may be substantially equal to the area of a region of the negative electrode except the terminal portion.

Furthermore, for example, end portions of the positive electrode 503a and the negative electrode 506a are preferably substantially aligned with each other as illustrated in the example in FIG. 2. Alternatively, end portions of the positive electrode active material layer 502a and the negative electrode active material layer 505a are preferably substantially aligned with each other.

Figure 4A:
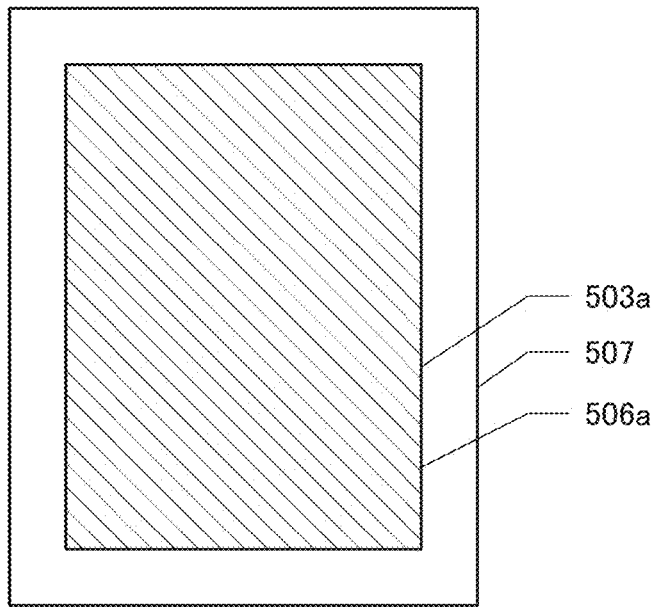
FIGS. 4A to 4C are top views illustrating electrodes and separators.
Figure 4B:
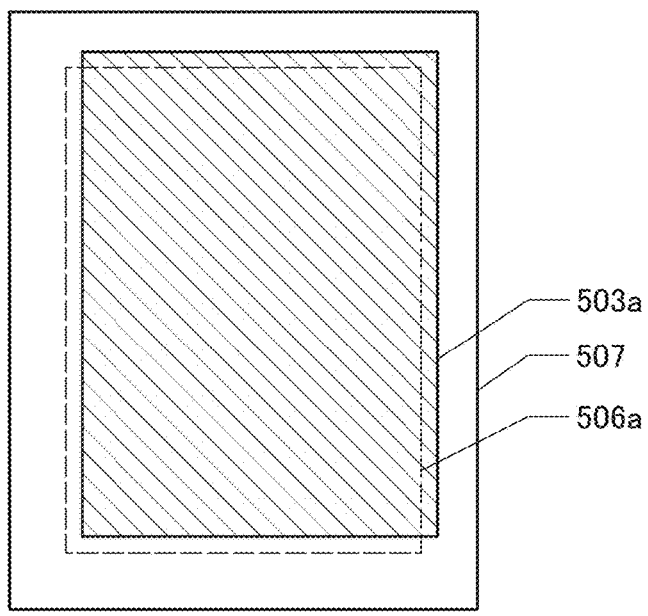

FIGS. 4A and 4B are top views each illustrating the negative electrode 506a, the separator 507 between the negative electrode 506a and the positive electrode 503a, and the positive electrode 503a. FIG. 4A illustrates the case where the areas of the positive electrode 503a and the negative electrode 506a are substantially equal and end portions of the positive electrode 503a and the negative electrode 506a are substantially aligned with each other. The term "end portion" in this specification refers to that seen in a plan view or a top view as in FIG. 4A, for example.

Figure 4C:
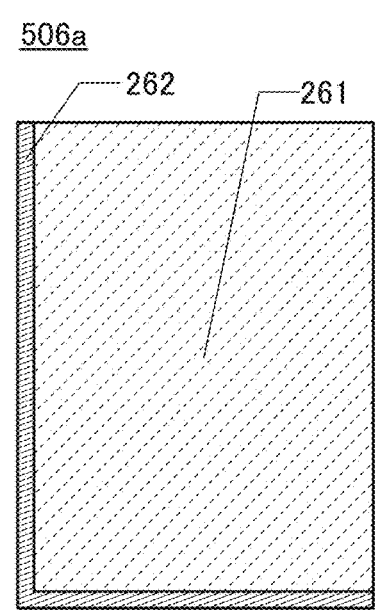

There may be the case where the areas of the positive electrode 503a and the negative electrode 506a are substantially equal and the end portions of the positive electrode 503a and the negative electrode 506a are partly or entirely misaligned, as illustrated in FIG. 4B. Here, FIG. 4C is a top view illustrating the negative electrode 506a in FIG. 4B in more detail. In FIG. 4C, the negative electrode active material layer 505a in the negative electrode 506a includes a region 261 overlapping with the positive electrode active material layer 502a and/or the positive electrode current collector 501 with the separator 507 therebetween, and a region 262 overlapping with neither the positive electrode active material layer 502a nor the positive electrode current collector 501. In this case, the area of the region 262 is preferably as small as possible. Furthermore, the distance between the end portion of the positive electrode 503a and the end portion of the negative electrode 506a is preferably as small as possible. Here, the distance between the end portion of the positive electrode 503a and the end portion of the negative electrode 506a is preferably, for example, 0.5 mm or less, more preferably 0.2 mm or less, still more preferably 0.1 mm or less. Alternatively, the difference between the widths or lengths of the positive electrode 503a and the negative electrode 506a is preferably 1 mm or less, more preferably 0.4 mm or less, still more preferably 0.2 mm or less.

Figure 5:
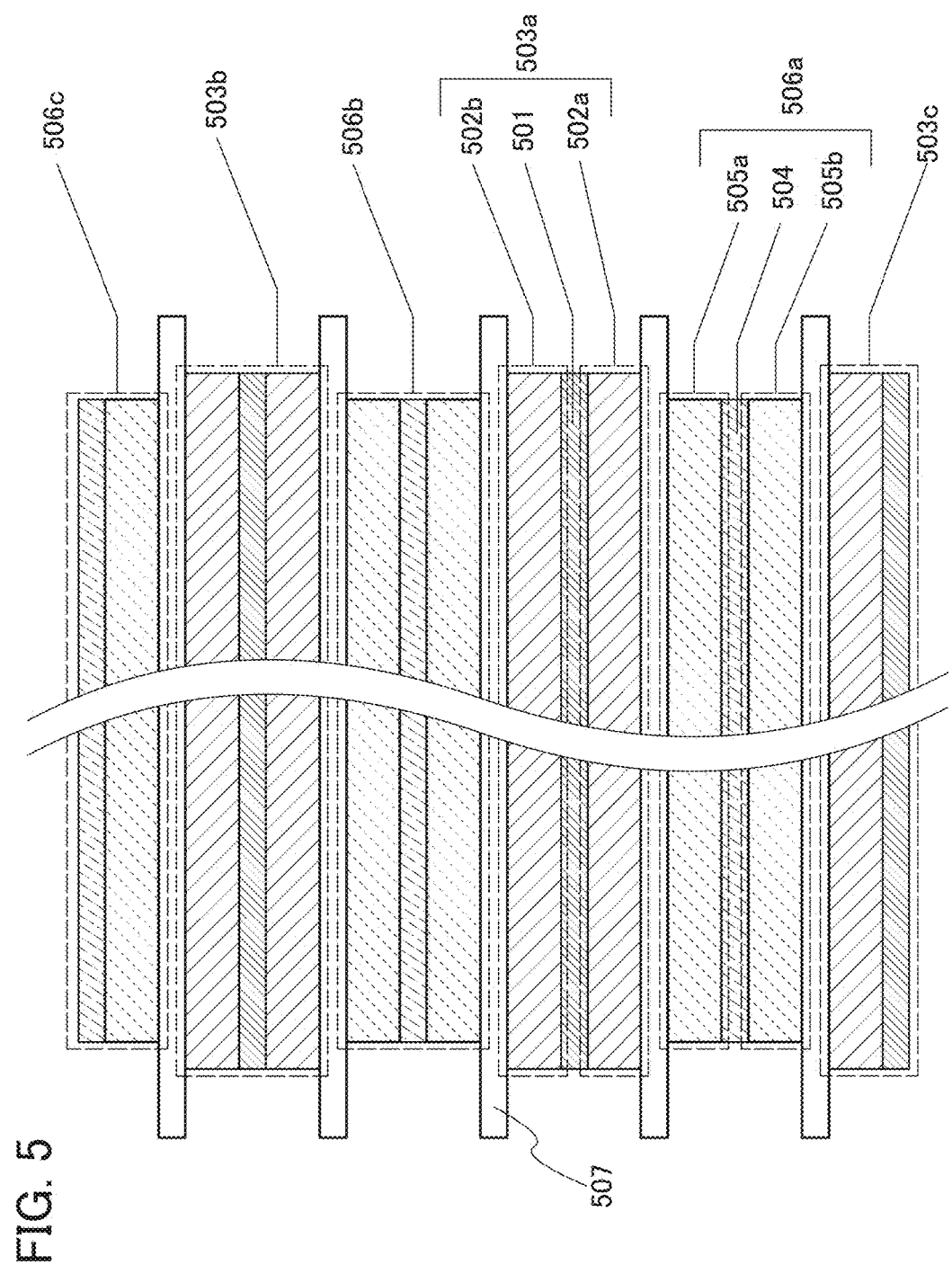
FIG. 5 is a cross-sectional view illustrating a part of a power storage device.
Figure 6:
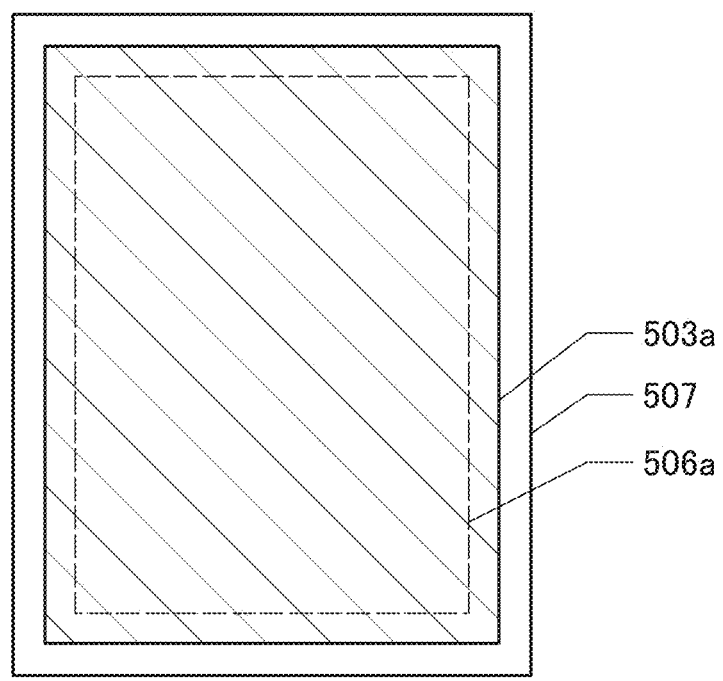
FIG. 6 is a top view illustrating electrodes and a separator.

Alternatively, the end portion of the negative electrode is preferably inside a region between the end portions of the positive electrode. Furthermore, the positive electrode active material layer and the negative electrode active material layer face each other with the separator therebetween, and the end portion of the negative electrode active material layer is preferably inside a region between the end portions of the positive electrode active material layer. FIG. 5 is an enlarged view of part of a cross section of the power storage device 500. For example, as illustrated in FIG. 5, the end portion of the negative electrode 506a is preferably inside a region between the end portions of the positive electrode 503a. FIG. 6 is a top view illustrating the negative electrode 506a, the separator 507 between the negative electrode 506a and the positive electrode 503a, and the positive electrode 503a in FIG. 5.

Since the end portion of the negative electrode 506a is located inside a region between the end portions of the positive electrode 503a, the negative electrode 506a can entirely overlap with the positive electrode 503a. Alternatively, the area of a region where the negative electrode 506a and the positive electrode 503a do not overlap with each other can be reduced. When the area of the positive electrode 503a is excessively larger than that of the negative electrode 506a, an excess portion of the positive electrode 503a increases, which decreases the capacity per unit volume of the power storage device 500. Thus, in the case where the end portion of the negative electrode 506a is inside a region between the end portions of the positive electrode 503a, the distance between the end portion of the positive electrode 503a and the end portion of the negative electrode 506a is preferably, for example, 3 mm or less, more preferably 0.5 mm or less, still more preferably 0.1 mm or less. Alternatively, the difference between the widths or lengths of the positive electrode 503a and the negative electrode 506a is preferably 6 mm or less, more preferably 1 mm or less, still more preferably 0.2 mm or less.

Figure 7:
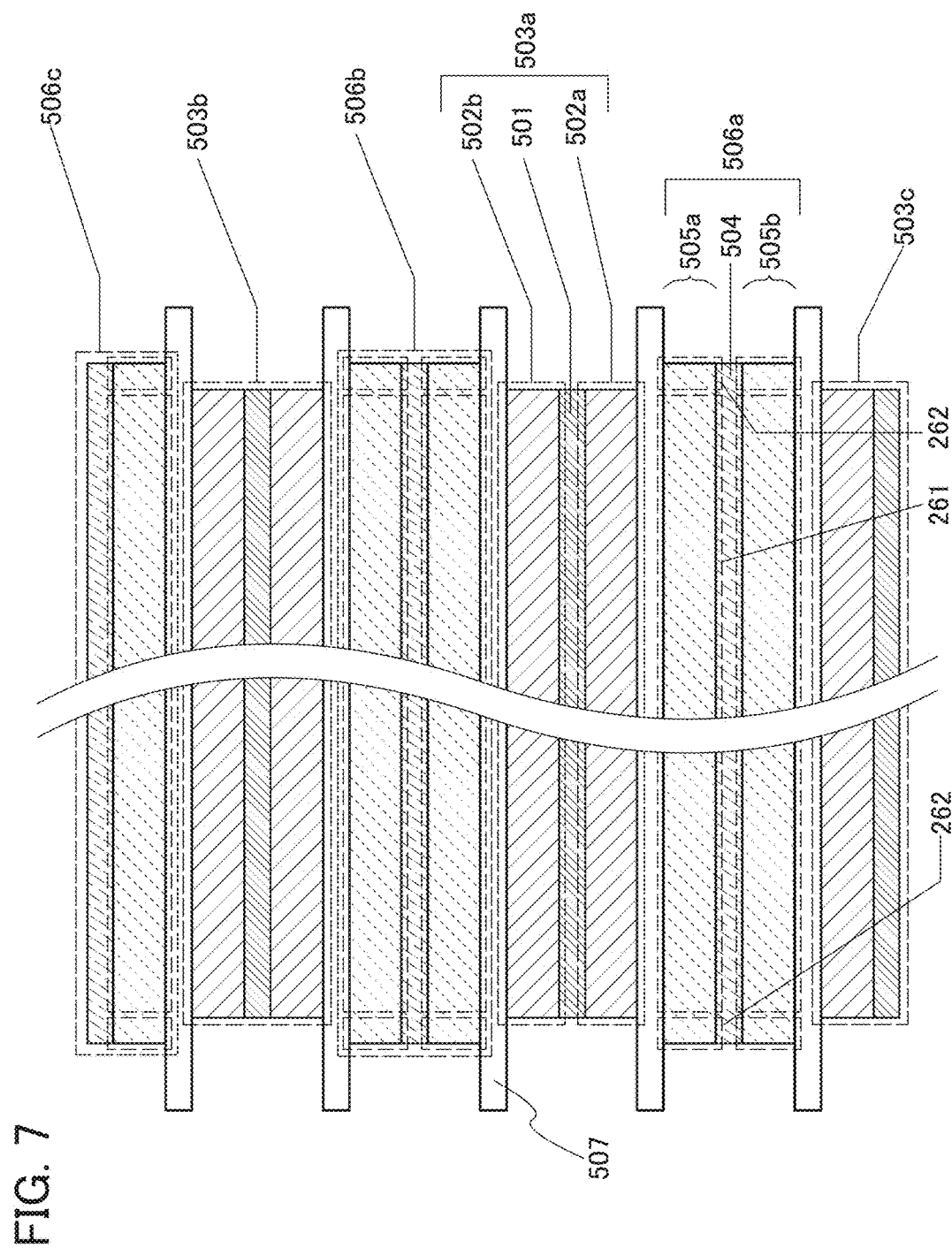
FIG. 7 is a cross-sectional view illustrating a part of a power storage device.
Figure 8A:
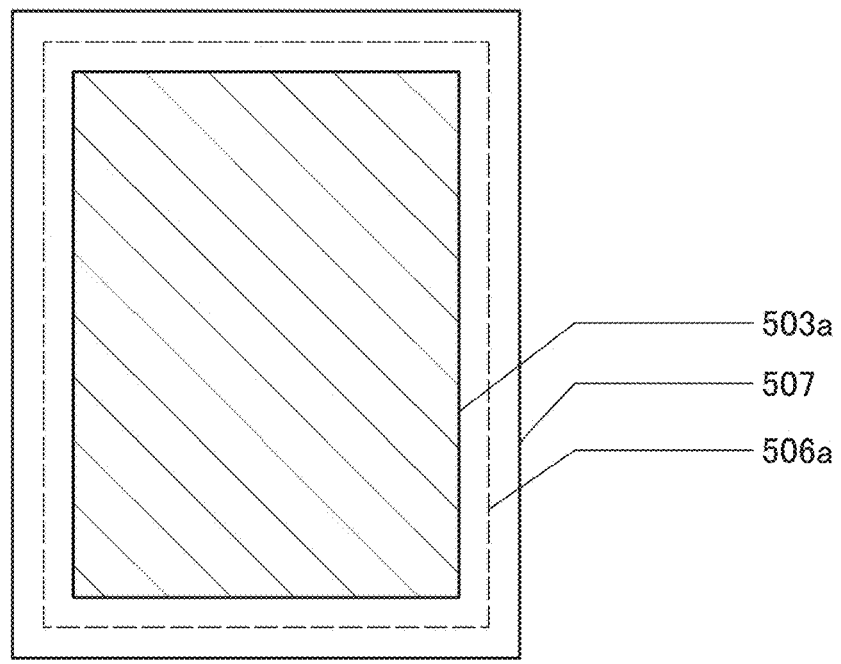
FIGS. 8A and 8B are top views illustrating electrodes and a separator.
Figure 8B:
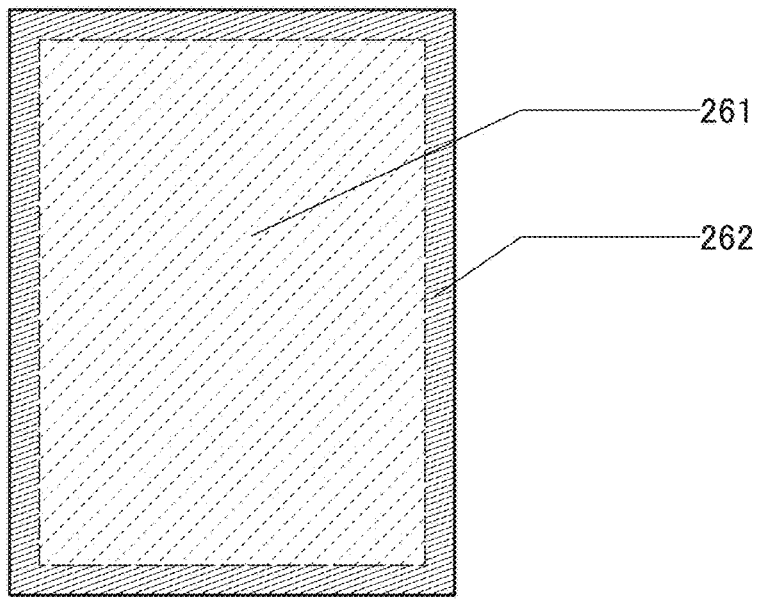

Meanwhile, FIG. 7 illustrates an example of the case where the end portion of the negative electrode extends beyond the end portion of the positive electrode. Here, FIG. 7 illustrates an enlarged part of a cross section of the power storage device 500. In FIG. 7, the negative electrode active material layer 505a in the negative electrode 506a includes the region 261 overlapping with the positive electrode 503a and the region 262 that is adjacent to the region 261 and extends beyond the end portion of the positive electrode 503a. FIG. 8A is a top view illustrating the negative electrode 506a, the separator 507 between the negative electrode 506a and the positive electrode 503a, and the positive electrode 503a in FIG. 7. FIG. 8B is a top view illustrating the negative electrode 506a in FIG. 7.

In the region 261 illustrated in FIG. 7 and FIG. 8B, the negative electrode 506a overlaps with the positive electrode active material layer 502a with the separator 507 therebetween. Alternatively, the region 261 may include a portion where the negative electrode 506a overlaps with only the positive electrode current collector 501 with the separator therebetween without overlapping with the positive electrode active material layer 502a; however, the negative electrode 506a preferably overlaps with the positive electrode active material layer 502a. In the region 262, the negative electrode 506a overlaps with neither the positive electrode active material layer 502a nor the positive electrode current collector 501.

Here, the area of the region 262 is preferably as small as possible. Alternatively, the distance between the end portion of the positive electrode 503a and the end portion of the negative electrode 506a is preferably as small as possible in FIG. 7 and FIGS. 8A and 8B. The distance between the end portion of the positive electrode 503a and the end portion of the negative electrode 506a is preferably, for example, 0.01 mm to 0.5 mm inclusive, more preferably 0.01 mm to 0.2 mm inclusive, still more preferably 0.01 mm to 0.1 mm inclusive. Alternatively, the difference between the widths or lengths of the positive electrode 503a and the negative electrode 506a is preferably 0.02 mm to 1 mm inclusive, more preferably 0.02 mm to 0.4 mm inclusive, still more preferably 0.02 mm to 0.2 mm inclusive.

Here, the case where the area of the region 262 is extremely small means, for example, the case where the end portion of the positive electrode 503a overlaps with the end portion of the negative electrode 506a as illustrated in FIG. 2 and FIG. 4A or the case where the end portion of the positive electrode 503 extends beyond the end portion of the negative electrode 506 as illustrated in FIGS. 5 and 6.

Here, a reaction that occurs in the power storage device 500 in the case where the negative electrode 506a of the power storage device 500 includes a region not overlapping with the positive electrode 503a will be described with reference to FIG. 7 and FIGS. 8A and 8B. In the region 262, the negative electrode active material layer 505a does not overlap with the positive electrode active material layer 502a and/or the positive electrode current collector 501. A first reaction and a second reaction in the power storage device 500 are, for example, a reversible reaction with lithium ions and an irreversible reaction such as the decomposition of an electrolytic solution, respectively. The first reaction and the second reaction will be described in detail later. When the number of electrons received and released in the first reaction is R1 and the number of electrons received and released in the second reaction is R2, the value of R2/R1 in the region 262 is considered to be larger than that in the region 261. Thus, when the area of the region 262 is large, the irreversible capacity might increase, decreasing the capacity of a power storage device. Here, the area of the region 262 is preferably, for example, 2% or less, more preferably 1% or less of that of the region 261. Alternatively, the area of the positive electrode active material layer 502a is preferably, for example, 98% or more, more preferably 99% or more of that of the negative electrode active material layer 505a. Here, the term "area" refers to the area in such a top view as is illustrated in each of FIGS. 8A and 8B, for example.

Note that the area of the positive electrode active material layer 502a may be more than 100% of (once) that of the negative electrode active material layer 505a. For example, the area of the positive electrode active material layer 502a may be 1.3 times or less, more preferably 1.2 times or less, still more preferably 1.1 times or less that of the negative electrode active material layer 505a.

In the region 261, the positive electrode active material layer 502a and/or the positive electrode current collector 501 faces the negative electrode active material layer 505a with the separator therebetween. In the region, the distribution of an electric field applied between the positive electrode and the negative electrode is presumably substantially uniform. In contrast, in the region 262, the negative electrode active material layer 505a does not overlap with the positive electrode active material layer 502a and/or the positive electrode current collector 501; thus, the distribution of an electric field applied between the positive electrode and the negative electrode is presumably not as uniform as that in the region 261.

For example, lithium ions are released from the positive electrode active material layer 502a to an electrolytic solution in charging, so that the concentration of lithium ions in the vicinity of a surface of the positive electrode active material layer 502a increases. Furthermore, the concentration of lithium ions has a gradient between the positive electrode active material layer 502a and the negative electrode active material layer 505a. Such a concentration gradient might facilitate a battery reaction at the negative electrode active material layer 505a, for example.

Here, the distance between the positive electrode active material layer 502a and the region 261 almost depends on the thickness of the separator sandwiched therebetween. Specifically, in the case where the width of the region 262, that is, the distance from the boundary between end portions of the region 261 and the region 262 to the other end portion of the region 262 is larger than the thickness of the separator, it can be said that the distance between the region 262 and the positive electrode active material layer 502a is longer than the distance between the region 261 and the positive electrode active material layer 502a. Thus, a battery reaction might be less likely to occur at the region 262 than at the region 261.

Here, the case of using an ionic liquid as a solvent of an electrolytic solution will be described. Cations and anions in the ionic liquid have charge and thus are believed to more easily exist around a surface of an electrode, for example, in the vicinity of a surface of an active material layer or a current collector than molecules in an organic solvent or the like. Accordingly, a decomposition reaction around the surface of the active material layer or the current collector probably occurs more easily. Moreover, a battery reaction of carrier ions such as lithium ions might be hindered. Thus, in the case of using an ionic liquid as a solvent of an electrolytic solution, an influence of the distribution of an electric field or the lithium concentration might be more significant.

Here, an end portion of the negative electrode current collector 504 is not necessarily aligned with an end portion of the negative electrode active material layer 505a in the negative electrode 506a.

Figure 9:
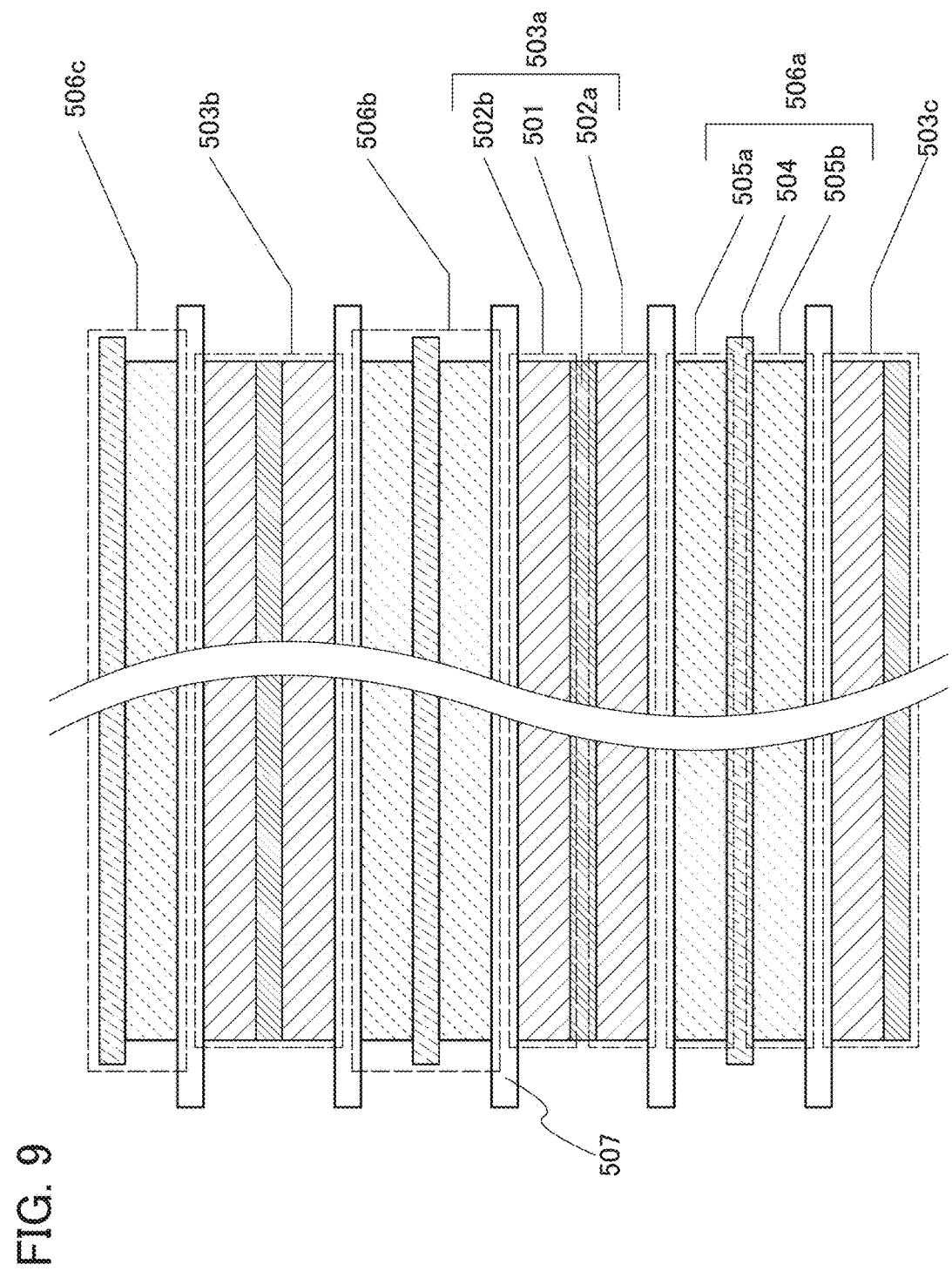
FIG. 9 is a cross-sectional view of a part of a power storage device.
Figure 10:
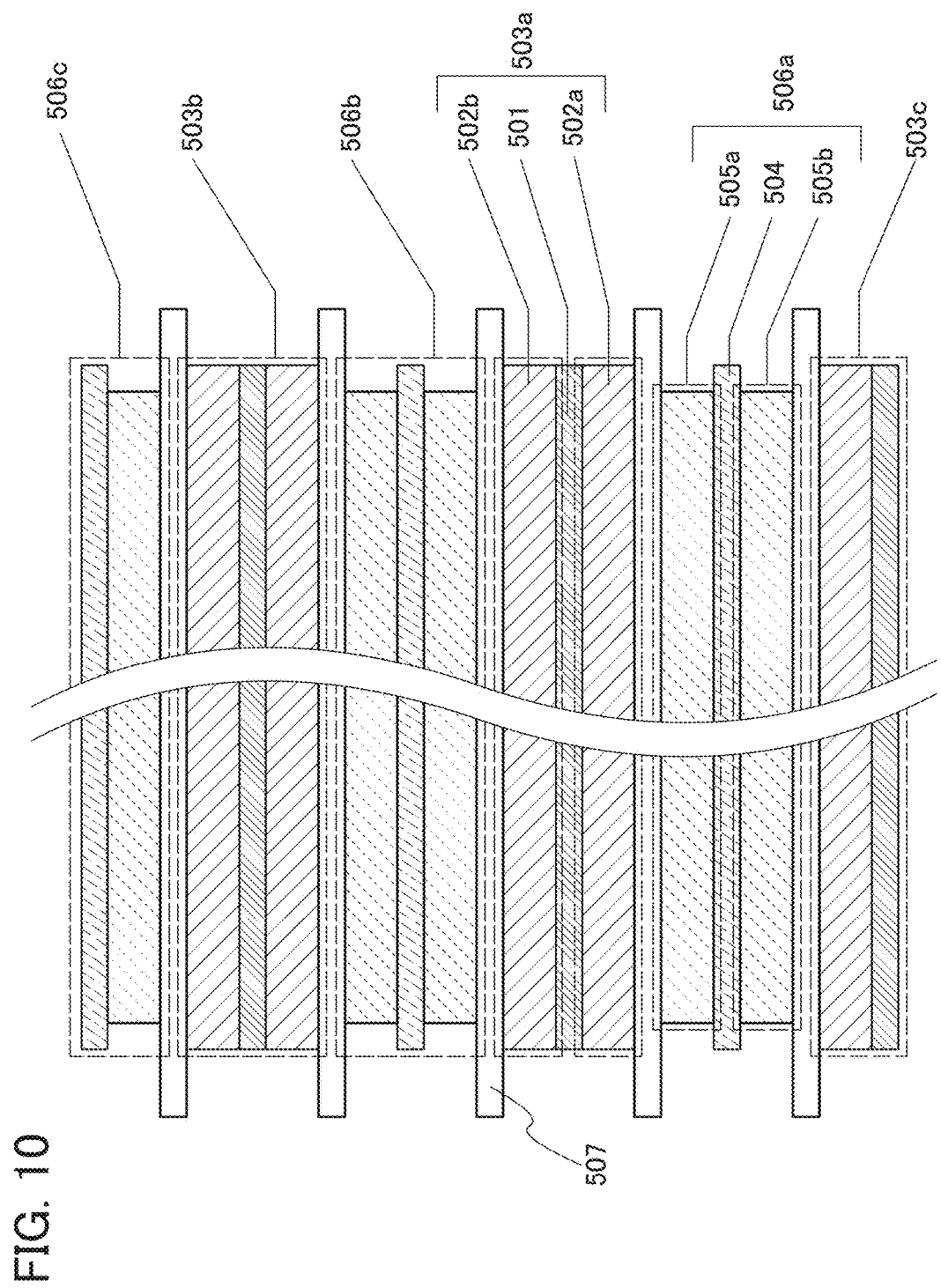
FIG. 10 is a cross-sectional view of a part of a power storage device.
Figure 11:
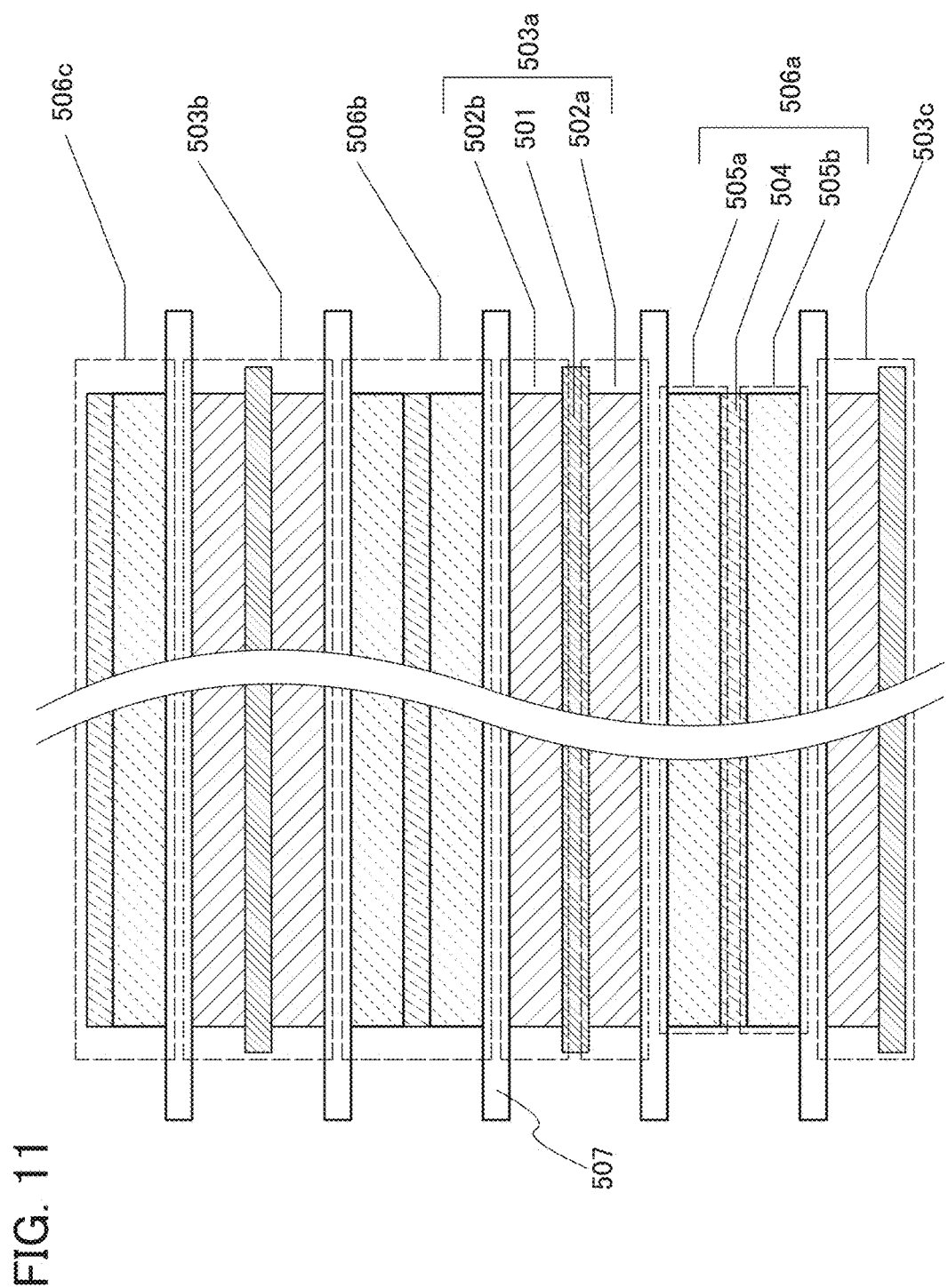
FIG. 11 is a cross-sectional view of a part of a power storage device.

FIGS. 9 to 11 are enlarged views each illustrating part of a cross section of the power storage device 500. FIG. 9 illustrates an example where the end portion of the negative electrode current collector 504 extends beyond the end portion of the negative electrode active material layer 505a. In this case, the end portion of the negative electrode active material layer 505a is preferably substantially aligned with the end portion of the positive electrode 503a as illustrated in FIG. 9, for example.

Alternatively, the end portion of the negative electrode active material layer 505a is preferably inside a region between the end portions of the positive electrode 503a as illustrated in FIG. 10, for example.

Furthermore, as illustrated in FIG. 11, the end portion of the positive electrode current collector 501 is not necessarily aligned with the end portion of the positive electrode active material layer 502a in the positive electrode 503a. In this case, for example, the end portion of the negative electrode active material layer 505a is preferably substantially aligned with the end portion of the positive electrode active material layer 502a as illustrated in FIG. 11. Alternatively, although not illustrated in FIG. 11, the negative electrode active material layer 505a is preferably located inside a region between the end portions of the positive electrode active material layer 502a.

Here, the operation of the power storage device 500 will be described. The case where the power storage device 500 is a lithium-ion secondary battery will be described as an example. In addition, LiFePO$_4$ and graphite are used as a positive electrode active material and a negative electrode active material, respectively, in the lithium-ion secondary battery; however, active materials used for the power storage device of one embodiment of the present invention are not limited thereto.

Figure 46A:
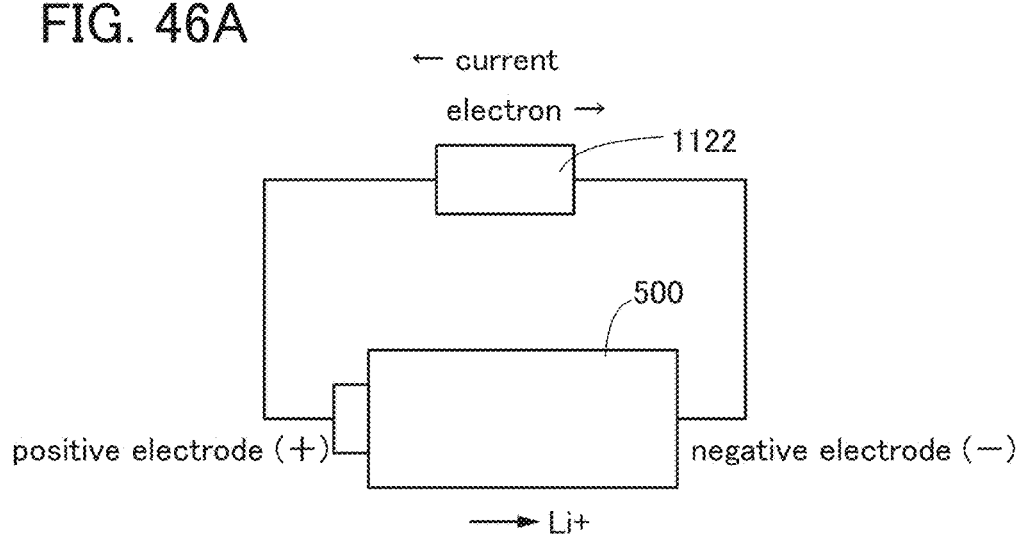
FIGS. 46A and 46B each illustrate the operation of a power storage device.

FIG. 46A illustrates a connection structure of the power storage device 500 and a charger 1122 when a lithium-ion secondary battery is charged. In the case where the power storage device 500 is a lithium-ion secondary battery, a reaction expressed by Chemical Reaction Formula 1 occurs in the positive electrode in charging.

  [Chemical Formula 1]

In addition, a reaction expressed by Chemical Reaction Formula 2 occurs in the negative electrode in charging.

  [Chemical Formula 2]

Here, for example, an electrolytic solution is decomposed around a surface of the electrode at a battery reaction potential in some cases. Such a decomposition reaction is an irreversible reaction in many cases and thus might lead to the loss of the capacity of the power storage device. Particularly in the negative electrode, the battery reaction potential is low, which easily causes the reductive decomposition of an electrolytic solution, easily reducing the capacity.

Here, the reactions in the negative electrode will be described in more detail. The reaction expressed by Chemical Reaction Formula 2 is referred to as the first reaction.

On the other hand, a reaction other than the reaction expressed by Chemical Reaction Formula 2 in charging occurs in the negative electrode in some cases. For example, an electrolytic solution might be decomposed around the surface of the electrode. Furthermore, in the case of using an ionic liquid as a solvent of an electrolytic solution, cations, etc. might be intercalated into each gap between layers of an active material. These reactions are irreversible in many cases. An irreversible reaction among the reactions other than the reaction expressed by Chemical Reaction Formula 2 is referred to as the second reaction.

Since the second reaction is irreversible, when the second reaction occurs, the discharge capacity becomes lower than the charge capacity. Thus, the second reaction leads to a reduction in the capacity of the power storage device. This is why the second reaction is preferably as negligible as possible.

The second reaction might cause formation of a film on the surface of the electrode. The formed film serves as a passivating film in some cases. This passivating film may allow inhibition of a further decomposition reaction of ions other than lithium ions by charge or discharge. Accordingly, decrease in the capacity of the power storage device after formation of the film is possibly inhibited. For this reason, formation of the film is preferred.

Figure 46B:
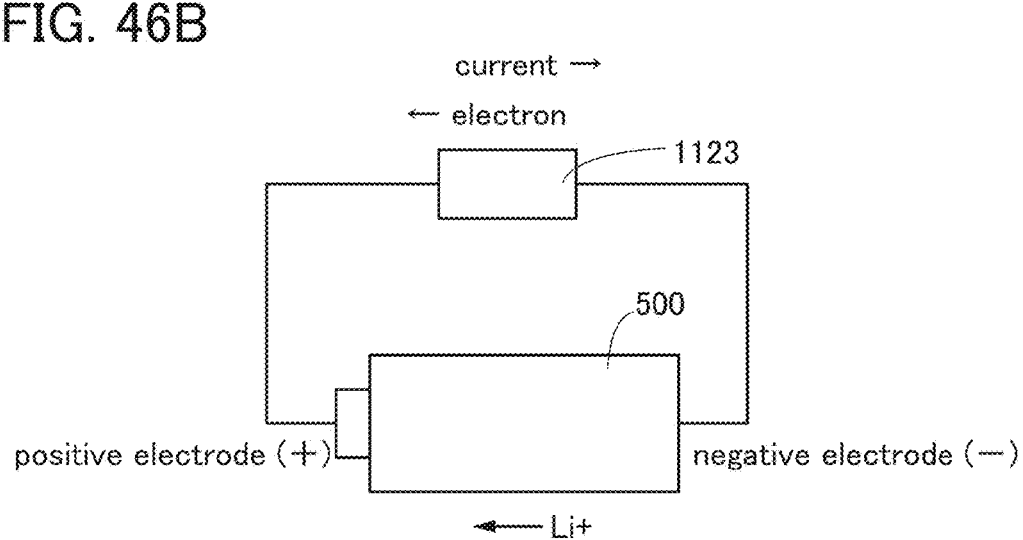

Next, discharging will be described. FIG. 46B illustrates a connection structure of the power storage device 500 and a load 1123 when the lithium-ion secondary battery is discharged. A reaction expressed by Chemical Reaction Formula 3 occurs in the positive electrode in discharging.

  [Chemical Formula 3]

In addition, a reaction expressed by Chemical Reaction Formula 4 occurs in the negative electrode in discharging.

  [Chemical Formula 4]

The case where an irreversible reaction such as the decomposition of an electrolytic solution occurs following the reaction expressed by Chemical Reaction Formula 4 in the negative electrode will be described. In that case, the charge capacity in the next charge and discharge cycle might become lower than the discharge capacity. That is to say, when irreversible reactions repeatedly occur, the capacity might gradually decrease with the increasing number of charge and discharge cycles.

Here, the second reaction that occurs in the case of using an ionic liquid as a solvent of an electrolytic solution will be described in detail.

Cations and anions in an ionic liquid have charge and thus can form an electric double layer at a surface of an electrode, for example. Therefore, an ionic liquid can be used in a power storage device such as an electric double layer capacitor.

However, cations and anions in an ionic liquid might be decomposed around a surface of an electrode. Most decomposition reactions are irreversible and accordingly might reduce the capacity of a power storage device.

Ions in an ionic liquid are intercalated into each gap between layers of an intercalation compound typified by graphite and deintercalated from the gap after the intercalation in some cases. For example, in the case of using graphite as a negative electrode active material of a power storage device, cations might be intercalated into each gap between graphite layers. In such a case, charge is received and released around a surface of an electrode in intercalation, generating charge capacity.

Here, for example, the case where cations cannot be deintercalated after being intercalated into each gap between graphite layers will be described. This reaction is an irreversible reaction and thus leads to a loss of capacity. The decomposition of intercalated cations and the decomposition of cations halfway through intercalation or deintercalation are irreversible reactions in many cases and might cause a loss of the capacity of a power storage device.

These irreversible reactions are examples of the second reaction. The second reaction presumably occurs concurrently with the reactions expressed by Chemical Reaction Formulas (1) to (4). It is preferred that an environment where normal reactions in a battery operation, that is, the reactions expressed by Chemical Reaction Formulas (1) to (4) occur more easily than the second reaction be created, in which case the capacity of a power storage device increases.

The present inventors have found that a region of a negative electrode of a power storage device that does not overlap with a positive electrode might increase the initial irreversible capacity. This finding will be described in detail in examples below. That is to say, it is suggested that the larger a region of a negative electrode that does not overlap with a positive electrode is, the more easily the second reaction occurs. It is also suggested that such a phenomenon is significant particularly in the case of using an ionic liquid for an electrolytic solution of a power storage device.

This indicates that reducing a region of a negative electrode that does not overlap with a positive electrode leads to a decrease in the initial irreversible capacity, for example.

Next, an example of an ionic liquid that can be used as a solvent of an electrolytic solution will be described.

In the case of using an ionic liquid containing an aliphatic onium cation such as a quaternary ammonium cation, a tertiary sulfonium cation, or a quaternary phosphonium cation, which has a lower reduction potential than an ionic liquid containing an aromatic cation such as an imidazolium cation, the irreversible capacity of a power storage device can be reduced in some cases. The ionic liquid, however, has a high viscosity and thus has low ionic conductivity (e.g., lithium ionic conductivity). Furthermore, in the case of a lithium-ion secondary battery using the ionic liquid, the resistance of the ionic liquid (specifically, an electrolyte containing the ionic liquid) is increased in a low temperature environment (particularly at 0° C. or lower) and thus it is difficult to increase the charge and discharge rate.

An ionic liquid containing an aromatic cation such as an imidazolium cation is preferably used as a solvent of an electrolytic solution because it has a lower viscosity than an ionic liquid containing a cation of an aliphatic compound and can increase the charge and discharge rate. An aromatic cation such as an imidazolium cation, however, might be reductively decomposed easily at surfaces of an active material and a current collector, which are constituent materials of a power storage device. As a result, irreversible capacity might increase. Furthermore, the capacity might be reduced with the increasing number of charge and discharge cycles. These phenomena are possibly due to the high reduction potential of an aromatic cation such as an imidazolium cation. Moreover, these phenomena are possibly due to the structure of an imidazolium cation, for example. Thus, it is particularly preferred that the reductive decomposition of an aromatic cation such as an imidazolium cation at surfaces of an active material and a current collector, which are constituent materials of a power storage device, be inhibited.

Furthermore, an ionic liquid containing an aliphatic onium cation such as a quaternary ammonium cation, a tertiary sulfonium cation, or a quaternary phosphonium cation has a relatively low reduction potential but might be reductively decomposed at surfaces of an active material and a current collector, which are constituent materials of a power storage device, in charge and discharge cycles at a high temperature, for example.

According to one embodiment of the present invention, for example, the decomposition reaction of an electrolytic solution at the surfaces of the active material layer, the current collector, and the like of the power storage device 500 can be inhibited, increasing the capacity of the power storage device.

Furthermore, an irreversible reaction with the electrolytic solution 508 might also occur at the surfaces of the negative electrode current collector 504 and the positive electrode current collector 501. Thus, the positive electrode current collector 501 and the negative electrode current collector 504 are preferably less likely to react with the electrolytic reaction.

For example, the positive electrode current collector 501 and the negative electrode current collector 504 can each be formed using a metal such as gold, platinum, zinc, iron, nickel, copper, aluminum, titanium, tantalum, or manganese, an alloy containing any of the metals (e.g., stainless steel), sintered carbon, or the like. Alternatively, copper or stainless steel that is coated with carbon, nickel, titanium, or the like can be used to form the current collectors. Alternatively, the current collectors can each be formed using an aluminum alloy to which an element that improves heat resistance, such as silicon, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like.

Stainless steel or the like is preferably used as a current collector, in which case a reaction with an electrolytic solution can be inhibited in some cases.

The positive electrode current collector 501 and the negative electrode current collector 504 can each have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The positive electrode current collector 501 and the negative electrode current collector 504 may each be formed to have micro irregularities on the surface thereof in order to enhance adhesion to the active material layer, for example. The positive electrode current collector 501 and the negative electrode current collector 504 each preferably have a thickness of 5 μm to 30 μm inclusive.

<Tab Region>

Figure 12A:
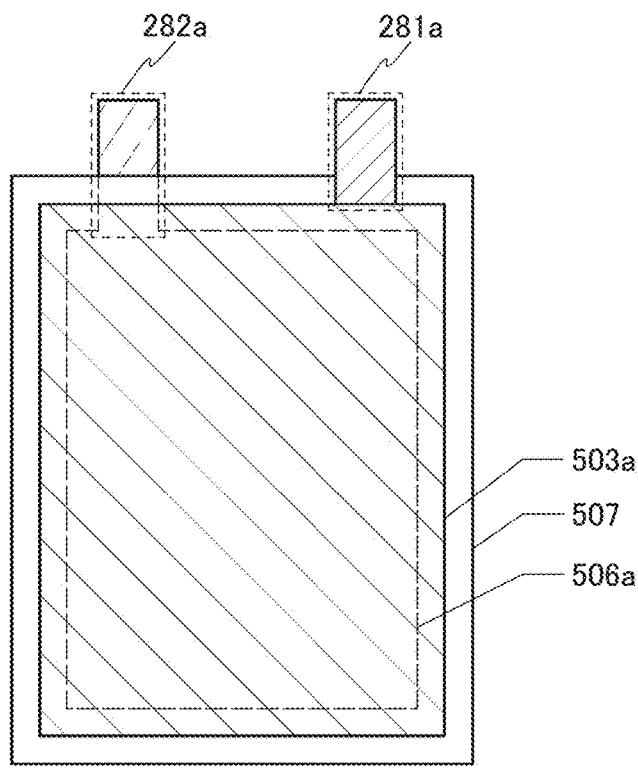
FIGS. 12A to 12C are top views illustrating electrodes and a separator.

As illustrated in FIG. 12A, for example, the positive electrode 503a and the negative electrode 506a may include a tab region 281a and a tab region 282a, respectively. The tab region 281a and the tab region 282a may be connected to a lead electrode serving as a terminal of a power storage device. For example, a lead electrode may be welded to part of the tab region. In the tab region 281a provided for the positive electrode 503a, at least part of the positive electrode current collector is preferably exposed. In the tab region 282a provided for the negative electrode 506a, at least part of the negative electrode current collector is preferably exposed. Exposure of part of the current collector can reduce contact resistance between the lead electrode and the current collector.

Exposure of the surface of the current collector, however, might easily cause a reaction between the electrolytic solution 508 and the current collector. Therefore, the area of a region of the surface of the current collector that is exposed is preferably small. Here, by forming a layer 271 having an excellent insulating property over at least part of surfaces of portions of the tab region 281a and the tab region 282a to which the lead electrode is not welded, an irreversible reaction with the electrolytic solution 508 can be inhibited in some cases. In particular, the negative electrode has a low reaction potential; accordingly, the electrolytic solution is more easily to be decomposed. Thus, it is more preferred that the layer 271 be formed over the surface of the tab region 282a.

Figure 12B:
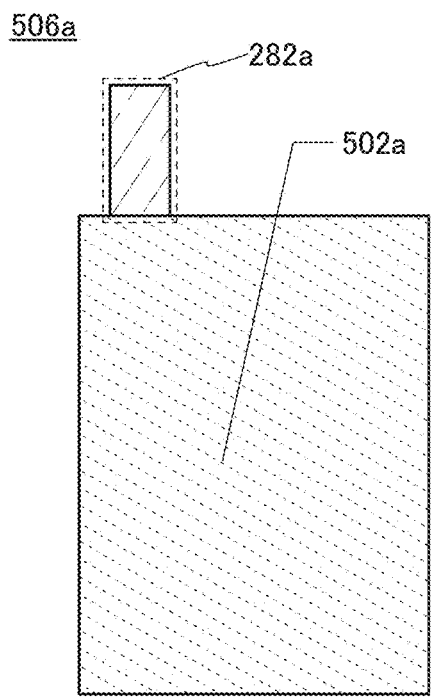
Figure 12C:
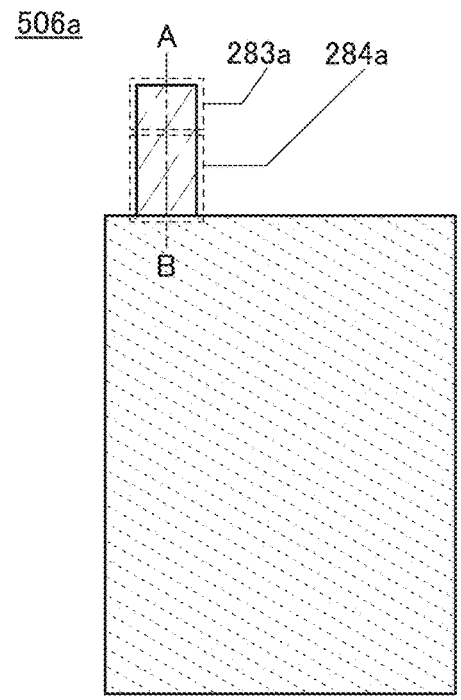
Figure 13A:
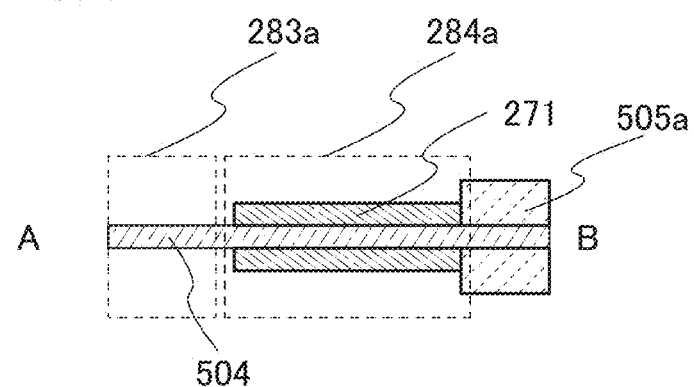
FIGS. 13A and 13B are cross-sectional views illustrating an electrode.
Figure 13B:
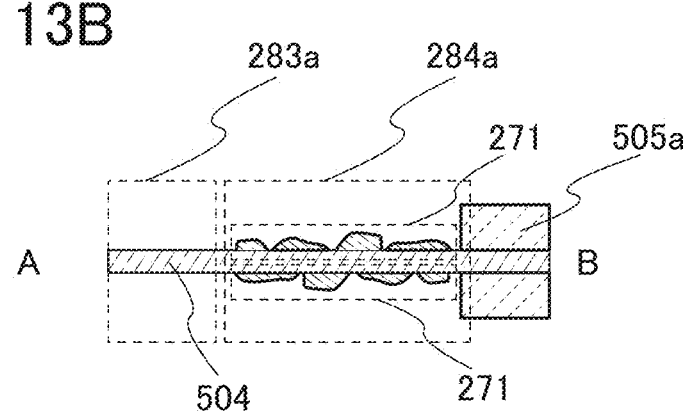

Here, an example of forming the layer 271 over part of the surface of the tab region 282a will be described. FIGS. 12B and 12C are top views of the negative electrode 506a. In FIG. 12B, in the tab region 282a of the negative electrode 506a, at least part of the surface of the current collector is exposed. A lead electrode described later is welded to the tab region 282a. As illustrated in FIG. 12C, the tab region 282a includes a region 284a and a region 283a that is adjacent to the region 284a and closer to an end of the tab region. In the case where a lead electrode is welded to at least part of the region 283a illustrated in FIG. 12C, it is preferred that the layer 271 be formed over a surface of the region 284a, for example. Furthermore, the surface of the region 284a is preferably covered with the layer 271. For example, the layer 271 preferably has higher resistance than the negative electrode active material layer 505a. Furthermore, for example, the layer 271 is preferably thinner than the negative electrode active material layer 505a. The lead electrode may be welded to the region 283a either before or after the layer 271 is formed over the surface of the region 284a. FIGS. 13A and 13B are cross-sectional views along dashed-dotted line A-B in FIG. 12C. In FIG. 13A, the layer 271 is preferably formed over at least part of the region 284a. In at least part of the region 283a, the surface of the negative electrode current collector 504 is preferably exposed. Here, the layer 271 is preferably thinner than the negative electrode active material layer 505a, for example. Island-shaped regions may be scattered as the layer 271 as illustrated in FIG. 13B.

The layer 271 is formed using a material having an excellent insulating property, for example. Here, it is preferred that the material having an excellent insulating property be unlikely to be dissolved in an electrolytic solution. Furthermore, it is preferred that the material having an excellent insulating property not be significantly dissolved at the potential of the current collector. Examples of the material having an excellent insulating property include polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), and polyacrylonitrile (PAN). Alternatively, a rubber material such as styrene-butadiene rubber (SBR), styrene-isoprene-styrene rubber, acrylonitrile-butadiene rubber, butadiene rubber, or ethylene-propylene-diene copolymer, or the like can be used. Alternatively, a water-soluble polymer, e.g., a cellulose derivative such as carboxymethyl cellulose (CMC), methyl cellulose, ethyl cellulose, hydroxypropyl cellulose, diacetyl cellulose, or regenerated cellulose, or starch, or the like can be used. Alternatively, some of these materials may be combined to be used. In particular, any of the above rubber materials is more preferably used in combination with any of the water-soluble polymers.

Figure 14A:
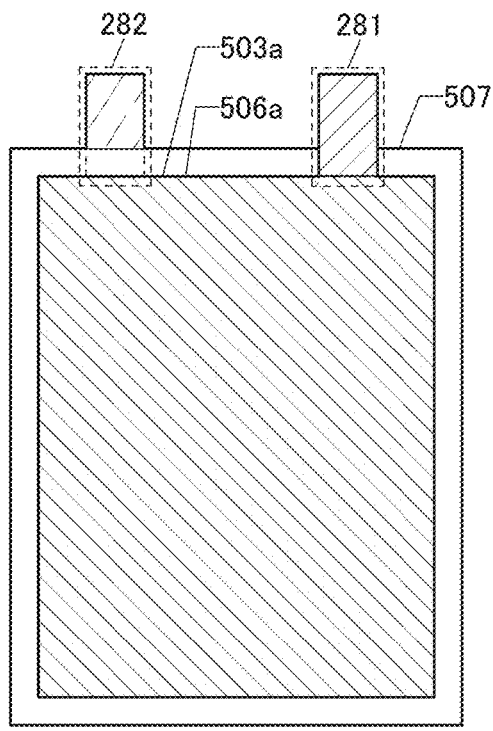
FIGS. 14A to 14D are top views illustrating electrodes and a separator.
Figure 14B:
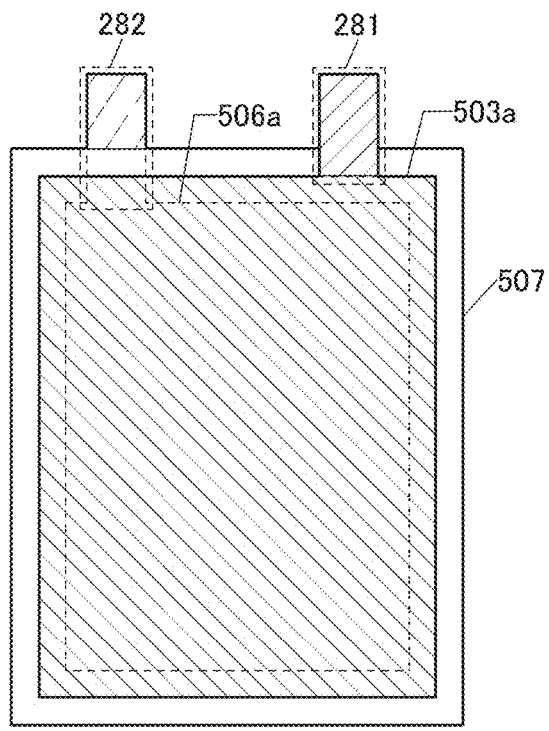
Figure 14C:
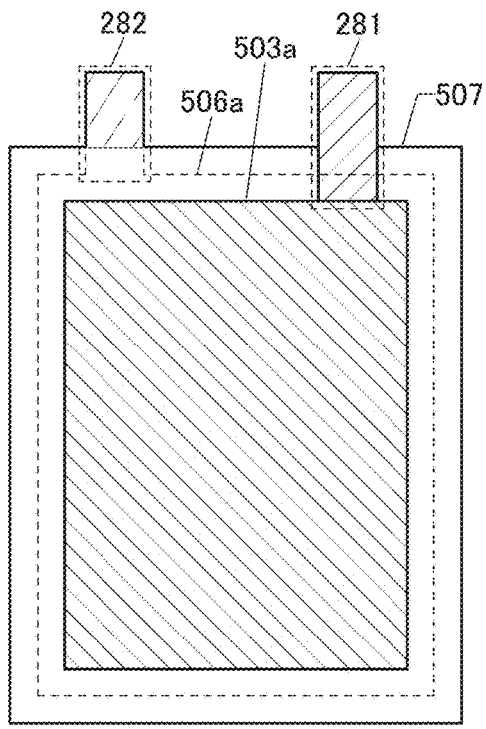

Here, the case where the positive electrode 503a includes the tab region 281 and the negative electrode 506a includes the tab region 282 will be described with reference to FIGS. 14A to 14D. FIGS. 14A to 14C each illustrate an example where the negative electrode 506a, the separator 507 between the negative electrode 506a and the positive electrode 503a, and the positive electrode 503a are seen from above.

FIG. 14A illustrates an example where the end portion of the positive electrode 503a except the tab region is substantially aligned with the end portion of the negative electrode 506a except the tab region. FIG. 14B illustrates an example where the end portion of the negative electrode 506a except the tab region is located inside a region between the end portions of the positive electrode 503a.

The examples in FIGS. 14A and 14B are preferred because the negative electrode 506a overlaps with the positive electrode 503a except the tab region 282. The negative electrode 506a preferably overlaps with the positive electrode 503a, in which case an irreversible reaction in the power storage device 500 is inhibited. Inhibiting the irreversible reaction leads to inhibition of decrease in the capacity of the power storage device 500. In that case, high capacity can be obtained, which is preferable.

FIG. 14C illustrates an example where the end portion of the negative electrode 506a extends beyond the end portion of the positive electrode 503a. A region where the negative electrode 506a overlaps with the positive electrode 503a and other regions in FIG. 14C will be described in detail with reference to FIG. 14D.

Figure 14D:
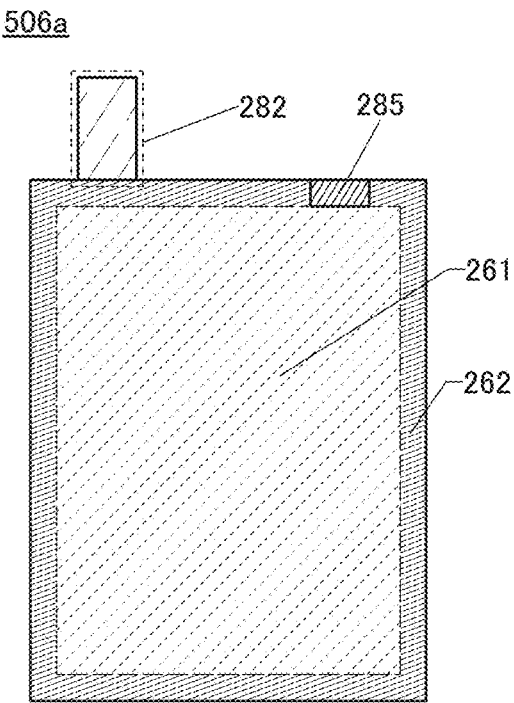

FIG. 14D is a top view of the negative electrode 506a. The region 261 included in the negative electrode 506a illustrated in FIG. 14D corresponds to a region where the negative electrode 506a overlaps with the positive electrode 503a in FIG. 14C. The region 262 corresponds to a region where the negative electrode 506a does not overlap with the positive electrode 503a in FIG. 14C. A region 285 corresponds to a region where the negative electrode 506a overlaps with the tab region of the positive electrode 503a. The area of the region 262 is preferably small in order that an irreversible reaction in the power storage device may be inhibited. Inhibiting the irreversible reaction leads to inhibition of decrease in the capacity of the power storage device 500. In that case, high capacity can be obtained, which is preferable.

Figure 15A:
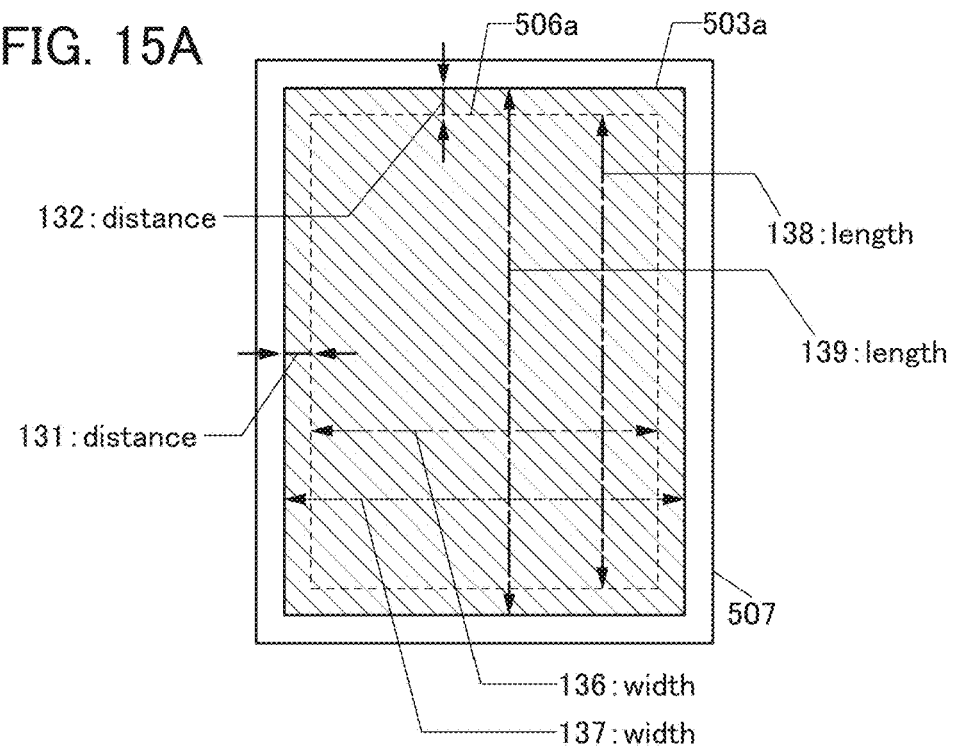
FIGS. 15A and 15B are top views illustrating electrodes and a separator.
Figure 15B:
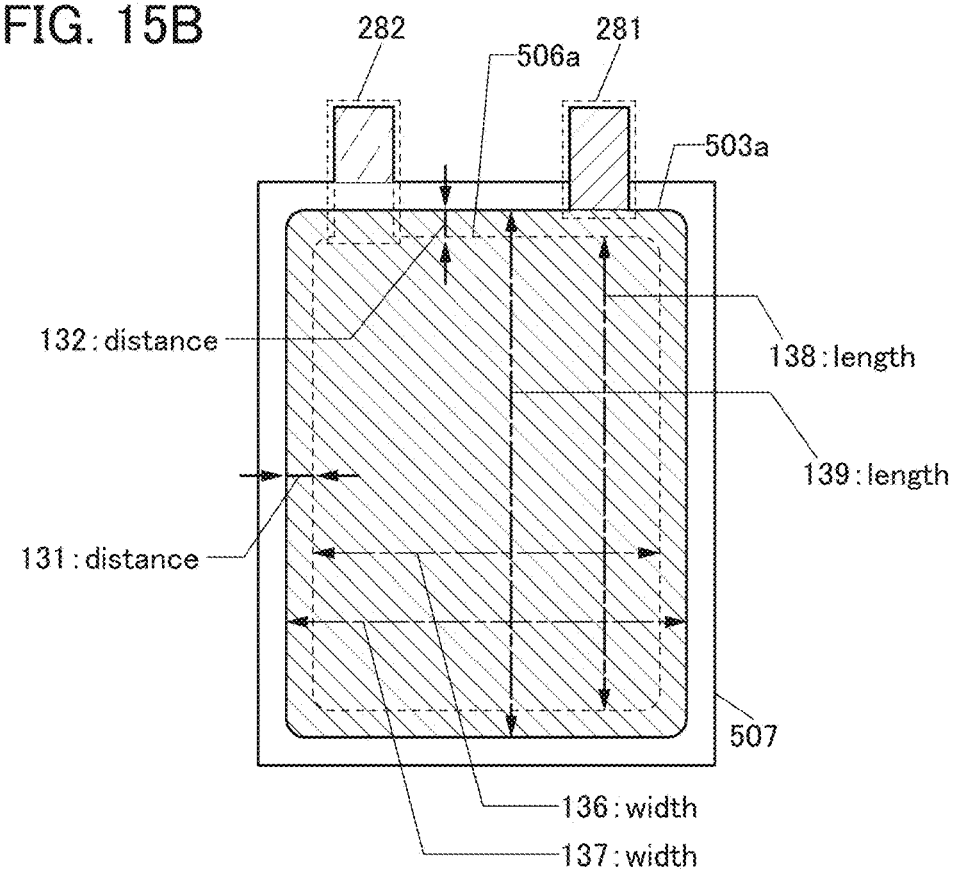
Figure 16:
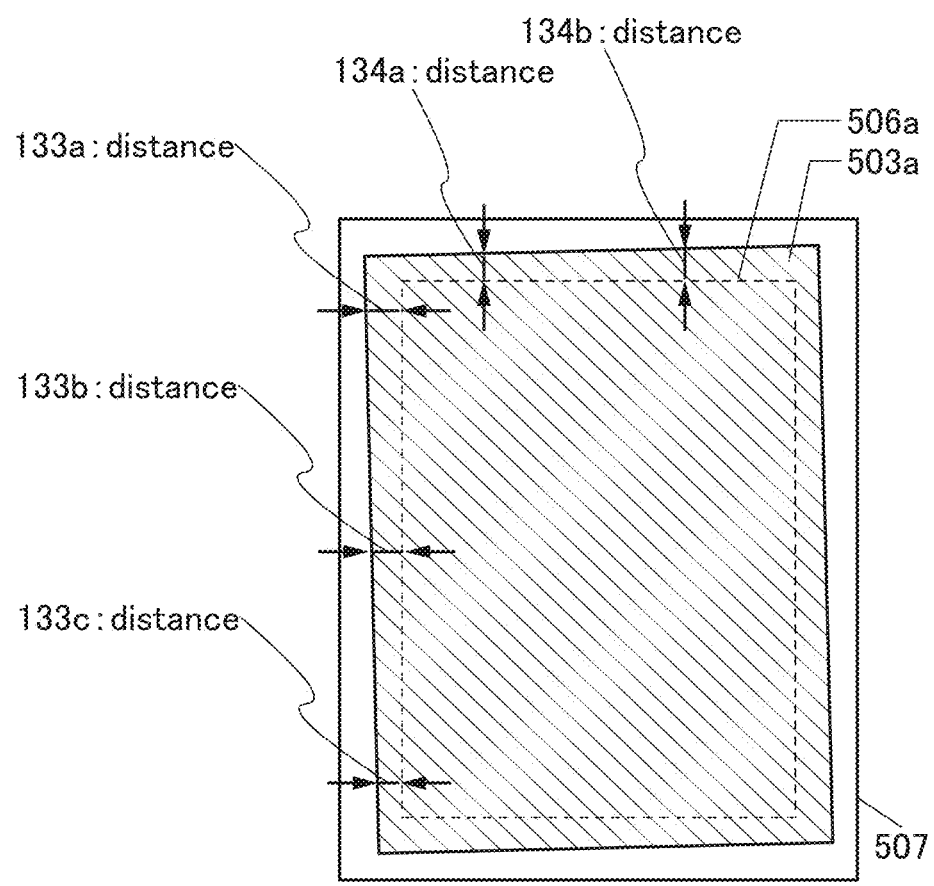
FIG. 16 is a top view illustrating electrodes and a separator.

Next, FIGS. 15A and 15B and FIG. 16 are top views each illustrating the positive electrode 503a, the negative electrode 506a, and a separator. FIG. 15A is the top view illustrating the case where the positive electrode 503a, the negative electrode 506a, and the separator are each rectangular. Here, distances (or interval) between the end portion of the positive electrode 503a and the end portion of the negative electrode 506a correspond to, for example, a distance 131 between long sides of the positive electrode and the negative electrode and a distance 132 between short sides thereof in the case where the positive electrode and the negative electrode are rectangular when seen from above as illustrated in FIG. 15A and the like.

The width and the length of the positive electrode 503a are, for example, a width 137 and a length 139, respectively, as in FIG. 15A. Similarly, the width and the length of the negative electrode 506a are, for example, a width 136 and a length 138, respectively, as in FIG. 15A and the like.

FIG. 15B illustrates, as another example, the case where the positive electrode 503a and the negative electrode 506a include the tab region 281 and the tab region 282, respectively. In the case where the positive electrode 503a and the negative electrode 506a include the tab region 281 and the tab region 282, respectively, the widths and the lengths of the positive electrode 503a and the negative electrode 506a do not need to include those of the tab region 281 and the tab region 282. The width and the length of the positive electrode 503a are the width 137 and the length 139 illustrated in FIG. 15B, for example. Similarly, the width and the length of the negative electrode 506a are, for example, the width 136 and the length 138 in FIG. 15B, respectively.

FIG. 16 illustrates, as another example, the case where the end portion of the positive electrode 503a is not parallel with the end portion of the negative electrode 506a. In this case, the distance between the end portions may be measured at a plurality of positions and the average of the distances may be calculated. Although FIG. 16 illustrates the example where distances 133a to 133c and distances 134a and 134b are each measured as the distance between the end portions, the positions and number of measurement portions are not limited to those in the above example.

<Components of Power Storage Device>

Next, components of the power storage device 500 will be described. The positive electrode active material layer includes a positive electrode active material. As the positive electrode active material, a material into and from which lithium ions can be inserted and extracted can be used; for example, a material having an olivine crystal structure, a layered rock-salt crystal structure, a spinel crystal structure, or a NASICON crystal structure, or the like can be used. A material that can be used for the positive electrode active material will be described in detail in Embodiment 3.

The negative electrode active material layer includes a negative electrode active material. As the negative electrode active material, for example, a carbon-based material, an alloy-based material, or the like can be used. A material that can be used as the negative electrode active material will be described in detail in Embodiment 3.

The positive electrode active material layer and the negative electrode active material layer may each further include a conductive additive. Examples of the conductive additive include a carbon material, a metal material, and a conductive ceramic material. Alternatively, a fiber material may be used as the conductive additive. A material that can be used as the conductive additive will be described in detail in Embodiment 3.

The positive electrode active material layer and the negative electrode active material layer may each further include a binder. A material that can be used as the binder will be described in detail in Embodiment 3.

As the separator 507, paper; nonwoven fabric; glass fiber; ceramics; synthetic fiber containing polyamide, vinylon (polyvinyl alcohol-based fiber), polyester, acrylic, polyolefin, or polyurethane; or the like can be used.

A solvent of the electrolytic solution 508 preferably contains an ionic liquid (also referred to as a room temperature molten salt) that has non-flammability and non-volatility. Either one kind of ionic liquid or a combination of some kinds of ionic liquids is used. The use of the electrolytic solution 508 containing an ionic liquid can prevent a power storage device from exploding or catching fire even when the power storage device internally shorts out or the internal temperature increases owing to overcharging or the like. An ionic liquid is composed of cations and anions. The ionic liquid contains organic cations and anions. Examples of the organic cation include aromatic cations such as an imidazolium cation and a pyridinium cation and aliphatic onium cations such as a quaternary ammonium cation, a tertiary sulfonium cation, and a quaternary phosphonium cation. Examples of the anion include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate. An ionic liquid that can be used as a solvent of the electrolytic solution 508 will be described in detail in Embodiment 2.

As a solvent of the electrolytic solution 508, an aprotic organic solvent may be mixed into any of the above ionic liquids. As the aprotic organic solvent, for example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Alternatively, a gelled electrolyte obtained in such a manner that a polymer is swelled with an electrolytic solution may be used. Examples of the gelled electrolyte (polymer-gel electrolyte) include a host polymer that is used as a support and contains the electrolytic solution described above.

Examples of host polymers include a polymer having a polyalkylene oxide structure, such as polyethylene oxide (PEO); PVdF; polyacrylonitrile; and a copolymer containing any of them. For example, PVdF-HFP, which is a copolymer of PVdF and hexafluoropropylene (HFP) can be used. The formed polymer may be porous.

In combination with the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. For example, the solid electrolyte may be formed over a surface of the active material layer. In the case of using the solid electrolyte and the electrolytic solution in combination, a separator and a spacer do not need to be provided in some cases.

It is preferred that the surface of the exterior body 509 that is in contact with the electrolytic solution, i.e., the inner surface of the exterior body 509, not react with the electrolytic solution significantly. When moisture enters the power storage device 500 from the outside, a reaction between a component of the electrolytic solution or the like and water might occur. Thus, the exterior body 509 preferably has low moisture permeability.

[Thin Storage Battery]

Figure 18A:
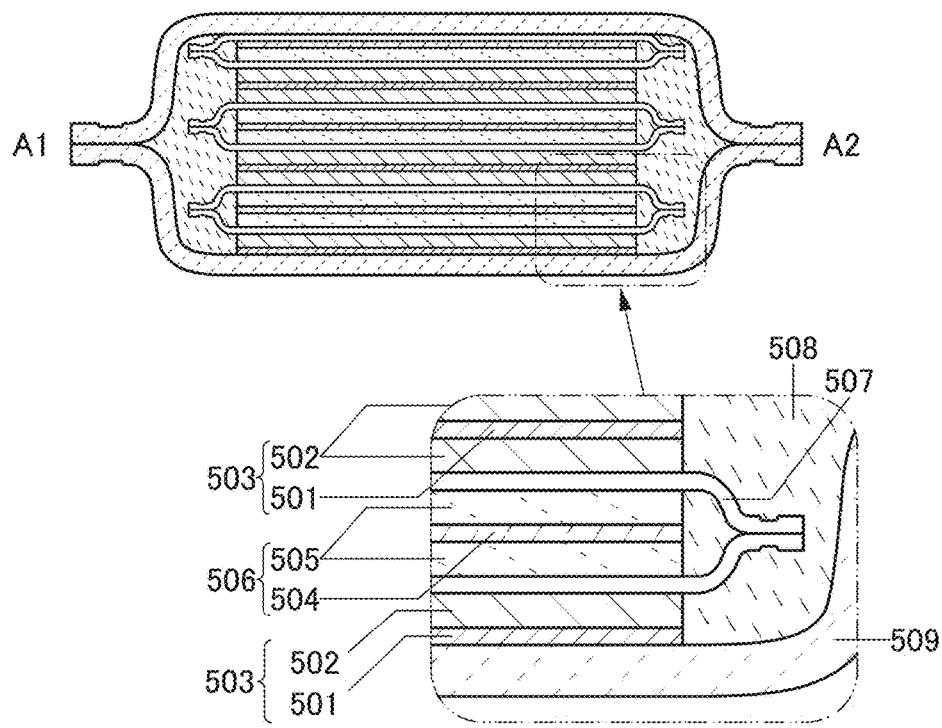
FIGS. 18A and 18B are cross-sectional views illustrating a thin storage battery.
Figure 18B:
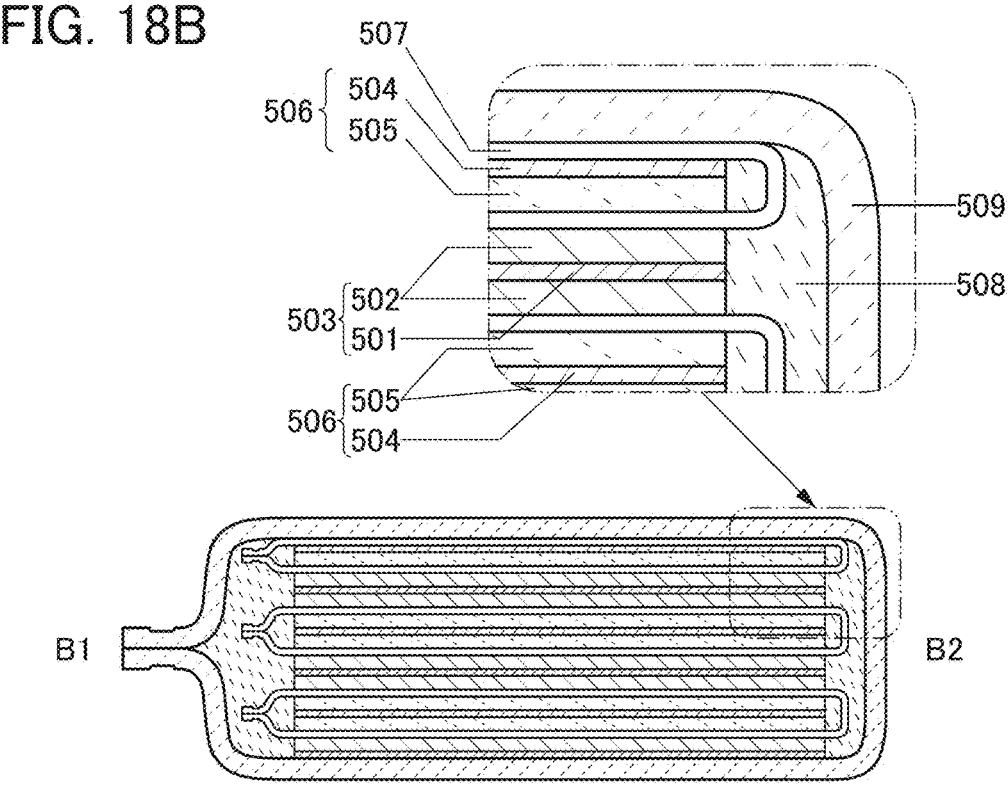

An example of the power storage device 500 fabricated according to one embodiment of the present invention will be described with reference to FIGS. 17A to 17C. FIG. 17A illustrates a thin storage battery as an example of the power storage device 500. FIG. 18A is a cross-sectional view along dashed-dotted line A1-A2 in FIG. 17A. FIG. 18B is a cross-sectional view along dashed-dotted line B1-B2 in FIG. 17A. The power storage device 500 includes the positive electrode 503, the negative electrode 506, the separator 507, the exterior body 509, a positive electrode lead 510, and a negative electrode lead 511.

FIG. 17B illustrates the appearance of the positive electrode 503. The positive electrode 503 includes the positive electrode current collector 501 and the positive electrode active material layer 502. The positive electrode 503 preferably includes the tab region 281. The positive electrode lead electrode 510 is preferably welded to part of the tab region 281. The tab region 281 preferably includes a region where the positive electrode current collector 501 is exposed. When the positive electrode lead electrode 510 is welded to the region where the positive electrode current collector 501 is exposed, contact resistance can be further reduced. Although FIG. 17B illustrates the example where the positive electrode current collector 501 is exposed in the entire tab region 281, the tab region 281 may partly include the positive electrode active material layer 502.

FIG. 17C illustrates the appearance of the negative electrode 506. The negative electrode 506 includes the negative electrode current collector 504 and the negative electrode active material layer 505. The negative electrode 506 preferably includes the tab region 282. The negative electrode lead electrode 511 is preferably welded to part of the tab region 282. The tab region 282 preferably includes a region where the negative electrode current collector 504 is exposed. When the negative electrode lead electrode 511 is welded to the region where the negative electrode current collector 504 is exposed, contact resistance can be further reduced. Although FIG. 17C illustrates the example where the negative electrode current collector 504 is exposed in the entire tab region 282, the tab region 282 may partly include the negative electrode active material layer 505.

The use of a flexible exterior body allows the thin storage battery illustrated in FIG. 17A to have flexibility. When the thin storage battery has flexibility, it can be used in an electronic device at least part of which is flexible, and the storage battery can be bent as the electronic device is bent.

Although FIG. 17A and FIG. 11 each illustrate the example where the end portions of the positive electrode and the negative electrode are substantially aligned with each other, at least part of the end portion of the positive electrode may extend beyond the end portion of the negative electrode as illustrated in FIGS. 5 and 6. Alternatively, the end portion of the negative electrode may extend beyond the end portion of the positive electrode as illustrated in FIG. 7 and FIGS. 8A and 8B. In that case, the area of the negative electrode active material layer located outside the positive electrode is preferably as small as possible as described with reference to FIG. 7 and FIGS. 8A and 8B.

The examples of storage batteries illustrated in FIGS. 18A and 18B each include three positive electrode-negative electrode pairs. It is needless to say that the number of pairs of electrodes is not limited to three, and may be more than three or less than three. In the case of using a large number of pairs of electrodes, the storage battery can have high capacity. In contrast, in the case of using a small number of pairs of electrodes, the storage battery can have a smaller thickness and higher flexibility. The examples in FIGS. 18A and 18B each include five positive electrode active material layer-negative electrode active material layer pairs (the positive and negative electrodes of each pair face each other). It is needless to say that the number of pairs of active material layers is not limited to five.

The power storage device 500 may include the positive electrode lead electrode 510 and the negative electrode lead electrode 511. The positive electrode lead electrode 510 is preferably electrically connected to the positive electrode 503. For example, the positive electrode lead electrode 510 may be welded to the tab region 281 of the positive electrode 503. Similarly, the negative electrode lead electrode 511 is preferably electrically connected to the negative electrode 506. For example, the negative electrode lead electrode 511 may be welded to the tab region 282 of the negative electrode 506. The positive electrode lead electrode 510 and the negative electrode lead electrode 511 are preferably exposed to the outside of the exterior body so as to serve as terminals for electrical contact with an external portion.

As illustrated in FIGS. 13A and 13B, the tab region 281 and the tab region 282 are preferably partly covered with the layer 271. In particular, part of the tab region 282 is preferably covered with the layer 271. In that case, for example, the tab region 281 except a portion to which the positive electrode lead electrode 510 is welded is covered with the layer 271.

The positive electrode current collector 501 and the negative electrode current collector 504 can double as terminals for electrical contact with an external portion. In that case, the positive electrode current collector 501 and the negative electrode current collector 504 may be arranged so that part of the positive electrode current collector 501 and part of the negative electrode current collector 504 are exposed to the outside the exterior body 509 without using lead electrodes.

Figure 22:
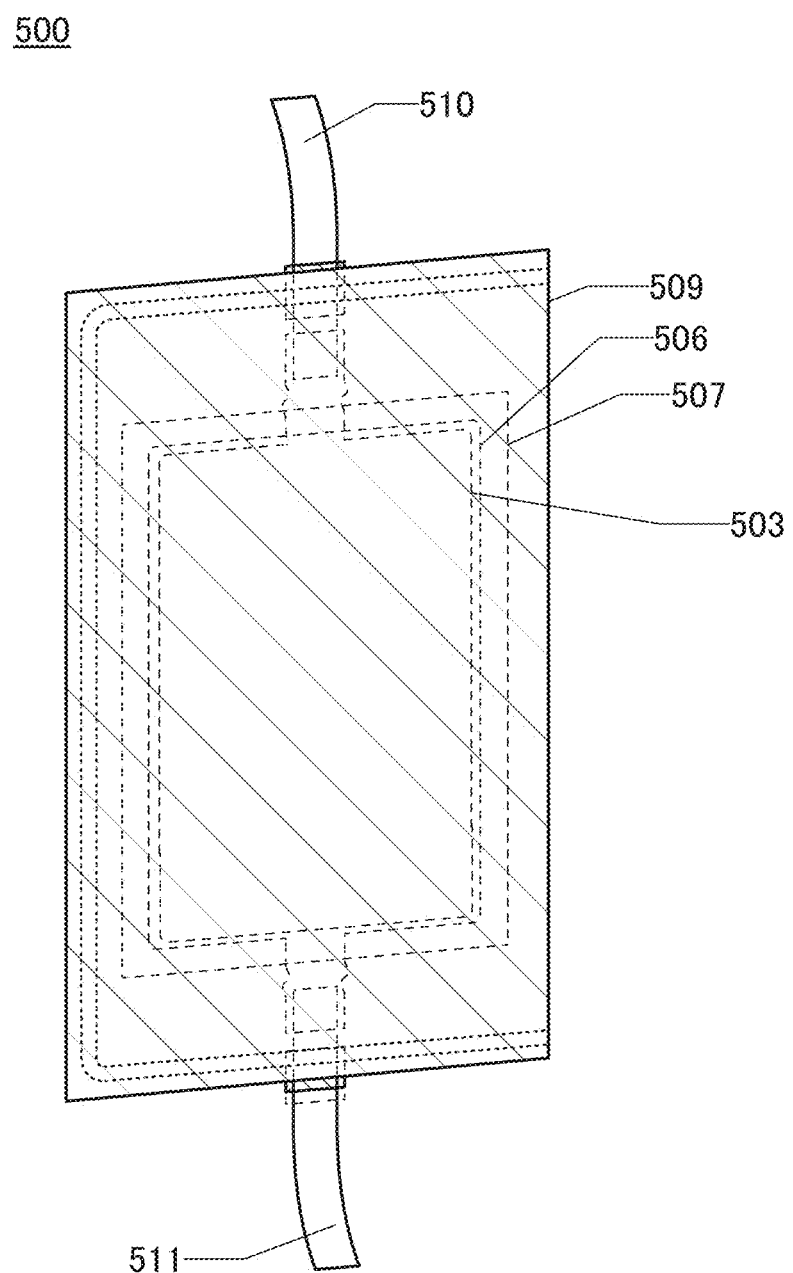
FIG. 22 is an external view of a thin storage battery.

Although the positive electrode lead electrode 510 and the negative electrode lead electrode 511 are provided on the same side of the storage battery in FIG. 17A, the positive electrode lead electrode 510 and the negative electrode lead electrode 511 may be provided on different sides of a storage battery as illustrated in FIG. 22. The lead electrodes of a power storage device of one embodiment of the present invention can be freely positioned as described above; therefore, the degree of freedom in design is high. Accordingly, a product including a power storage device of one embodiment of the present invention can have a high degree of freedom in design. Furthermore, a yield of products each including a power storage device of one embodiment of the present invention can be increased.

As the exterior body 509 in the thin storage battery, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

In the above structure, the exterior body 509 of the storage battery can change its form with a radius of greater than or equal to 10 mm, preferably greater than or equal to 30 mm. One or two films are used as the exterior body of the storage battery. In the case where the storage battery has a layered structure, the storage battery has a cross section sandwiched by two curved surfaces of the films when it is curved.

Figure 23A:
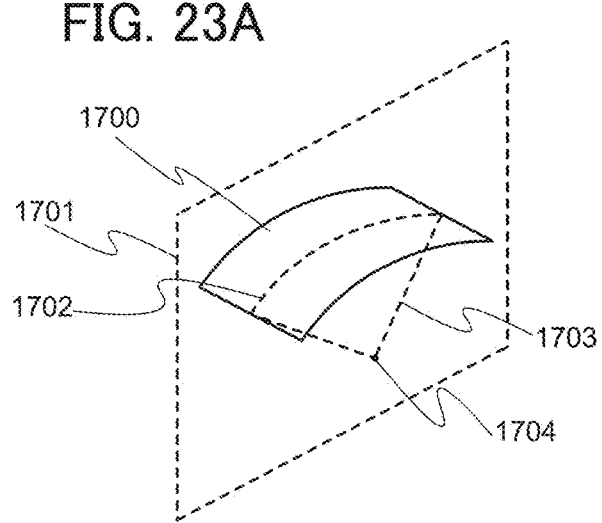
FIGS. 23A to 23C illustrate the radius of curvature of a surface.
Figure 23B:
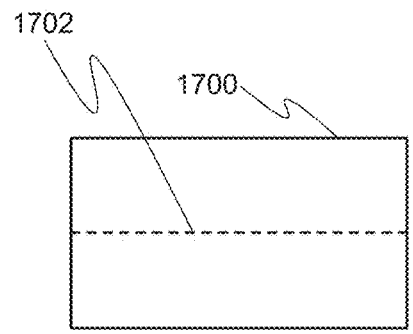
Figure 23C:
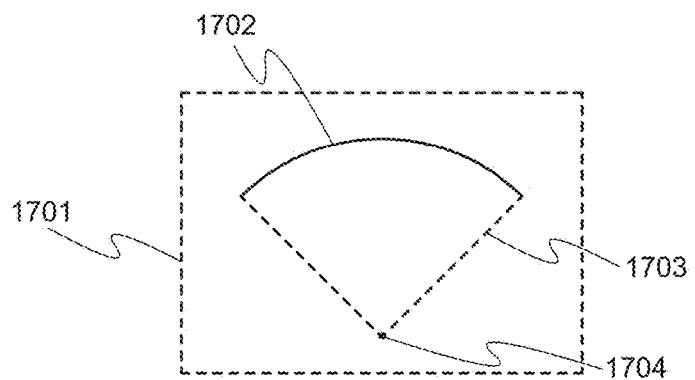

Description is given of the radius of curvature of a surface with reference to FIGS. 23A to 23C. In FIG. 23A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 23B is a top view of the curved surface 1700. FIG. 23C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 24A:
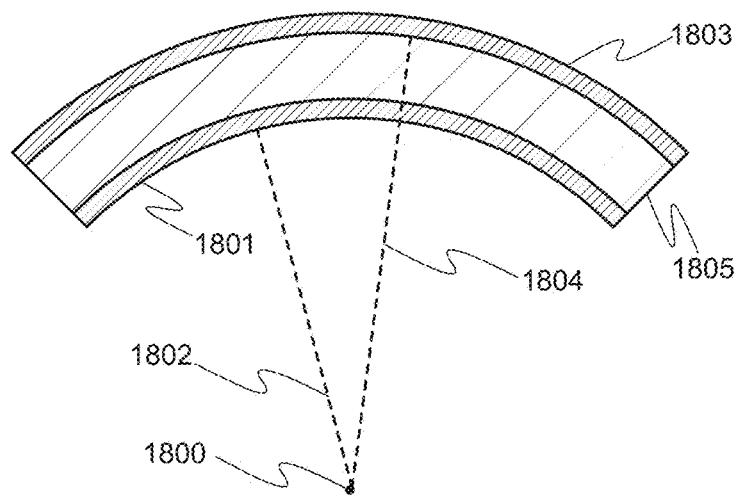
FIGS. 24A to 24D illustrate the radius of curvature of a film.
Figure 24B:
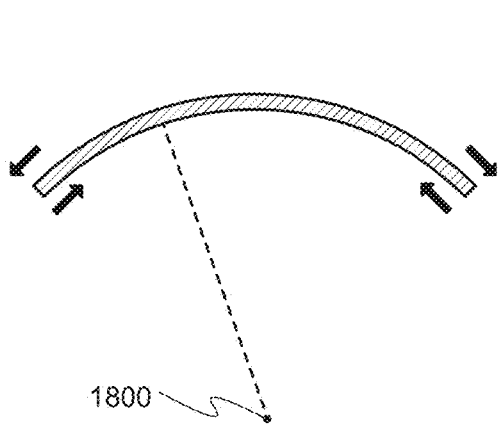
Figure 24C:
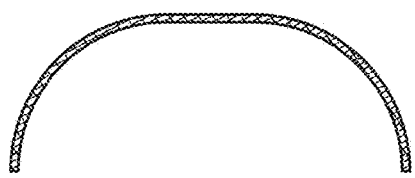
Figure 24D:
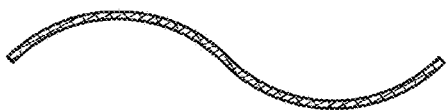

In the case of bending a secondary battery in which a component 1805 including electrodes and an electrolytic solution is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 24A). When the secondary battery is curved and has an arc-shaped cross section, compressive stress is applied to a surface of the film on the side closer to the center 1800 of curvature and tensile stress is applied to a surface of the film on the side farther from the center 1800 of curvature (FIG. 24B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 10 mm, preferably greater than or equal to 30 mm Note that the cross-sectional shape of the secondary battery is not limited to a simple arc shape, and the cross section can be partly arc-shaped; for example, a shape illustrated in FIG. 24C, a wavy shape illustrated in FIG. 24D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

[Fabricating Method of Thin Storage Battery]

Next, an example of a fabricating method of the power storage device 500 that is a thin storage battery will be described with reference to drawings.

In the case where the negative electrode active material layer 505 is formed over only one surface of the negative electrode 506 and the negative electrode current collector 504 is exposed on the rear surface side, the layer 271 is preferably formed over the exposed negative electrode current collector 504. The layer 271 preferably has an excellent insulating property. The layer 271 preferably has higher resistance than the negative electrode active material layer 505. The layer 271 is preferably thinner than the negative electrode active material layer 505.

Here, an example of a method for forming the layer 271 will be described. First, a slurry for forming the layer 271 is formed. The slurry can be formed in such a manner that any of the above-described materials is mixed with a solvent, for example. Some of the above-described materials may be used in combination. As the solvent, for example, water or N-methyl-2-pyrrolidone (NMP) can be used.

The mixing can be performed with a mixer. Here, any of a variety of mixers can be used as the mixer. For example, a planetary mixer, a homogenizer, or the like can be used.

Then, the formed slurry is applied to the negative electrode current collector 504. For the application, a blade method or the like can be used. Furthermore, a continuous coater or the like may be used for the application.

The solvent is volatilized from the slurry applied to the negative electrode current collector 504 by a method such as ventilation drying or reduced pressure (vacuum) drying, whereby the layer 271 is formed. The solvent is preferably volatilized using, for example, a hot wind at a temperature higher than or equal to 30° C. and lower than or equal to 160° C. There is no particular limitation on the atmosphere.

As illustrated in FIGS. 13A and 13B, in the case where a lead electrode is welded to at least part of the region 283a in the tab region 282, the layer 271 is also preferably formed over a surface of the region 284a, for example.

Through the above steps, the layer 271 can be formed.

Next, the positive electrode 503, the negative electrode 506, and the separator 507 are stacked.

First, the separator 507 is positioned over the positive electrode 503. Then, the negative electrode 506 is positioned over the separator 507. In the case of using two or more positive electrode-negative electrode pairs, another separator is positioned over the negative electrode 506, and then, the positive electrode 503 is positioned. In this manner, the positive electrodes and the negative electrodes are alternately stacked and separated by the separator.

Alternatively, the separator 507 may have a bag-like shape. First, the positive electrode 503 is positioned over the separator 507. Then, the separator 507 is folded along a broken line in FIG. 19A so that the positive electrode 503 is sandwiched by the separator 507. Although the example where the positive electrode 503 is sandwiched by the separator 507 is described here, the negative electrode 506 may be sandwiched by the separator 507.

Here, the outer edges of the separator 507 outside the positive electrode 503 are bonded so that the separator 507 has a bag-like shape (or an envelope-like shape). The bonding of the outer edges of the separator 507 can be performed with the use of an adhesive or the like, by ultrasonic welding, or by thermal fusion bonding.

Figure 19A:
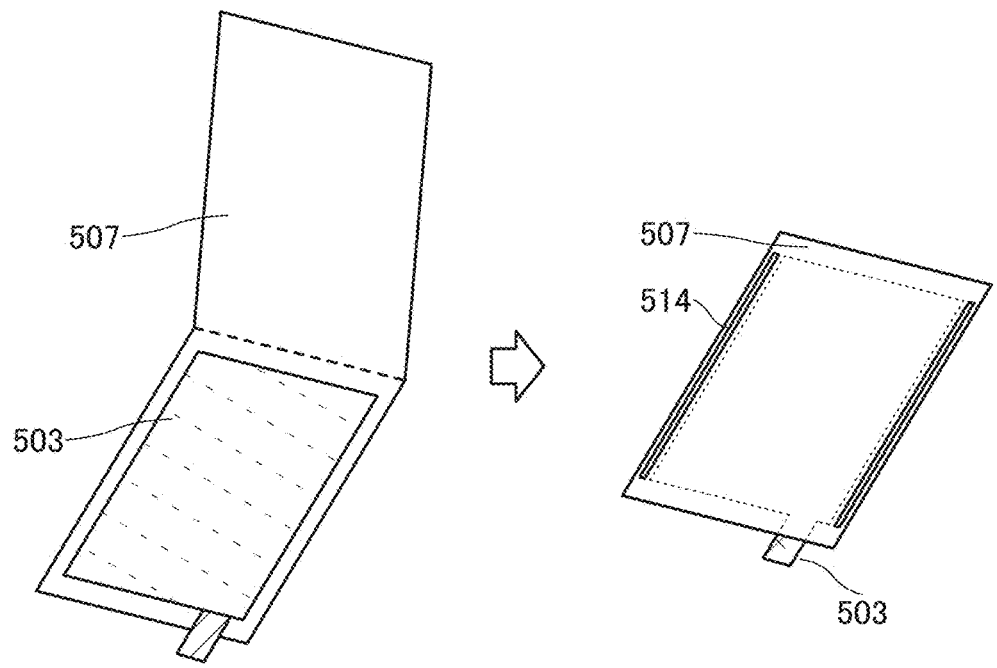
FIGS. 19A and 19B illustrate a method for fabricating a thin storage battery.

In this embodiment, polypropylene is used as the separator 507 and the outer edges of the separator 507 are bonded by heating. Bonding portions 514 are illustrated in FIG. 19A. In such a manner, the positive electrode 503 can be covered with the separator 507.

Figure 19B:
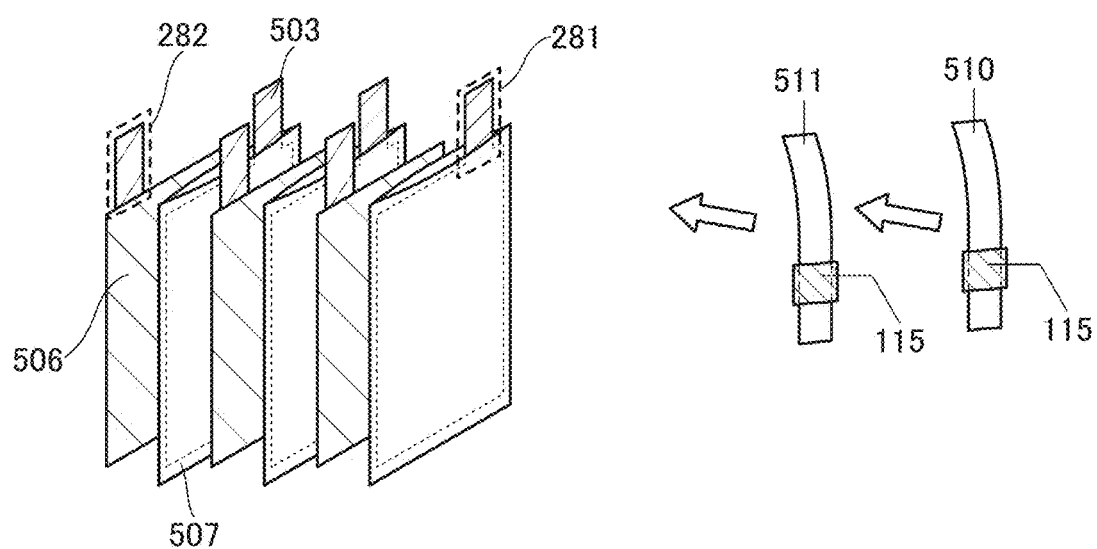

Then, the negative electrodes 506 and the positive electrodes 503 each covered with the separator 507 are alternately stacked as illustrated in FIG. 19B. Furthermore, the positive electrode lead electrode 510 and the negative electrode lead electrode 511 each having a sealing layer 115 are prepared.

Figure 20A:
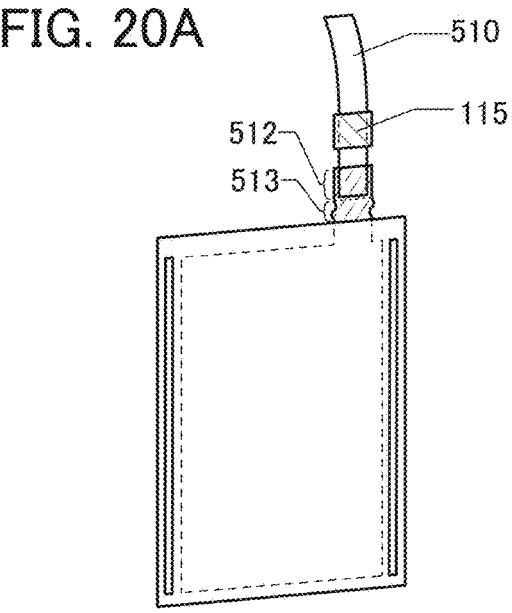
FIGS. 20A to 20C illustrate a method for fabricating a thin storage battery.
Figure 20B:
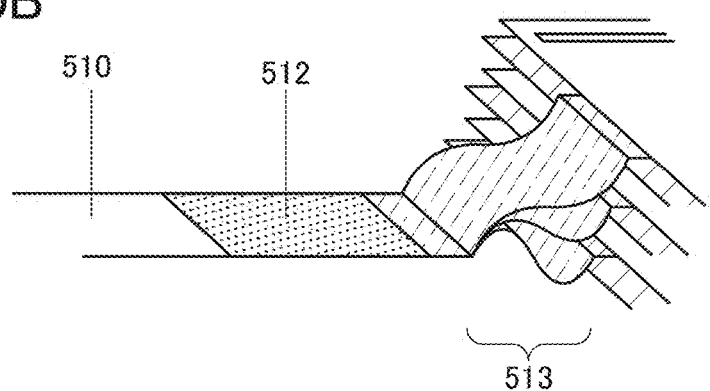

After that, the positive electrode lead electrode 510 having the sealing layer 115 is connected to the tab region 281 of the positive electrode 503 as illustrated in FIG. 20A. FIG. 20B is an enlarged view of a connection portion. The tab region 281 of the positive electrode 503 and the positive electrode lead electrode 510 are electrically connected to each other by irradiating the bonding portion 512 with ultrasonic waves while applying pressure thereto (ultrasonic welding). In that case, a curved portion 513 is preferably provided in the tab region 281.

This curved portion 513 can relieve stress due to external force applied after fabrication of the power storage device 500. Thus, the power storage device 500 can have high reliability.

Next, the negative electrode lead electrode 511 is electrically connected to the tab region 282 of the negative electrode 506 by a similar method.

Here, the layer 271 may be formed after the negative electrode lead electrode 511 is welded to the tab region 282 by ultrasonic welding.

Subsequently, the positive electrode 503, the negative electrode 506, and the separator 507 are positioned over an exterior body 509.

Figure 20C:
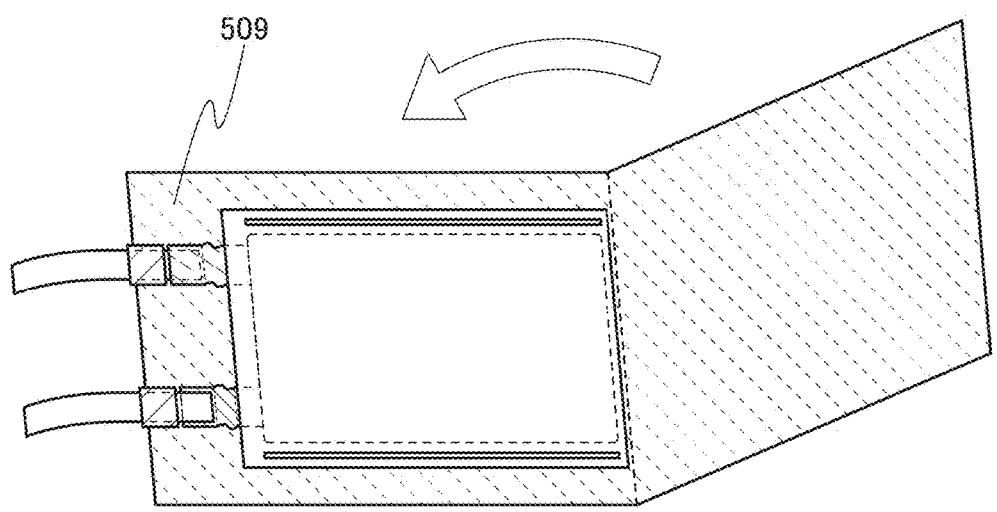

Then, the exterior body 509 is folded along a portion shown by a dotted line in the vicinity of a center portion of the exterior body 509 in FIG. 20C.

Figure 21:
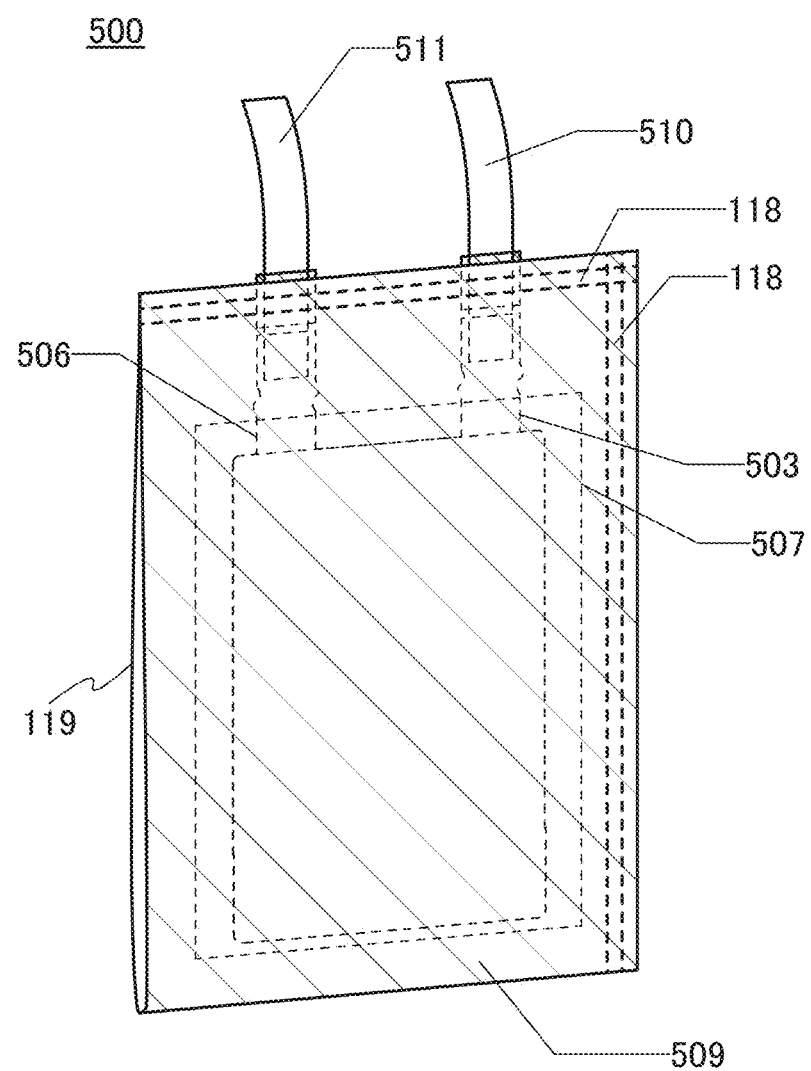
FIG. 21 illustrates a method for fabricating a thin storage battery.

Then, the outer edges of the exterior body 509 except an inlet 119 for introducing the electrolytic solution 508 are bonded by thermocompression bonding. In thermocompression bonding, the sealing layers 115 provided over the lead electrodes are also melted, thereby fixing the lead electrodes and the exterior body 509 to each other. Moreover, adhesion between the exterior body 509 and the lead electrodes can be increased. In FIG. 21, the thermocompression bonding portion in the outer edges of the exterior body 509 is illustrated as a bonding portion 118.

After that, in a reduced-pressure atmosphere or an inert gas atmosphere, a desired amount of electrolytic solution 508 is introduced to the inside of the exterior body 509 from the inlet 119. Lastly, the inlet 119 is sealed by thermocompression bonding. Through the above steps, the power storage device 500, which is a thin storage battery, can be fabricated.

Next, aging after fabrication of the power storage device 500 will be described. Aging is preferably performed after fabrication of the power storage device 500. The aging can be performed under the following conditions, for example. Charge is performed at a rate of 0.001 C or more and 0.2 C or less at a temperature higher than or equal to room temperature and lower than or equal to 50° C. In the case where an electrolytic solution is decomposed and a gas is generated and accumulated in the power storage device, the electrolytic solution cannot be in contact with a surface of the electrode in some regions. That is to say, an effectual reaction area of the electrode is reduced and effectual current density is increased.

When the current density is extremely high, a voltage drop occurs depending on the resistance of the electrode, lithium is intercalated into graphite and lithium is deposited on the surface of graphite. The lithium deposition might reduce capacity. For example, if a coating film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

In the case of performing degasification, for example, part of the exterior body of the thin storage battery is cut to open the storage battery. When the exterior body is expanded because of a gas, the form of the exterior body is preferably adjusted. Furthermore, the electrolytic solution may be added as needed before resealing.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a coating film. The formed coating film may thus be densified when the charging state is held at a temperature higher than room temperature after the release of the gas, for example.

For example, in storage batteries provided in electronic devices that can be repeatedly folded, exterior bodies gradually deteriorate and cracks are likely to be caused in some cases as the electronic devices are folded repeatedly. Furthermore, the contact between a surface of an active material and the like and an electrolytic solution by charge and discharge causes a decomposition reaction of the electrolytic solution, which might generate a gas or the like. When expanded because of generation of a gas, the exterior bodies are more likely to be damaged as the electronic devices are folded. The decomposition of an electrolytic solution can be inhibited by using one embodiment of the present invention; thus, for example, generation of a gas by charge and discharge can be inhibited in some cases. Consequently, expansion, deformation, damage, and the like of the exterior bodies can be suppressed. This reduces a load on the exterior body, which is preferable.

The use of the electrode of one embodiment of the present invention leads to inhibition of the decomposition of an electrolytic solution and thus also leads to inhibition of excess growth of a coating film in some cases. In the case where the growth of a coating film is large, the resistance of an electrode increases with the increasing number of charge and discharge cycles. Such an increase in resistance promotes the increase of the potential of the electrode to the potential at which lithium is deposited. Furthermore, in a negative electrode, for example, lithium deposition might occur because of stress caused when an electronic device is folded. The electrode of one embodiment of the present invention has durability to stress caused when an electronic device is folded; thus, the use of the electrode, leads to, for example, reduction of the possibility of causing lithium deposition in some cases.

In this embodiment, one embodiment of the present invention is described. Other embodiments of the present invention will be described in the other embodiments. Note that one embodiment of the present invention is not limited thereto. For example, the case where the areas of two electrodes, e.g., the areas of a positive electrode and a negative electrode are substantially equal is described; however, one embodiment of the present invention is not limited to this. Depending on the case, the areas of two electrodes, e.g., the areas of a positive electrode and a negative electrode, may be greatly different from each other in one embodiment of the present invention. For another example, the case where end portions of two electrodes, e.g., end portions of a positive electrode and a negative electrode, are substantially aligned with each other is described; however, one embodiment of the present invention is not limited to this. Depending on the case, end portions of two electrodes, e.g., end portions of a positive electrode and a negative electrode, are not necessarily aligned or partly aligned in one embodiment of the present invention. For another example, the case where an end portion of one of two electrodes, e.g., an end portion of one of a positive electrode and a negative electrode, is located inside a region between end portions of the other electrode, e.g., end portions of the other of the positive electrode and the negative electrode, is described; however, one embodiment of the present invention is not limited to this. Depending on the case, an end portion of one of two electrodes, e.g., an end portion of one of a positive electrode and a negative electrode may be partly located outside an end portion of the other electrode, e.g., an end portion of the other of the positive electrode and the negative electrode, in one embodiment of the present invention. Alternatively, depending on the case, an end portion of one of two electrodes, e.g., an end portion of one of a positive electrode and a negative electrode, may extend beyond an end portion of the other electrode, e.g., an end portion of the other of the positive electrode and the negative electrode, in one embodiment of the present invention.

This embodiment can be implemented in combination with any of the other embodiments as appropriate.

(Embodiment 2)

In this embodiment, a nonaqueous solvent used in a power storage device of one embodiment of the present invention will be described.

A nonaqueous solvent used in a power storage device of one embodiment of the present invention preferably contains an ionic liquid. Either one kind of ionic liquid or a combination of some kinds of ionic liquids is used. The ionic liquid is composed of cations and anions. The ionic liquid contains organic cations and anions.

As the organic cation, an aromatic cations or an aliphatic onium cation such as a quaternary ammonium cation, a tertiary sulfonium cation, or a quaternary phosphonium cation is preferably used.

An aromatic cation is preferably a cation having a five-membered heteroaromatic ring. Examples of the cation having a five-membered heteroaromatic ring are a benzimidazolium cation, a benzoxazolium cation, and a benzothiazolium cation. Examples of the cation having a monocyclic five-membered heteroaromatic ring include an oxazolium cation, a thiazolium cation, an isoxazolium cation, an isothiazolium cation, an imidazolium cation, and a pyrazolium cation. In view of the stability, viscosity, and ionic conductivity of the compound and ease of synthesis, the cation having a monocyclic five-membered heteroaromatic ring is preferred. An imidazolium cation is particularly preferred because it can make the viscosity low.

Examples of the anion in the above ionic liquid include a monovalent amide anion, a monovalent methide anion, a fluorosulfonic acid anion ($SO_3F^-$), a fluoroalkyl sulfonic acid anion, tetrafluoroborate ($BF_4^-$), fluoroalkylborate, hexafluorophosphate ($PF_6^-$), and fluoroalkylphosphate. An example of the monovalent amide anion is $(C_nF_{2n+1}SO_2)_2N^-$ (n=0 to 3). An example of the monovalent cyclic amide anion is $(CF_2SO_2)_2N^-$. An example of the monovalent methide anion is $(C_nF_{2n+1}SO_2)_3C^-$ (n 0 to 3). An example of the monovalent cyclic methide anion is $(CF_2SO_2)_2C$ $(CF_3SO_2)$. An example of the fluoroalkyl sulfonic acid anion is $(C_mF_{2m+1}SO_3)^-$ (m=0 to 4). An example of fluoroalkylborate is $\{BF_n(C_mH_kF_{2m+1-k})_{4-n}\}^-$ (n=0 to 3, m=1 to 4, and k=0 to 2m). An example of fluoroalkylphosphate is $\{PF_n(C_mH_kF_{2m+1-k})_{6-n}\}^-$ (n=0 to 5, m=1 to 4, and k=0 to 2m). Note that the anion is not limited thereto.

An ionic liquid containing a cation having a five-membered heteroaromatic ring can be expressed by General Formula (G1).

[Chemical Formula 5]

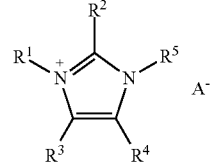

(G1)

In General Formula (G1), $R^1$ represents an alkyl group having 1 to 4 carbon atoms; $R^2$ to $R^4$ each independently represent a hydrogen atom or an alkyl group having 1 to 4 carbon atoms; $R^5$ represents a main chain formed of two or more atoms selected from C, O, Si, N, S, and P; $A^-$ represents any one of a monovalent imide anion, a monovalent amide anion, a monovalent methide anion, a fluorosulfonate anion, a fluoroalkylsulfonate anion, tetrafluoroborate, fluoroalkylborate, hexafluorophosphate, and fluoroalkylphosphate.

The main chain represented by $R^5$ may have a substituent. Examples of the substituent include an alkyl group and an alkoxy group.

The alkyl group in the ionic liquid represented by General Formula (G1) may be either a straight-chain alkyl group or a branched-chain alkyl group. For example, the alkyl group may be an ethyl group or a tert-butyl group. In the ionic liquid represented by General Formula (G1), it is preferred that $R^5$ not have an oxygen-oxygen bond (peroxide). An oxygen-oxygen single bond extremely easily breaks and is reactive; thus, the ionic liquid with the bond might be explosive. Thus, the ionic liquid is not suitable for power storage devices.

The ionic liquid may contain a six-membered heteroaromatic ring. For example, an ionic liquid represented by General Formula (G2) below can be used.

[Chemical Formula 6]

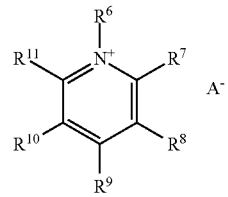

(G2)

In General Formula (G2), $R_6$ is a main chain composed of two or more selected from a C atom, an O atom, a Si atom, an N atom, an S atom, and a P atom; $R_7$ and $R_{11}$ are individually an alkyl group having 1 to 4 hydrogen atoms or carbon atoms; and $A^-$ is any one of a monovalent imide anion, a monovalent amide anion, a monovalent methide anion, a fluorosulfonic acid anion, a fluoroalkyl sulfonic acid anion, tetrafluoroborate, fluoroalkylborate, hexafluorophosphate, and fluoroalkylphosphate.

The main chain represented by $R^6$ may have a substituent. Examples of the substituent include an alkyl group and an alkoxy group.

As an ionic liquid containing a quaternary ammonium cation, an ionic liquid represented by General Formula (G3) below can be used, for example.

[Chemical Formula 7]

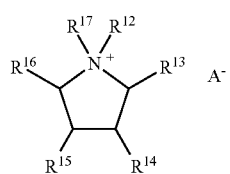
(G3)

In General Formula (G3), $R^{12}$ to $R^{17}$ are individually an alkyl group, a methoxy group, a methoxymethyl group, or a methoxyethyl group each having 1 or more and 20 or less carbon atoms, or a hydrogen atom.

As the ionic liquid, an ionic liquid containing a quaternary ammonium cation and a monovalent anion and represented by General Formula (G4) can be used, for example.

[Chemical Formula 8]

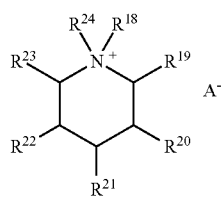
(G4)

In General Formula (G4), $R^{18}$ to $R^{24}$ are individually an alkyl group, a methoxy group, a methoxymethyl group, or a methoxyethyl group each having 1 or more and 20 or less carbon atoms, or a hydrogen atom.

As the ionic liquid, an ionic liquid containing a quaternary ammonium cation and a monovalent anion and represented by General Formula (G5) below can be used, for example.

[Chemical Formula 9]

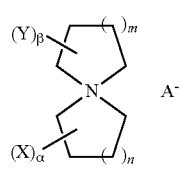
(G5)

In General Formula (G5), n and m are greater than or equal to 1 and less than or equal to 3. Assume that α is greater than or equal to 0 and less than or equal to 6. When n is 1, α is greater than or equal to 0 and less than or equal to 4. When n is 2, α is greater than or equal to 0 and less than or equal to 5. When n is 3, α is greater than or equal to 0 and less than or equal to 6. Assume that β is greater than or equal to 0 and less than or equal to 6. When m is 1, β is greater than or equal to 0 and less than or equal to 4. When m is 2, β is greater than or equal to 0 and less than or equal to 5.

When m is 3, β is greater than or equal to 0 and less than or equal to 6. When α or β is 0, at least one of two aliphatic rings is unsubstituted. Note that the case where both α and β are 0 is excluded. X or Y is a substituent such as a straight-chain or side-chain alkyl group having 1 to 4 carbon atoms, a straight-chain or side-chain alkoxy group having 1 to 4 carbon atoms, or a straight-chain or side-chain alkoxyalkyl group having 1 to 4 carbon atoms. Further, $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

In a quaternary spiro ammonium cation, two aliphatic rings that compose a spiro ring are each a five-membered ring, a six-membered ring, or a seven-membered ring.

Specific examples of the cation represented by General Formula (G1) below include Structural Formulae (111) to (174).

[Chemical Formulae 10]

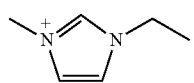
(111)

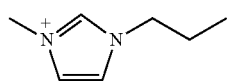
(112)

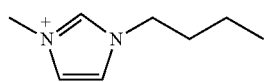
(113)

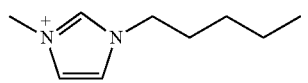
(114)

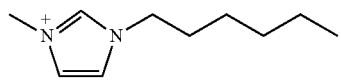
(115)

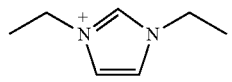
(116)

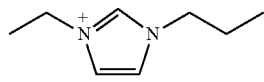
(117)

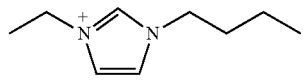
(118)

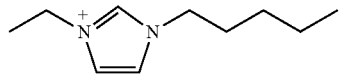
(119)

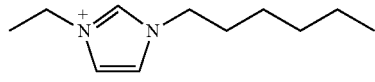
(120)

[Chemical Formulae 11]

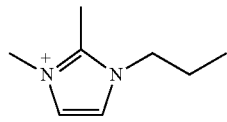
(121)

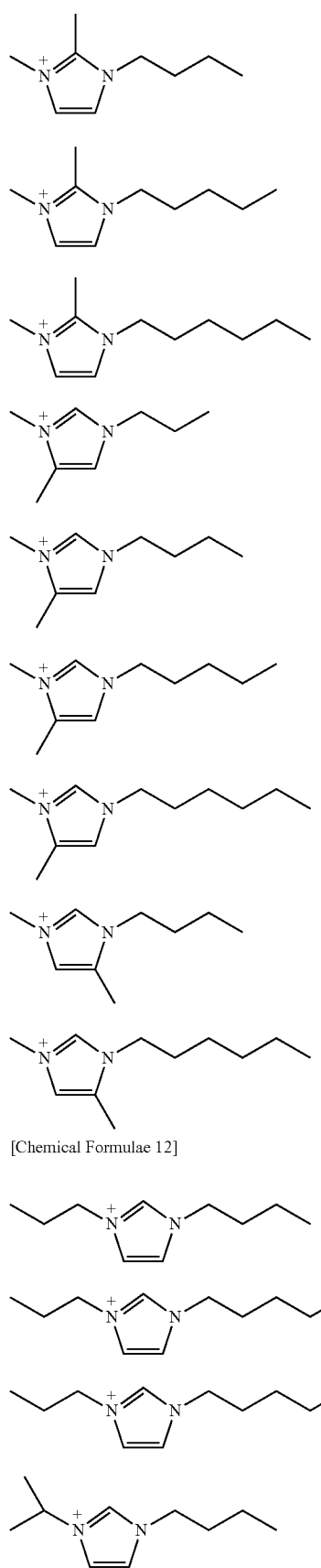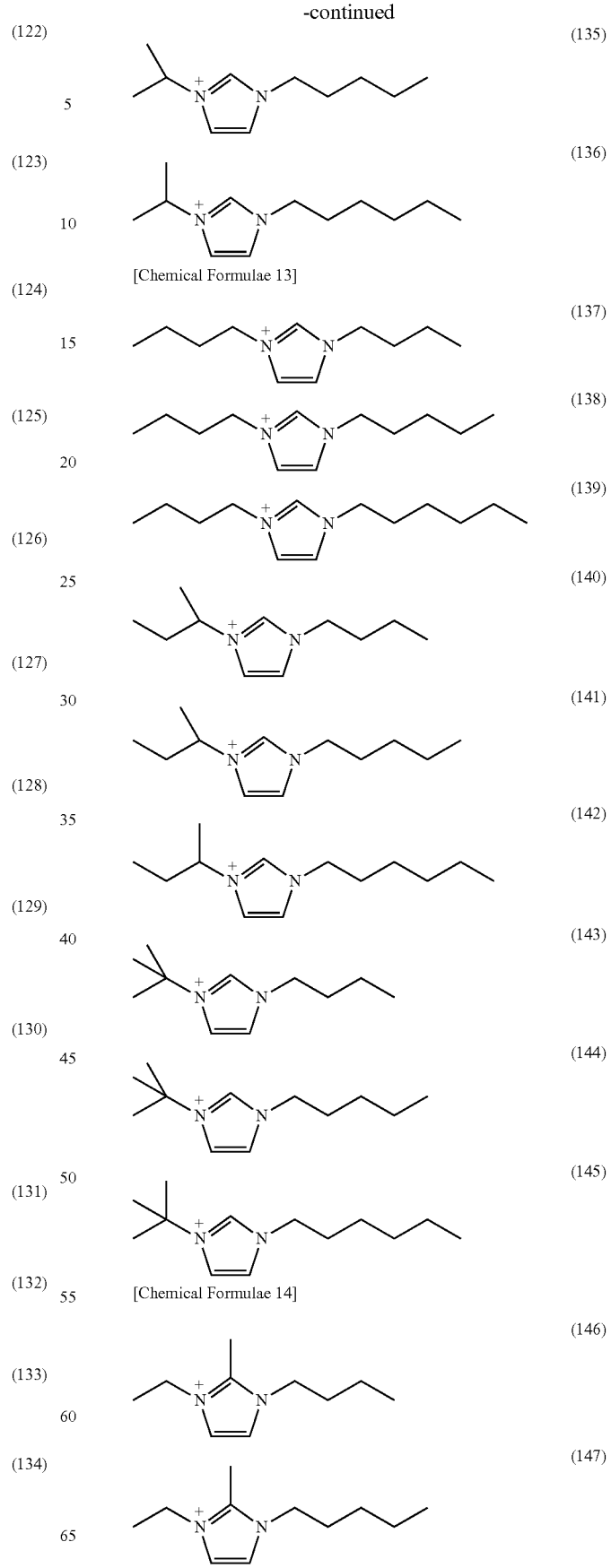

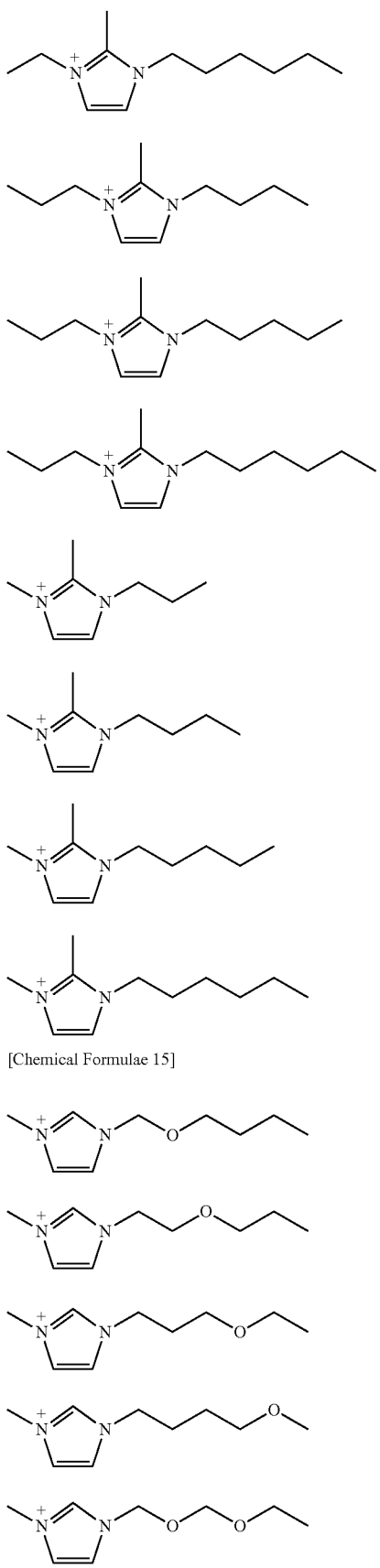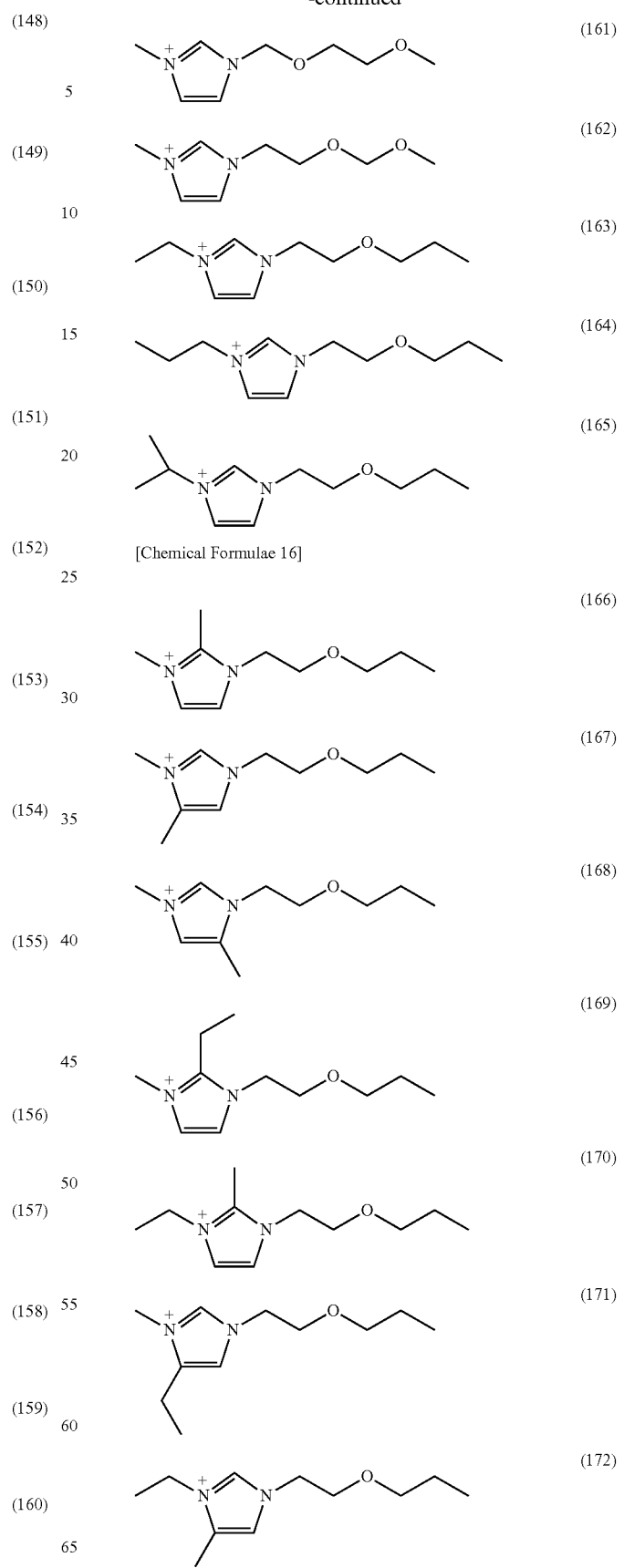

-continued

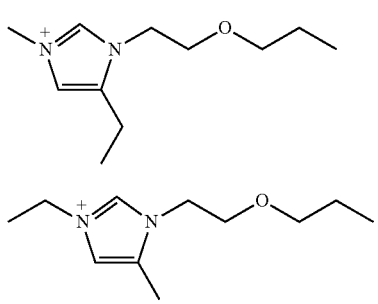

(173)

(174)

This embodiment can be implemented in combination with any of the other embodiments as appropriate.

(Embodiment 3)

In this embodiment, specific structures and fabricating methods of a positive electrode and a negative electrode that can be used for one embodiment of the present invention will be described.

For the negative electrode current collector 504 and the positive electrode current collector 501, any of the materials for the negative electrode current collector 504 and the positive electrode current collector 501 that are described in Embodiment 1 can be used.

As a negative electrode active material, for example, a carbon-based material, an alloy-based material, or the like can be used. Examples of the carbon-based material include graphite, graphitizing carbon (soft carbon), non-graphitizing carbon (hard carbon), a carbon nanotube, graphene, and carbon black. Examples of graphite include artificial graphite such as meso-carbon microbeads (MCMB), coke-based artificial graphite, and pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as relatively high capacity per unit volume, small volume expansion, low cost, and higher level of safety than that of a lithium metal.

For the negative electrode active material, a material which enables charge-discharge reactions by an alloying reaction and a dealloying reaction with lithium can be used. A material containing at least one of Ga, Si, Al, Ge, Sn, Pb, Sb, Bi, Ag, Au, Zn, Cd, In, and the like can be used, for example. Such elements have higher capacity than carbon. In particular, silicon has a significantly high theoretical capacity of 4200 mAh/g. For this reason, silicon is preferably used as the negative electrode active material. Examples of an alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$). A nitride containing lithium and a transition metal is preferably used as the negative electrode active material, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The reaction potential of the negative electrode active material is preferably as low as possible, in which case the voltage of the power storage device can be high. On the other hand, when the potential is low, power of reducing an electrolytic solution is increased, so that an organic solvent or the like in an electrolytic solution might be subjected to reductive decomposition. The range of potentials in which the electrolysis of an electrolytic solution does not occur is referred to as a potential window. The electrode potential of the negative electrode needs to be within a potential window of an electrolytic solution; however, the potentials of many active materials used for negative electrodes of lithium-ion secondary batteries and lithium-ion capacitors are out of the potential windows of almost all electrolytic solutions. Specifically, materials with low reaction potentials such as graphite and silicon can increase the voltage of storage batteries but are likely to cause the reductive decomposition of electrolytic solutions.

As the positive electrode active material, a material into and from which lithium ions can be inserted and extracted can be used; for example, a material having an olivine crystal structure, a layered rock-salt crystal structure, a spinel crystal structure, or a NASICON crystal structure, or the like can be used.

As the positive electrode active material, a compound such as $LiFeO_2$, $LiCoO_2$, $LiNiO_2$, or $LiMn_2O_4$, $V_2O_5$, $Cr_2O_5$, or $MnO_2$ can be used.

Alternatively, lithium-containing complex phosphate with an olivine crystal structure ($LiMPO_4$ (general formula) (M is one or more of Fe(II), Mn(II), Co(II), and Ni(II))) can be used. Typical examples of $LiMPO_4$ are lithium metal phosphate compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, lithium-containing complex silicate such as $Li_{(2-j)}MSiO_4$ (general formula) (M is one or more of Fe(II), Mn(II), Co(II), and Ni(II); 0≤j≤2) may be used. Typical examples of $Li_{(2-j)}MSiO_4$ are lithium silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the NASICON compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, a material with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The average particle size of the positive electrode active material is preferably, for example, greater than or equal to 5 nm and less than or equal to 50 µm.

For example, lithium-containing complex phosphate having an olivine crystal structure used for the positive electrode active material has a one-dimensional lithium diffusion path, so that lithium diffusion is slow. Thus, in the case of using lithium-containing complex phosphate having an olivine crystal structure, the average size of particles of the positive electrode active material is, for example, preferably greater than or equal to 5 nm and less than or equal to 1 µm so that the charge and discharge rate is increased. The specific surface area of the positive electrode active material is, for example, preferably greater than or equal to 10 $m^2/g$ and less than or equal to 50 $m^2/g$.

A positive electrode active material having an olivine crystal structure is much less likely to be changed in the crystal structure by charge and discharge and has a more stable crystal structure than, for example, an active material having a layered rock-salt crystal structure. Thus, a positive electrode active material having an olivine crystal structure is stable toward operation such as overcharge. The use of such a positive electrode active material allows fabrication of a highly safe power storage device.

The negative electrode active material layer 505 and the positive electrode active material layer 502 may each include a conductive additive. Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (acetylene black (AB)) and graphene. Alternatively, metal powder or metal fiber of copper, nickel, aluminum, silver, gold, or the like, a conductive ceramic material, or the like can be used.

Flaky graphene has an excellent electrical characteristics of high conductivity and excellent physical properties of high flexibility and high mechanical strength. For this reason, the use of graphene as the conductive additive can increase the points and the area where the active materials are in contact with each other.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in graphene. When graphene contains oxygen, the proportion of oxygen, which is measured by X-ray photoelectron spectroscopy (XPS), is higher than or equal to 2 at. % and lower than or equal to 20 at. %, preferably higher than or equal to 3 at. % and lower than or equal to 15 at. %.

The negative electrode active material layer 505 and the positive electrode active material layer 502 each preferably include a binder.

The binder preferably contains water-soluble polymers, for example. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, or ethylene-propylene-diene copolymer is preferably used. Any of these rubber materials is more preferably used in combination with the aforementioned water-soluble polymers.

As the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), or polyacrylonitrile (PAN) is preferably used.

Two or more of the above materials may be used in combination for the binder.

Next, methods for fabricating the negative electrode 506 and the positive electrode 503 will be described.
[Fabricating Method of Negative Electrode]

First, a fabricating method of the negative electrode 506 will be described.

In order to form the negative electrode active material layer 505, first, a slurry is formed. The slurry can be formed in such a manner that the above-described material for the negative electrode active material to which a conductive additive, a binder, and the like are added as appropriate is mixed with a solvent, for example. As the solvent, for example, water or N-methyl-2-pyrrolidone (NMP) can be used. Water is preferably used in terms of the safety and cost.

The mixing is performed with a mixer. Here, any of a variety of mixers can be used as the mixer. For example, a planetary mixer, a homogenizer, or the like can be used.

The negative electrode current collector 504 may be subjected to surface treatment. Examples of such surface treatment include corona discharge treatment, plasma treatment, and undercoat treatment. The surface treatment can increase the wettability of the negative electrode current collector 504 with respect to the slurry. In addition, the adhesion between the negative electrode current collector 504 and the negative electrode active material layer 505 can be increased.

Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black, and a carbon nanotube.

Then, the formed slurry is applied to the negative electrode current collector 504.

For the application, a blade method or the like can be used. Furthermore, a continuous coater or the like may be used for the application.

The positive electrode 503 and the negative electrode 506 preferably include tab regions so that a plurality of stacked positive electrodes can be electrically connected to each other and a plurality of stacked negative electrodes can be electrically connected to each other. Furthermore, a lead electrode is preferably electrically connected to the tab region. In at least part of the tab region, the current collector is preferably exposed.

Figure 25A:
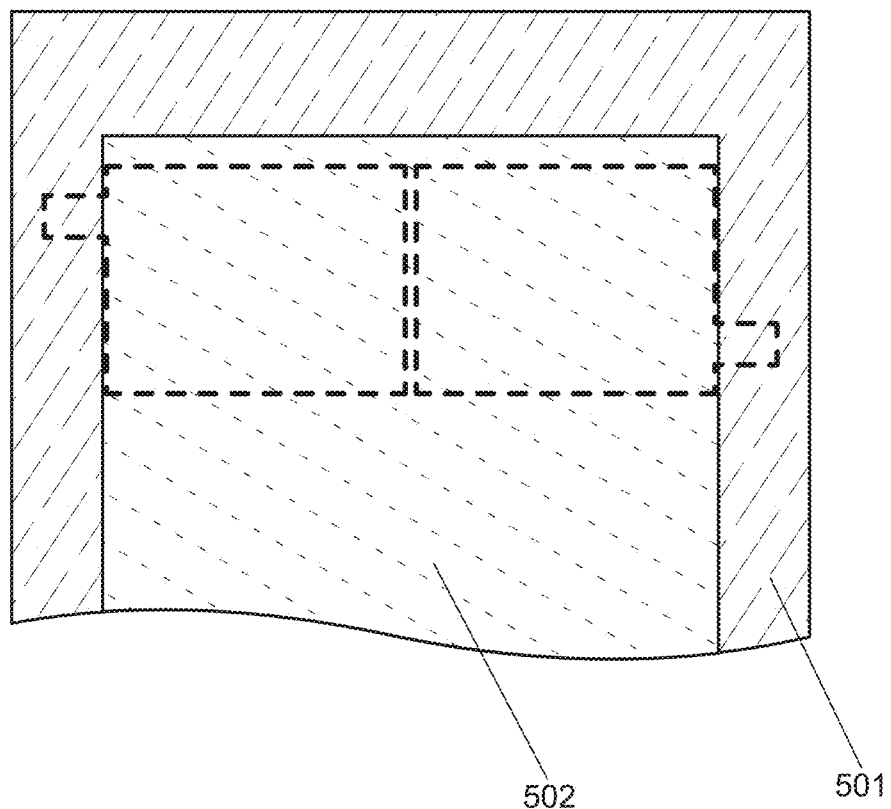
FIGS. 25A and 25B illustrate a method for fabricating an electrode.
Figure 25B:
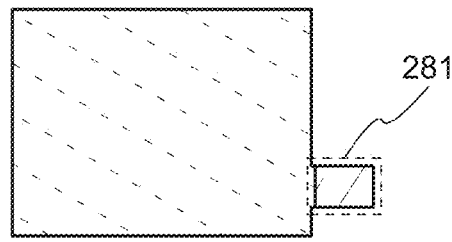

FIGS. 25A and 25B illustrate an example of a method for providing the tab region. FIG. 25A illustrates the example where the positive electrode active material layer 502 is formed over the positive electrode current collector 501 that has a band-like shape. By performing cutting along dotted lines, the positive electrode 503 illustrated in FIG. 25B can be obtained. The positive electrode 503 is fabricated in this manner, whereby the surface of the positive electrode current collector 501 can be exposed in at least part of the tab region 281. An example of the positive electrode 503 is described here, and the tab region 282 of the negative electrode 506 can be provided similarly.

Alternatively, to provide the tab region 281 and the tab region 282, the positive electrode active material layer 502 and the negative electrode active material layer 505 that are applied may be partly removed so that the current collectors are exposed.

Then, the solvent is volatilized from the slurry applied to the negative electrode current collector 504 by a method such as ventilation drying or reduced pressure (vacuum) drying, whereby the negative electrode active material layer 505 is formed. The volatilization of the solvent is preferably performed using, for example, a hot wind at a temperature higher than or equal to 30° C. and lower than or equal to 160° C. There is no particular limitation on the atmosphere.

The thickness of the negative electrode active material layer 505 formed in the above-described manner is preferably greater than or equal to 5 μm and less than or equal to 300 μm, more preferably greater than or equal to 10 μm and less than or equal to 150 μm, for example. The amount of the active material in the negative electrode active material layer 505 is preferably greater than or equal to 2 mg/cm$^2$ and less than or equal to 50 mg/cm$^2$, for example.

Note that the negative electrode active material layer 505 may be formed over only one surface of the negative electrode current collector 504, or the negative electrode active material layers 505 may be formed such that the negative electrode current collector 504 is sandwiched therebetween. Alternatively, the negative electrode active material layers 505 may be formed such that part of the negative electrode current collector 504 is sandwiched therebetween.

The negative electrode active material layer 505 may be pressed by a compression method such as a roll press method or a flat plate press method so as to be consolidated.

Through the above steps, the negative electrode active material layer 505 can be fabricated.

Note that the negative electrode active material layer 505 may be predoped. There is no particular limitation on the method for predoping the negative electrode active material layer 505. For example, the negative electrode active material layer 505 may be predoped electrochemically. For example, before the battery is assembled, the negative electrode active material layer 505 can be predoped with lithium in an electrolytic solution described later with the use of a lithium metal as a counter electrode.

[Fabricating Method of Positive Electrode]

Next, a fabricating method of the positive electrode 503 will be described. For the fabricating method of the positive electrode 503, the fabricating method of the negative electrode 506 can be referred to.

In order to form the positive electrode active material layer 502, first, a slurry is formed. The slurry can be formed in such a manner that any of the above-described materials for a positive electrode active material to which a conductive additive, a binder, and the like are added as appropriate is mixed with a solvent, for example. As the solvent, for example, the solvent that can be used to form the negative electrode active material layer 505 can be used.

The mixing is performed with a mixer as in the case of forming the negative electrode.

The positive electrode current collector 501 may be subjected to surface treatment as in the case of forming the negative electrode.

Then, the positive electrode slurry is applied to the current collector.

Then, the solvent is volatilized from the slurry applied to the positive electrode current collector 501 by a method such as ventilation drying or reduced pressure (vacuum) drying, whereby the positive electrode active material layer 502 is formed. The volatilization of the solvent is preferably performed using, for example, a hot wind at a temperature higher than or equal to 50° C. and lower than or equal to 160° C. There is no particular limitation on the atmosphere.

Note that the positive electrode active material layer 502 may be formed over only one surface of the positive electrode current collector 501, or the positive electrode active material layers 502 may be formed such that the positive electrode current collector 501 is sandwiched therebetween. Alternatively, the positive electrode active material layers 502 may be formed such that part of the positive electrode current collector 501 is sandwiched therebetween.

The positive electrode active material layer 502 may be pressed by a compression method such as a roll press method or a flat plate press method so as to be consolidated.

Through the above steps, the positive electrode active material layer 502 can be fabricated.

The thickness of the positive electrode active material layer 502 formed in the above-described manner is preferably greater than or equal to 5 μm and less than or equal to 300 μm, more preferably greater than or equal to 10 μm and less than or equal to 150 μm, for example. The amount of the active material in the positive electrode active material layer 502 is preferably greater than or equal to 2 mg/cm$^2$ and less than or equal to 50 mg/cm$^2$, for example.

Here, the positive electrode active material layer 502 preferably contains graphene. Graphene is capable of making low-resistance surface contact and has extremely high conductivity even with a small thickness. Therefore, even a small amount of graphene can efficiently form a conductive path in an active material layer.

Here, for example, lithium-containing complex phosphate with an olivine crystal structure used for the positive electrode active material has a one-dimensional lithium diffusion path, so that lithium diffusion is slow. The average size of particles of the active material is thus, for example, preferably greater than or equal to 5 nm and less than or equal to 1 μm so that the charge and discharge rate is increased. The specific surface area of the active material is, for example, preferably greater than or equal to 10 m$^2$/g and less than or equal to 50 m$^2$/g.

In the case where such an active material with a small average particle size (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount be used.

Next, a method for fabricating the positive electrode 503 will be described.

The positive electrode active material layer 502 includes positive electrode active material particles, graphene flakes as a conductive additive, and a binder (not illustrated).

The graphene flakes are dispersed substantially uniformly in the longitudinal cross section of the positive electrode active material layer 502. The graphene flakes are thin films each having a thickness corresponding to the thickness of a single layer or a multi-layer of carbon molecules. The plurality of graphene flakes are formed in such a way as to wrap, coat, or adhere to the surfaces of the plurality of positive electrode active material particles, so that the graphene flakes make surface contact with the positive electrode active material particles. Furthermore, the graphene flakes are also in surface contact with each other; consequently, the plurality of graphene flakes form a three-dimensional network for electric conduction.

This is because graphene oxide with extremely high dispersibility in a polar solvent is used for the formation of the graphene flakes. The solvent is removed by volatilization from a dispersion medium in which graphene oxide is uniformly dispersed, and the graphene oxide is reduced to graphene; hence, the graphene flakes remaining in the positive electrode active material layer 502 partly overlap with each other and are dispersed such that surface contact is made, thereby forming an electrical conduction path.

Unlike a conventional conductive additive in the form of particles, such as acetylene black, which makes point contact with an active material, the graphene flake is capable of making low-resistance surface contact; accordingly, the electrical conduction between the positive electrode active material particles and the graphene flakes can be improved without an increase in the amount of a conductive additive. Thus, the proportion of the positive electrode active material particles in the positive electrode active material layer 502 can be increased. This can increase the discharge capacity of a storage battery.

Although the example of using graphene for the positive electrode is described, graphene can also be used for the negative electrode.

Next, an example of a method for fabricating a positive electrode in which graphene is used as a conductive additive will be described. First, an active material, a binder, and graphene oxide are prepared.

The graphene oxide is a raw material of the graphene flakes that serves as a conductive additive later. Graphene oxide can be formed by various synthesis methods such as a Hummers method, a modified Hummers method, and oxidation of graphite. Note that a method for fabricating a storage battery electrode of the present invention is not limited by the degree of separation of graphene oxide.

For example, the Hummers method is a method for forming graphite oxide by oxidizing graphite such as flake graphite. The obtained graphite oxide is graphite that is oxidized in places and thus to which a functional group such as a carbonyl group, a carboxyl group, or a hydroxyl group is bonded. In the graphite oxide, the crystallinity of the graphite is lost and the distance between layers is increased. Therefore, the layers can be easily separated by ultrasonic treatment or the like to obtain graphene oxide.

The length of one side (also referred to as a flake size) of the graphene oxide is greater than or equal to 50 nm and less than or equal to 100 μm, preferably greater than or equal to 800 nm and less than or equal to 20 μm. Particularly in the case where the flake size is smaller than the average particle size of the positive electrode active material particles, the surface contact with a plurality of the positive electrode active material particles and connection between graphene flakes become difficult, resulting in difficulty in improving the electrical conductivity of the positive electrode active material layer 502.

A positive electrode slurry is formed by adding a solvent to such graphene oxide, an active material, and a binder. As the solvent, water or a polar organic solvent such as N-methylpyrrolidone (NMP) or dimethylformamide can be used.

With the use of the active material layer including the active material particles, graphene, and the binder in the above-described manner, a graphene flake and part of the alloy-based material particles have a surface contact so that the flake surrounds the particles, and graphene flakes also have surface contact to overlap with each other; thus, an extensive network of three-dimensional electric conduction paths is established in the active material layer. For this reason, it is possible to form an active material layer with higher electric conductivity than a negative electrode active material layer including acetylene black (AB) particles or ketjen black (KB) particles, which are conventionally used as a conductive additive and have an electrical point contact with an active material.

Furthermore, graphene is preferably used because even in the case of using, for example, an active material with a small particle size, the conductive path can be maintained even after charges and discharges are repeatedly performed. Thus, favorable cycle characteristics can be achieved.

Graphene flakes are bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the power storage device can be increased.

In the case where the positive electrode active material layer 502 includes a binder, the binder described in Embodiment 1 is used, for example. One example is PVdF, which has high resistance to oxidation and is stable even in the case where the battery reaction potential of the positive electrode is high. Another example is water-soluble polymers, which have high dispensability and can be evenly dispersed with small active material particles. Thus, water-soluble polymers can function even in a smaller amount. A film containing water-soluble polymers that covers or is in contact with the surface of an active material can inhibit the decomposition of an electrolytic solution.

Note that the amount of graphene oxide is set to 0.1 wt % to 10 wt % inclusive, preferably 0.1 wt % to 5 wt % inclusive, more preferably 0.2 wt % to 1 wt % inclusive with respect to the total weight of the mixture of the graphene oxide, the positive electrode active material, the conductive additive, and the binder. In contrast, graphene obtained after the positive electrode slurry is applied to a current collector and reduction is performed is included at least at 0.05 wt % to 5 wt % inclusive, preferably 0.05 wt % to 2.5 wt % inclusive, more preferably 0.1 wt % to 0.5 wt % inclusive with respect to the total weight of the positive electrode active material layer. This is because the weight of graphene obtained by reducing graphene oxide is approximately half that of the graphene oxide.

Note that a polar solvent may be further added after the mixing so that the viscosity of the mixture can be adjusted. Mixing and addition of a polar solvent may be repeated more than once.

The positive electrode active material layer 502 may be pressed by a compression method such as a roll press method or a flat plate press method so as to be consolidated.

Then, graphene oxide is preferably reduced by heat treatment or with the use of a reducing agent, for example.

An example of a reducing method using a reducing agent will be described below. First, a reaction is caused in a solvent containing a reducing agent. Through this step, the graphene oxide contained in the active material layer is reduced to form the graphene flakes. Note that it is possible that oxygen in the graphene oxide is not necessarily entirely released and may partly remain in the graphene. When the graphene flakes contain oxygen, the proportion of oxygen in the graphene flakes measured by XPS is higher than or equal to 2 at. % and lower than or equal to 20 at. %, preferably higher than or equal to 3 at. % and lower than or equal to 15 at. %. This reduction treatment is preferably performed at higher than or equal to room temperature and lower than or equal to 150° C.

Examples of the reducing agent include ascorbic acid, hydrazine, dimethyl hydrazine, hydroquinone, sodium boron hydride ($NaBH_4$), tetra butyl ammonium bromide (TBAB), $LiAlH_4$, ethylene glycol, polyethylene glycol, N,N-diethylhydroxylamine, and a derivative thereof.

A polar solvent can be used as the solvent. Any material can be used for the polar solvent as long as it can dissolve the reducing agent. Examples of the material of the polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

After that, washing and drying are performed to volatilize the solvent. The solvent is preferably volatilized under a reduced pressure (in vacuum) or in a reduction atmosphere. The volatilization of the solvent is preferably performed in such a manner that heating is performed, for example, in vacuum at a temperature higher than or equal to 50° C. and lower than or equal to 160° C. for longer than or equal to 10 minutes and shorter than or equal to 48 hours. The heating allows evaporation, volatilization, or removal of the polar solvent and moisture in the positive electrode active material layer 502. The volatilization of the solvent may be followed by pressing.

Alternatively, the solvent may be volatilized using a drying furnace or the like. In the case of using a drying furnace, heating is performed at 30° C. to 200° C. inclusive for longer than or equal to 30 seconds and shorter than or equal to 20 minutes, for example. The temperature may be increased in stages.

Note that heating can facilitate the reduction reaction caused using the reducing agent. After drying following the chemical reduction, heating may further be performed.

In the case of not performing reduction with the use of a reducing agent, reduction can be performed by heat treatment. For example, reduction by heat treatment can be performed under a reduced pressure (in vacuum) at a temperature higher than or equal to 150° C. for longer than or equal to 0.5 hours and shorter than or equal to 30 hours.

Through the above steps, the positive electrode active material layer 502 in which the positive electrode active material particles and the graphene flakes are uniformly dispersed can be formed.

Here, reduction is preferably performed on an electrode using graphene oxide. It is more preferred that reduction be performed in such a manner that chemical reduction and thermal reduction are performed in this order. In thermal reduction, oxygen atoms are released in the form of, for example, carbon dioxide. In contrast, in chemical reduction, reduction is performed using a chemical reaction, whereby the proportion of carbon atoms that form an $sp^2$ bond of graphene can be high. Furthermore, thermal reduction is preferably performed after chemical reduction, in which case the conductivity of formed graphene can be further increased.

The use of $LiFePO_4$ for the positive electrode allows fabrication of a highly safe storage battery that is stable to an external load such as overcharge. Such a storage battery is particularly suitable for, for example, a mobile device, a wearable device, and the like.

Here, the ratio of the capacity of a positive electrode of a storage battery to the capacity of a negative electrode of the storage battery will be described. A variable R defined by Mathematical Formula 1 below is the ratio of positive electrode capacity to negative electrode capacity. Here, positive electrode capacity means the capacity of the positive electrode of the storage battery, and negative electrode capacity means the capacity of the negative electrode of the storage battery.

[Mathematical Formula 1]

$$R = \frac{\text{Positive electrode capacity}}{\text{Negative electrode capacity}} \times 100 [\%] \quad (1)$$

Here, the theoretical capacity or the like may be used for calculation of the positive electrode capacity and the negative electrode capacity. Alternatively, capacity based on a measured value or the like may be used. For example, in the case where $LiFePO_4$ and graphite are used, the capacity per unit weight of the active material of $LiFePO_4$ is 170 mAh/g, and that of graphite is 372 mAh/g.

This embodiment can be implemented in combination with any of the other embodiments as appropriate.

(Embodiment 4)

In this embodiment, a variety of modes of power storage devices fabricated according to one embodiment of the present invention will be described.

[Structural Example of Storage Battery Using Wound Body]

Next, FIGS. 47A and 47B and FIGS. 48A and 48B illustrate structural examples of a storage battery using a wound body that is a power storage device fabricated according to one embodiment of the present invention. A wound body 993 illustrated in FIGS. 47A and 47B includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 47A:
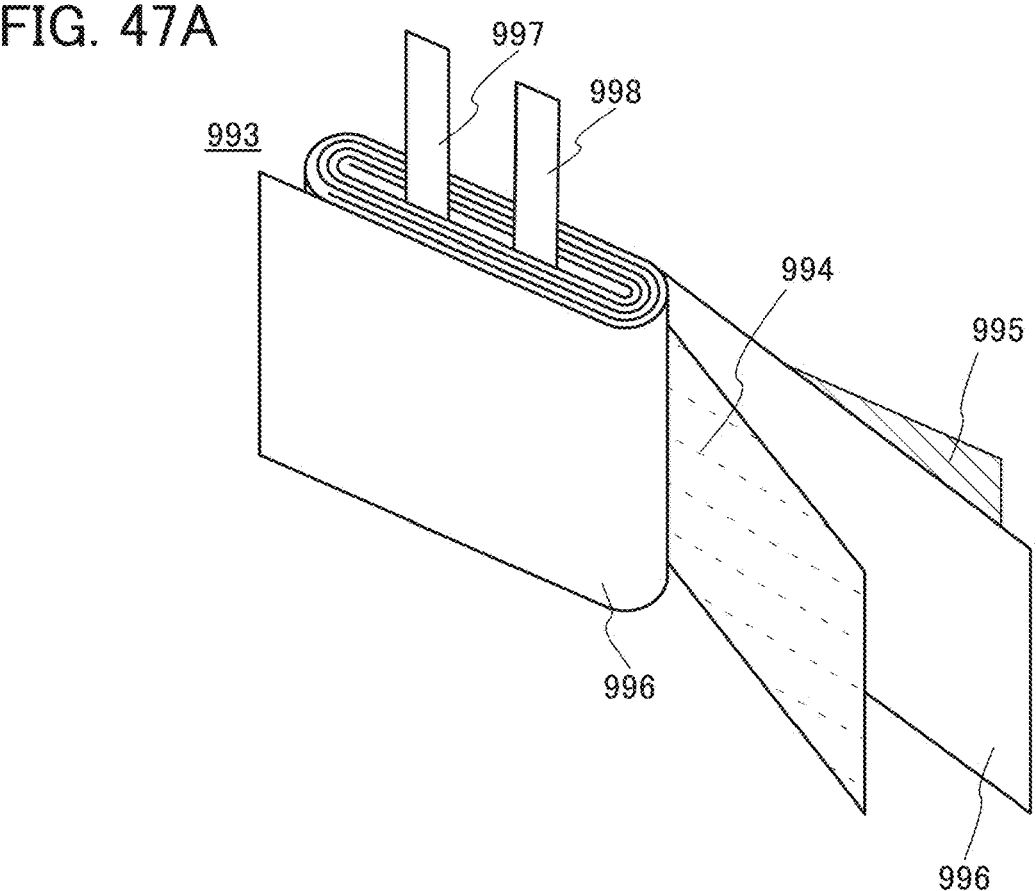
FIGS. 47A and 47B illustrate an example of a power storage device.
Figure 47B:
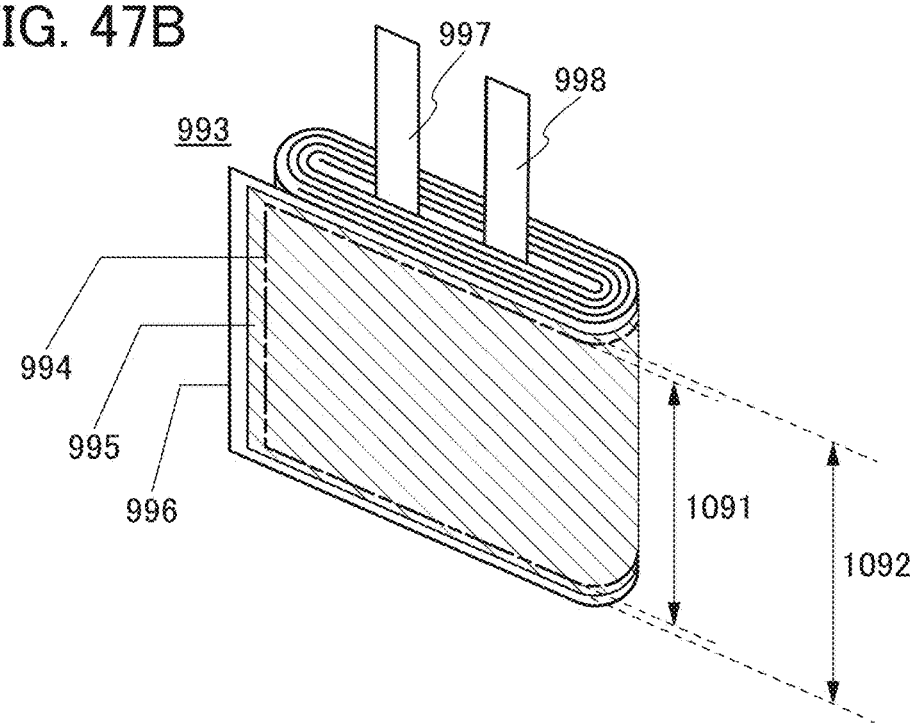

The area of a region where the negative electrode 994 does not overlap with the positive electrode 995 is preferably as small as possible. FIG. 47B illustrates the example where a width 1091 of the negative electrode 994 in the wound body 993 is smaller than a width 1092 of the positive electrode 995. In addition, an end portion of the negative electrode 994 is located inside a region between end portions of the positive electrode 995. With such a structure, the negative electrode 994 can entirely overlap with the positive electrode 995 or the area of a region where the negative electrode 994 and the positive electrode 995 do not overlap with each other can be reduced.

In the case where the area of the positive electrode 995 is too larger than that of the negative electrode 994, an excess portion of the positive electrode 995 is large, which reduces the capacity of a storage battery per unit volume, for example. Thus, in the case where the end portion of the negative electrode 994 is located inside a region between the end portions of the positive electrode 995, the distance between the end portion of the positive electrode 995 and the end portion of the negative electrode 994 is preferably 3 mm or less, more preferably 0.5 mm or less, still more preferably 0.1 mm or less. Alternatively, the difference between the widths of the positive electrode 995 and the negative electrode 994 is preferably 6 mm or less, more preferably 1 mm or less, still more preferably 0.2 mm or less.

Alternatively, it is preferred that the widths 1091 and 1092 be approximately equal values and the end portion of the negative electrode 994 be substantially aligned with the end portion of the positive electrode 995.

Figure 48A:
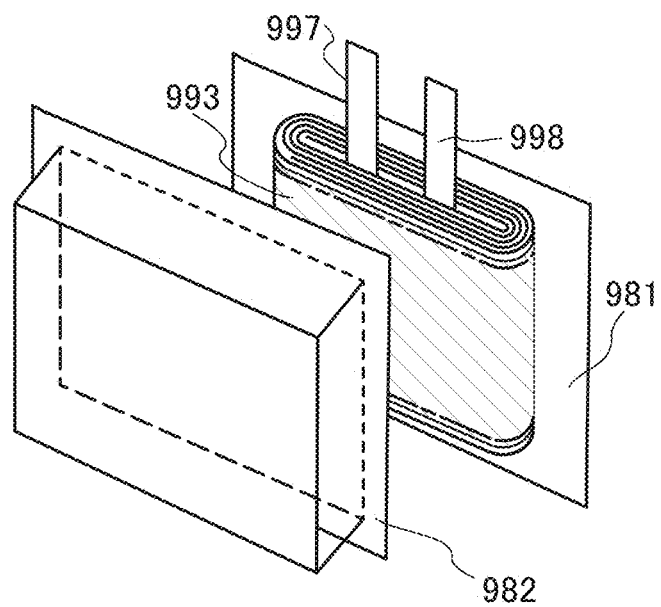
FIGS. 48A and 48B illustrate an example of a power storage device.
Figure 48B:
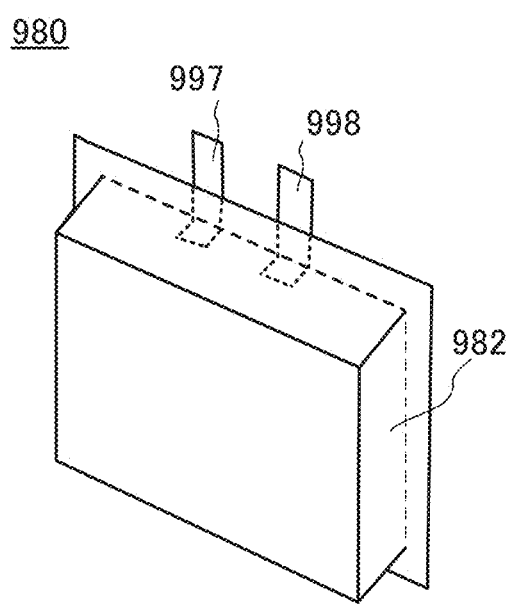

In a storage battery 980 illustrated in FIGS. 48A and 48B, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 48A and 48B illustrate an example where a space is formed by two films, the wound body 993 may be placed in a space formed by bending one film.

Furthermore, in fabricating a flexible power storage device, a resin material or the like can be used for an exterior body and a sealed container of the power storage device. Note that in the case where a resin material is used for the exterior body and the sealed container, a conductive material is used for a portion connected to the outside.

Figure 49A:
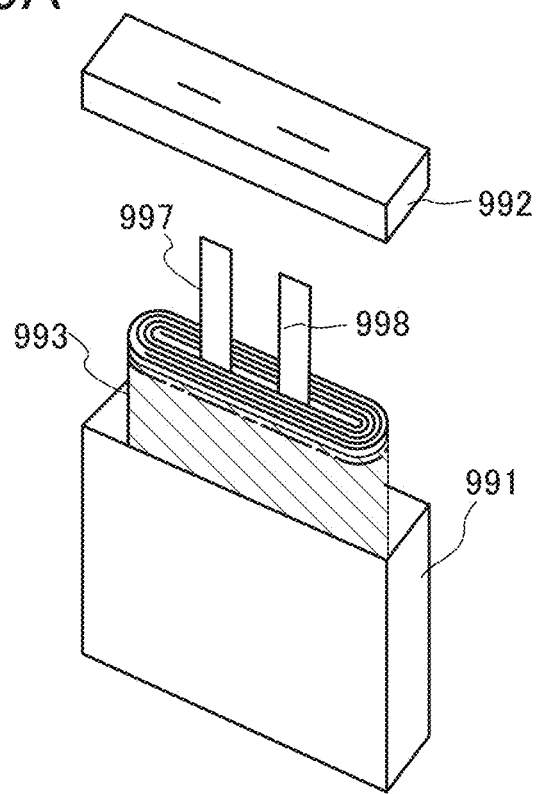
FIGS. 49A and 49B illustrate an example of a power storage device.
Figure 49B:
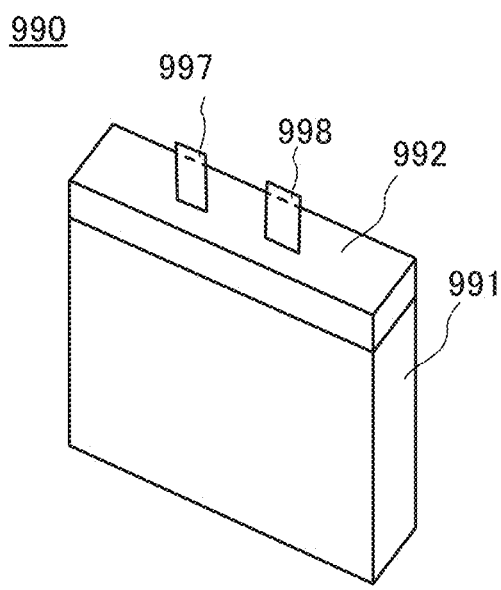

FIGS. 49A and 49B illustrate an example of a thin storage battery that is different from the storage battery in FIGS. 48A and 48B. The wound body 993 illustrated in FIG. 49A is the same as that illustrated in FIGS. 47A and 47B and FIG. 48A, and the detailed description thereof is omitted.

In the storage battery 990 illustrated in FIGS. 49A and 49B, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

[Cylindrical Storage Battery]

Figure 50A:
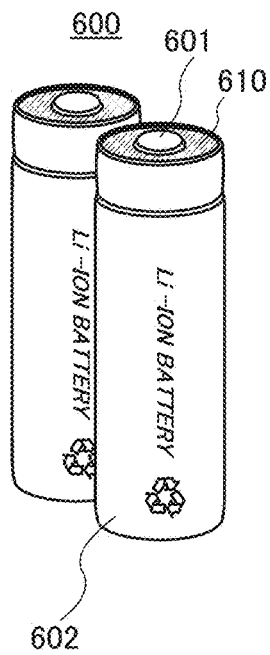
FIGS. 50A and 50B illustrate a cylindrical storage battery.

Next, a cylindrical storage battery will be described as an example of a power storage device using a wound body as in FIGS. 47A and 47B, FIGS. 48A and 48B, and FIGS. 49A and 49B. The cylindrical storage battery will be described with reference to FIGS. 50A and 50B. As illustrated in FIG. 50A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 50B:
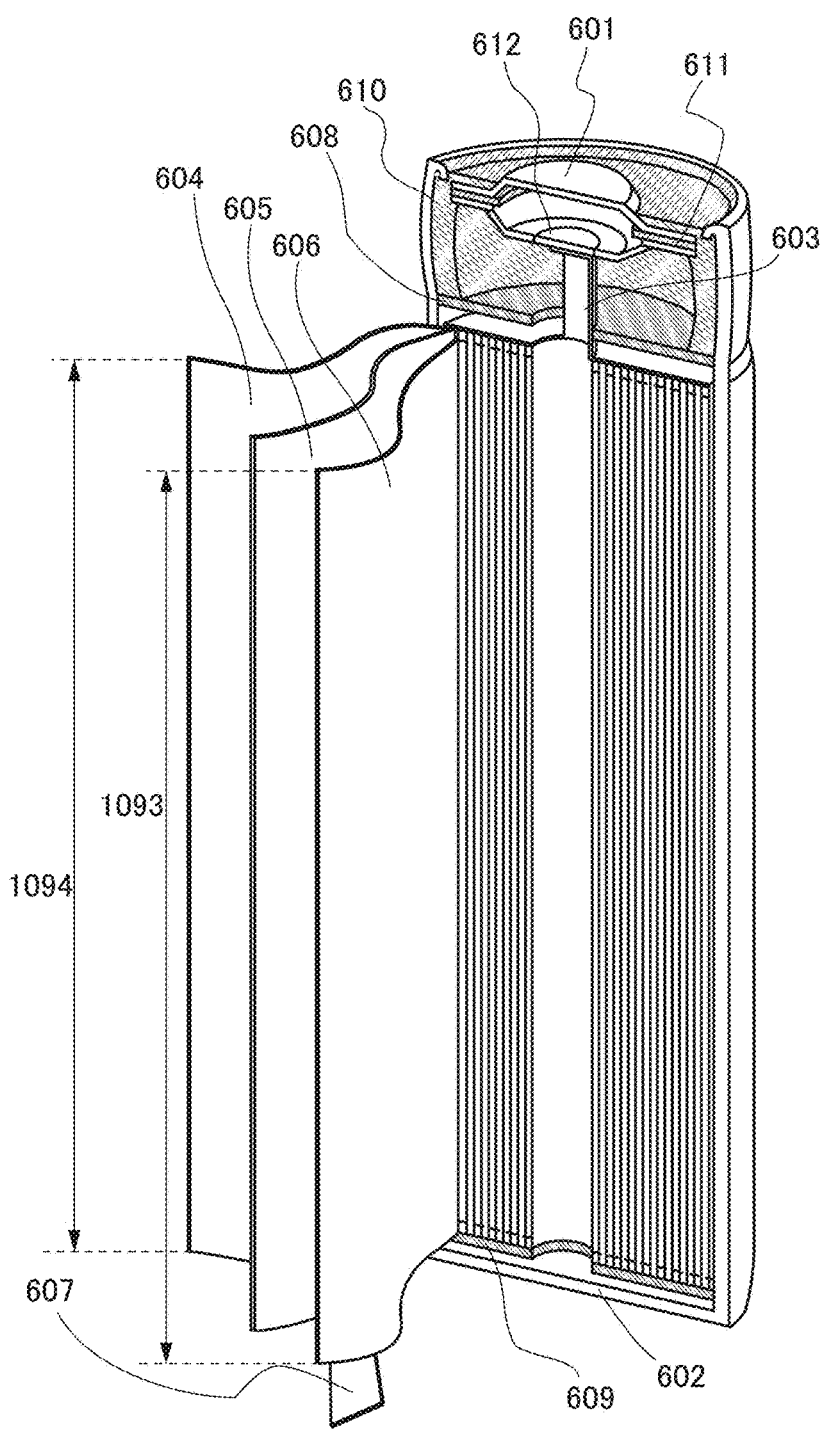

FIG. 50B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a non-aqueous electrolytic solution (not illustrated) is injected inside the battery can 602 provided with the battery element.

As the nonaqueous electrolytic solution, a nonaqueous electrolytic solution that is similar to those of the coin-type storage battery can be used.

The positive electrode 604 and the negative electrode 606 can be formed in a manner similar to that of the positive electrode and the negative electrode of the thin storage battery described above. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

The area of a region where the negative electrode 606 does not overlap with the positive electrode 604 is preferably as small as possible. For example, an end portion of the negative electrode 606 is located inside a region between end portions of the positive electrode 604. Furthermore, the distance between the end portion of the positive electrode 604 and the end portion of the negative electrode 606 is preferably 3 mm or less, more preferably 0.5 mm or less, still more preferably 0.1 mm or less. Alternatively, the difference between a width 1094 of the positive electrode 604 and a width 1093 of the negative electrode 606 is preferably 6 mm or less, more preferably 1 mm or less, still more preferably 0.2 mm or less.

Alternatively, it is preferred that the widths 1093 and 1094 be approximately equal values and the end portion of the negative electrode 606 be substantially aligned with the end portion of the positive electrode 604.

[Coin-type Storage Battery]

Figure 51A:
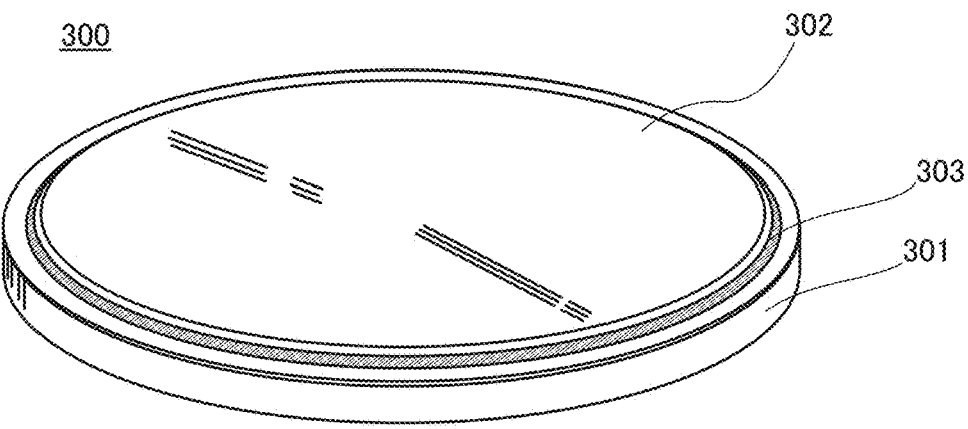
FIGS. 51A to 51C illustrate a coin-type storage battery.
Figure 51B:
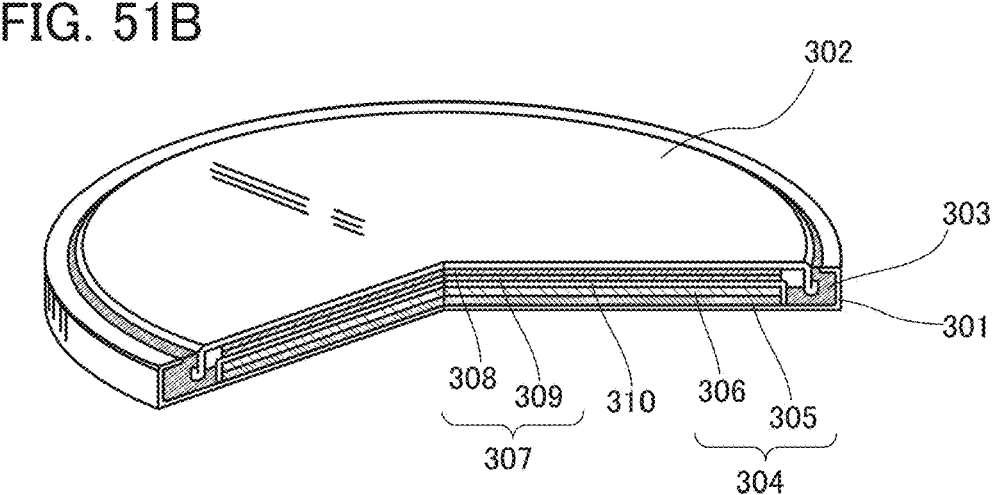
Figure 51C:
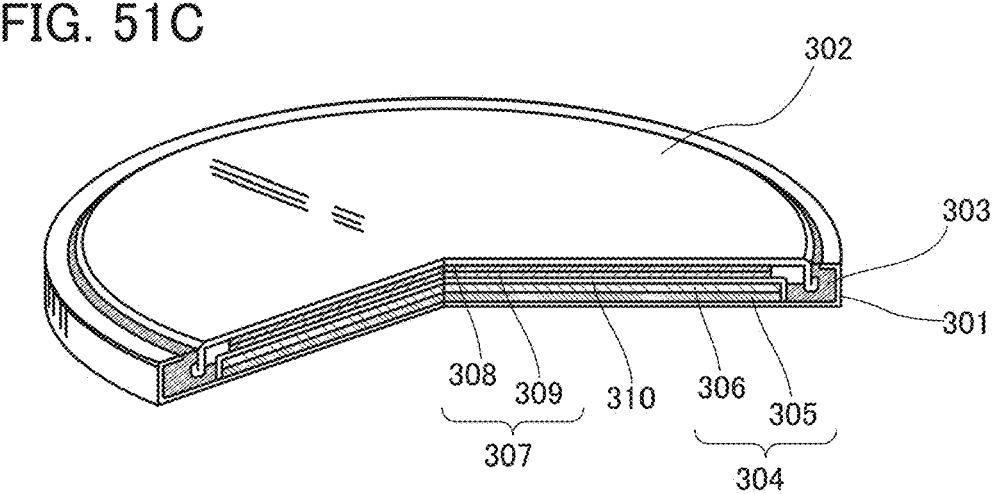

Next, an example of a coin-type storage battery, which is a storage battery fabricated according to one embodiment of the present invention, will be described as an example of a power storage device with reference to FIGS. 51A to 51C. FIG. 51A is an external view of a coin-type (single-layer flat type) storage battery, and FIGS. 51B and 51C are cross-sectional views thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The description of the positive electrode active material layer 502 can be referred to for the positive electrode active material layer 306.

A negative electrode 307 includes a negative electrode current collector 308 and a negative electrode active material layer 309 provided in contact with the negative electrode current collector 308. The description of the negative electrode active material layer 505 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

It is preferred that the shape and area of the positive electrode 304 be preferably substantially the same as those of the negative electrode 307 and an end portion of the positive electrode 304 be substantially aligned with an end portion of the negative electrode 307. FIG. 51B illustrates an example where the end portion of the positive electrode 304 is aligned with the end portion of the negative electrode 307.

Alternatively, it is preferred that the area of the negative electrode 307 be larger than that of the positive electrode 304 and the end portion of the positive electrode 304 be located inside a region between the end portions of the negative electrode 307. FIG. 51C illustrates an example where the end portion of the positive electrode 304 is located inside a region between the end portions of the negative electrode 307.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIGS. 51B and 51C, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be fabricated.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

[Structural Example of Power Storage System]

Structural examples of power storage systems will be described with reference to FIGS. 52A and 52B, FIGS. 53A1 to 53B2, and FIGS. 54A and 54B. Here, a power storage system refers to, for example, a device including a power storage device. The power storage system described in this embodiment includes a storage battery that is a power storage device fabricated according to one embodiment of the present invention.

Figure 52A:
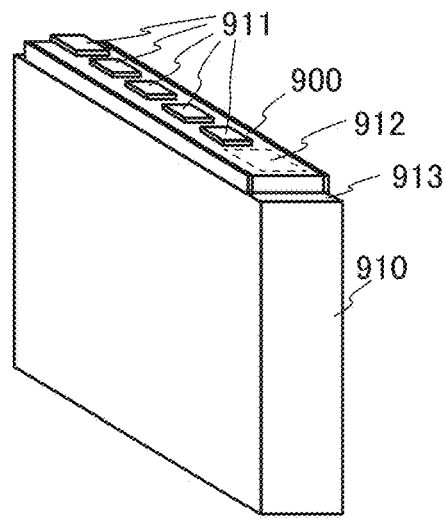
FIGS. 52A and 52B illustrate an example of a power storage system.
Figure 52B:
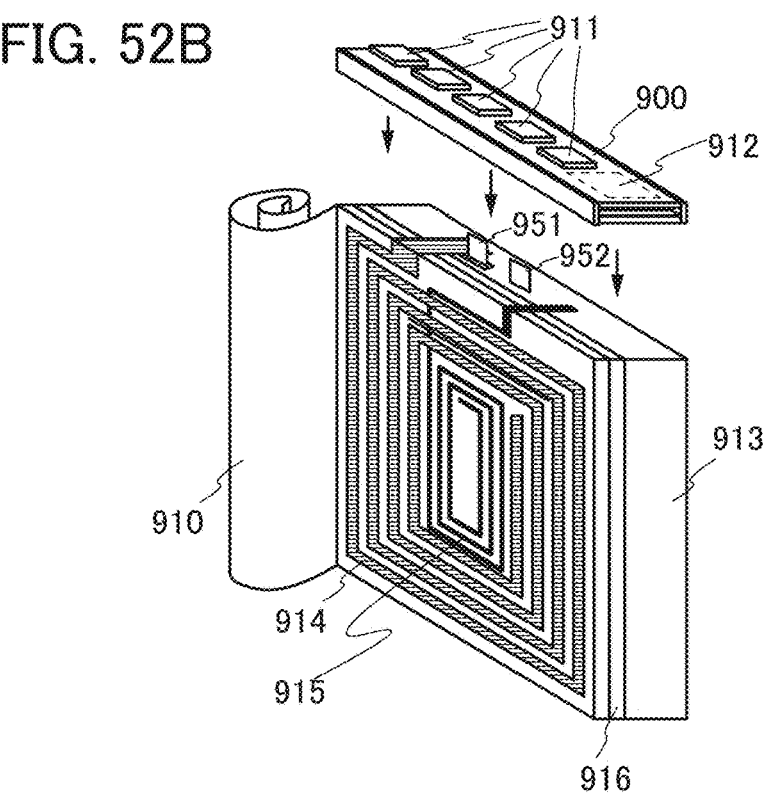

FIGS. 52A and 52B are external views of a power storage system. The power storage system includes a circuit board 900 and a storage battery 913. A label 910 is attached to the storage battery 913. As shown in FIG. 52B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 52A and 52B.

For example, as shown in FIGS. 53A1 and 53A2, two opposite surfaces of the storage battery 913 in FIGS. 52A and 52B may be provided with respective antennas. FIG. 53A1 is an external view showing one side of the opposite surfaces, and FIG. 53A2 is an external view showing the other side of the opposite surfaces. For portions similar to those in FIGS. 52A and 52B, the description of the power storage system illustrated in FIGS. 52A and 52B can be referred to as appropriate.

As illustrated in FIG. 53A1, the antenna 914 is provided on one of the opposite surfaces of the storage battery 913 with the layer 916 interposed therebetween, and as illustrated in FIG. 53A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 53B1 and 53B2, two opposite surfaces of the storage battery 913 in FIGS. 52A and 52B may be provided with different types of antennas. FIG. 53B1 is an external view showing one side of the opposite surfaces, and FIG. 53B2 is an external view showing the other side of the opposite surfaces. For portions similar to those in FIGS. 52A and 52B, the description of the power storage system illustrated in FIGS. 52A and 52B can be referred to as appropriate.

As illustrated in FIG. 53B1, the antennas 914 and 915 are provided on one of the opposite surfaces of the storage battery 913 with the layer 916 interposed therebetween, and as illustrated in FIG. 53B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 54A:
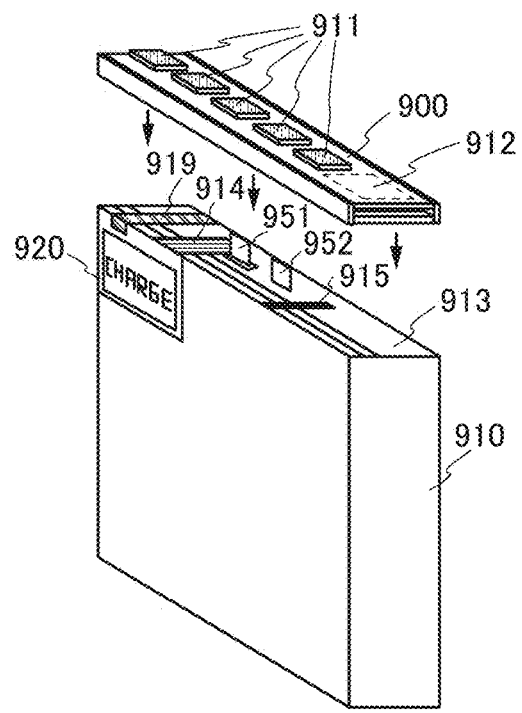
FIGS. 54A and 54B each illustrate an example of a power storage system.

Alternatively, as illustrated in FIG. 54A, the storage battery 913 in FIGS. 52A and 52B may be provided with a display device 920. The display device 920 is electrically connected to the terminal 911 via a terminal 919. It is possible that the label 910 is not provided in a portion where the display device 920 is provided. For portions similar to those in FIGS. 52A and 52B, the description of the power storage system illustrated in FIGS. 52A and 52B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 54B:
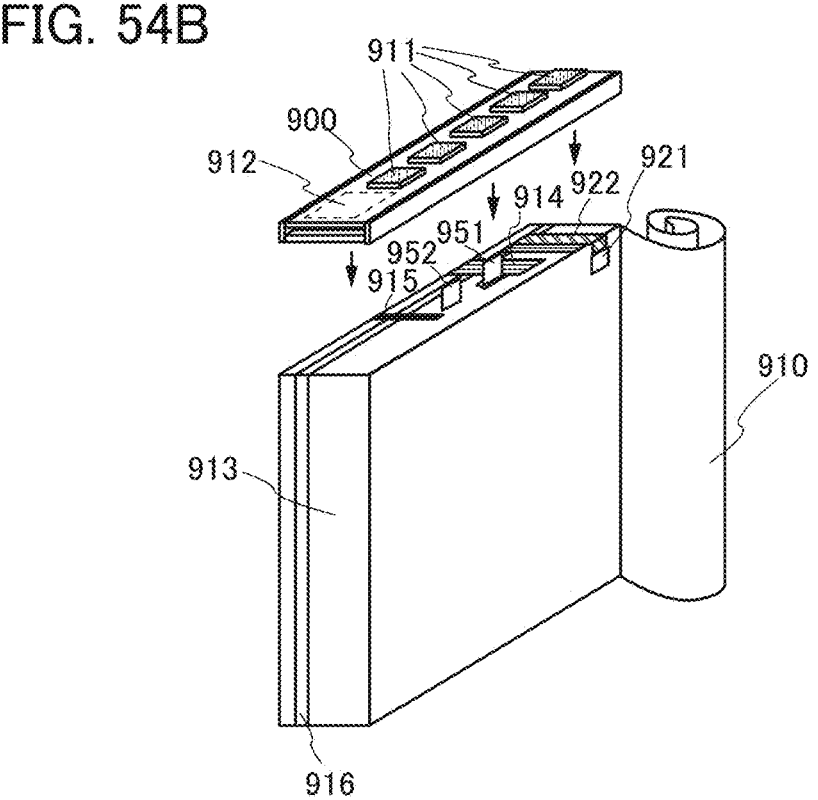

Alternatively, as illustrated in FIG. 54B, the storage battery 913 illustrated in FIGS. 52A and 52B may be provided with a sensor 921. The sensor 921 is electrically connected to the terminal 911 via a terminal 922. For portions similar to those in FIGS. 52A and 52B, the description of the power storage system illustrated in FIGS. 52A and 52B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

(Embodiment 5)

In this embodiment, an example of an electronic device including a flexible storage battery that is a power storage device fabricated according to one embodiment of the present invention will be described.

FIGS. 55A to 55G illustrate examples of electronic devices including the flexible storage batteries described in Embodiment 2. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 55A:
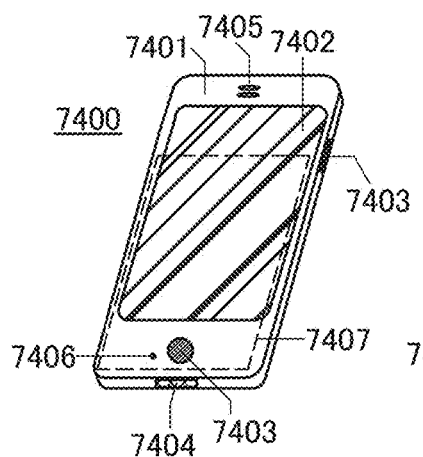
FIGS. 55A to 55G illustrate examples of electronic devices.

FIG. 55A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 55B:
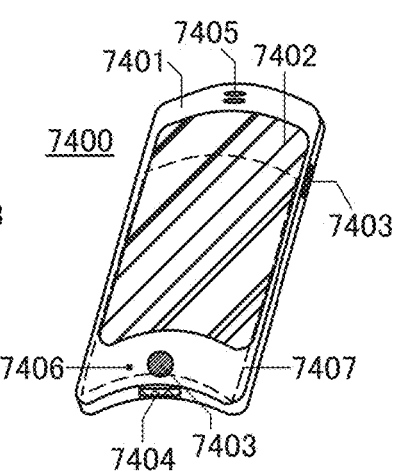
Figure 55C:
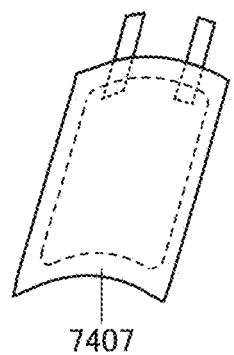

FIG. 55B illustrates the mobile phone 7400 that is curved. When the whole mobile phone 7400 is curved by the external force, the power storage device 7407 included in the mobile phone 7400 is also bent. FIG. 55C illustrates the bent power storage device 7407. The power storage device 7407 is a thin storage battery. The power storage device 7407 is fixed in a state of being curved. Note that the power storage device 7407 includes a lead electrode electrically connected to a current collector.

Figure 55D:
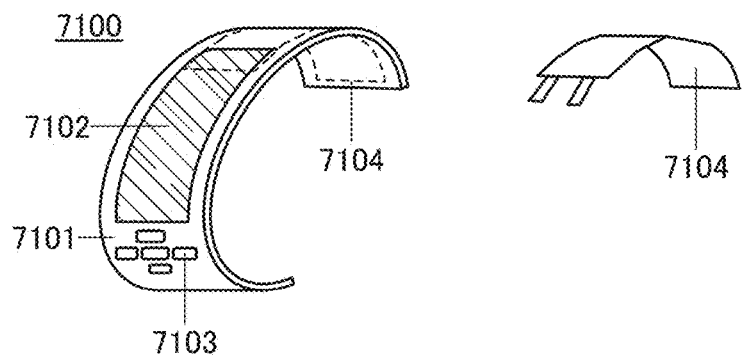
Figure 55E:
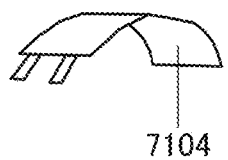

FIG. 55D illustrates an example of a bangle display device. A portable display device 7100 includes a housing 7101, a display portion 7102, an operation button 7103, and a power storage device 7104. FIG. 55E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 55F:
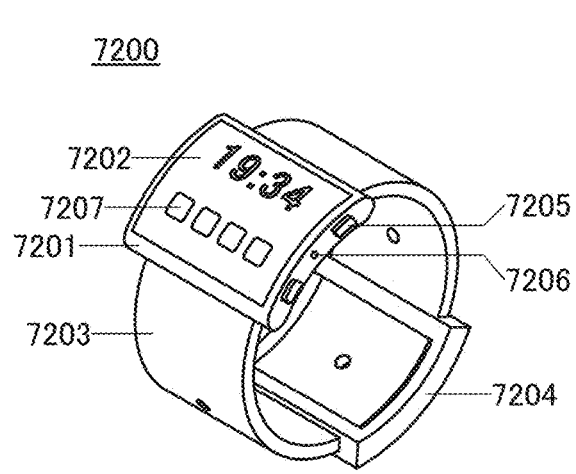

FIG. 55F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as power on/off, on/off of wireless communication, setting and cancellation of a manner mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 55E that is in the state of being curved can be provided in the housing 7201. Alternatively, the power storage device 7104 illustrated in FIG. 55E can be provided in the band 7203 such that it can be curved.

Figure 55G:
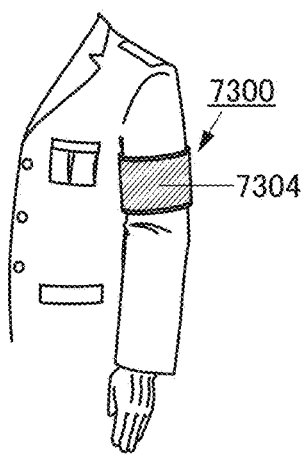

FIG. 55G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

(Embodiment 6)

In this embodiment, examples of electronic devices that can include power storage devices will be described.

Figure 56A:
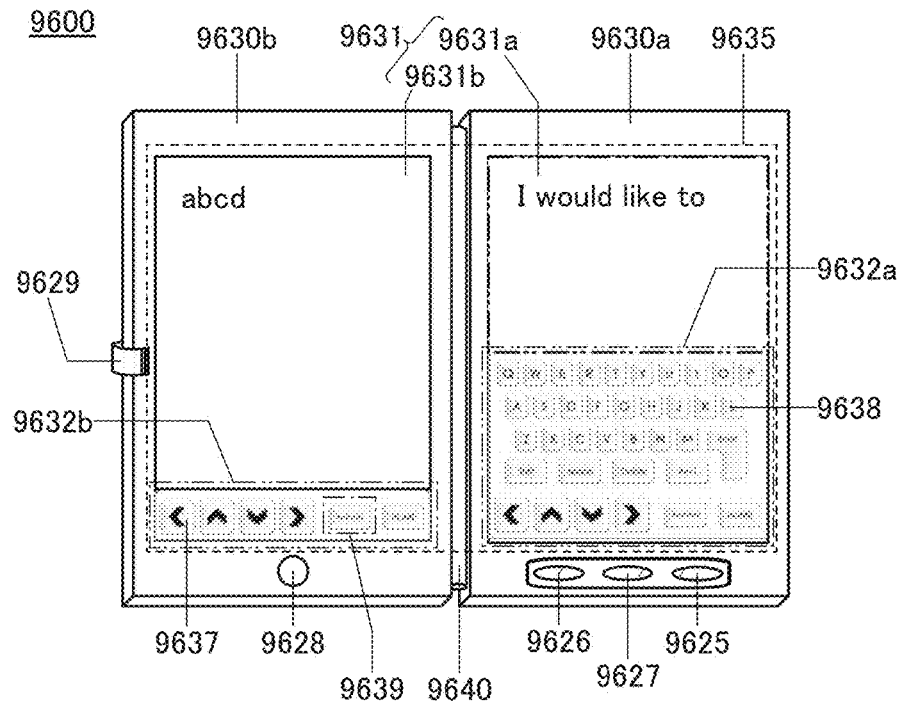
FIGS. 56A to 56C illustrate an example of an electronic device.
Figure 56B:
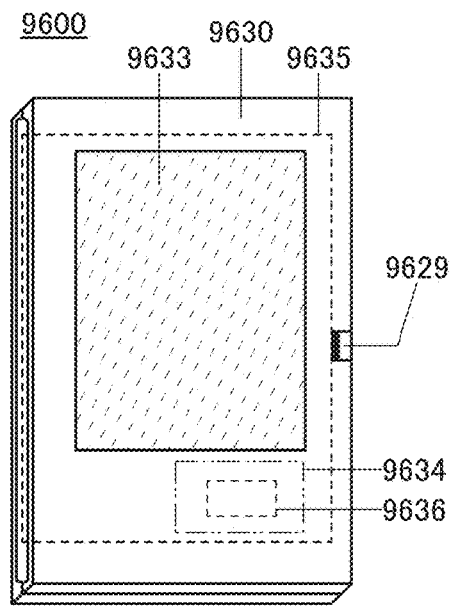

FIGS. 56A and 56B illustrate an example of a tablet terminal that can be folded in half. A tablet terminal 9600 illustrated in FIGS. 56A and 56B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 56A illustrates the tablet terminal 9600 that is opened, and FIG. 56B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a, and data can be input by touching operation keys 9638 that are displayed. Note that FIG. 56A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 56A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 56B. The tablet terminal includes the housing 9630, a solar cell 9633, and a charge and discharge control circuit 9634 including a DC-DC converter 9636. The power storage unit of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 56A and 56B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 56C:
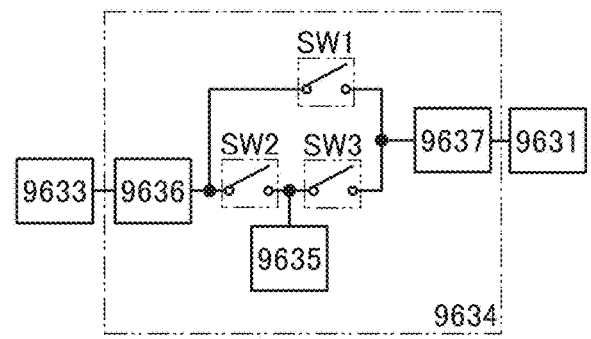

The structure and operation of the charge and discharge control circuit 9634 illustrated in FIG. 56B will be described with reference to a block diagram in FIG. 56C. The solar cell 9633, the power storage unit 9635, the DC-DC converter 9636, a converter 9637, switches SW1 to SW3, and the display portion 9631 are illustrated in FIG. 56C. The power storage unit 9635, the DC-DC converter 9636, the converter 9637, and the switches SW1 to SW3 correspond to the charge and discharge control circuit 9634 in FIG. 56B.

First, an example of operation when electric power is generated by the solar cell 9633 using external light will be described. The voltage of electric power generated by the solar cell is raised or lowered by the DC-DC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 57:
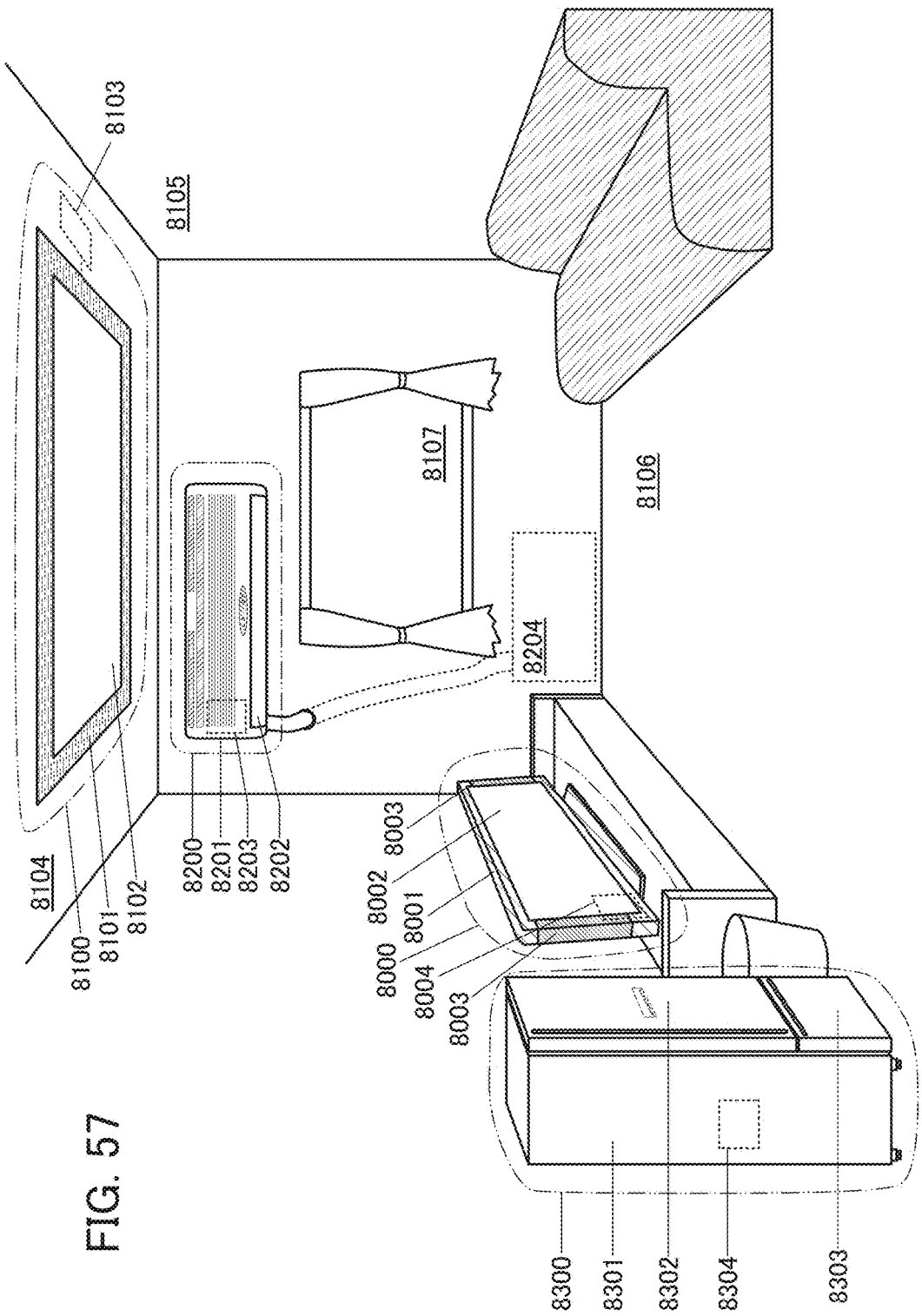
FIG. 57 illustrates examples of electronic devices.

FIG. 57 illustrates other examples of electronic devices. In FIG. 57, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 57, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 57 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 57 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 57, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 57 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 57 as an example, the power storage device of one embodiment of the present invention can be used in an air conditioner in which the functions of an indoor unit and an outdoor unit are integrated in one housing.

In FIG. 57, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 57. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

(Embodiment 7)

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 58A:
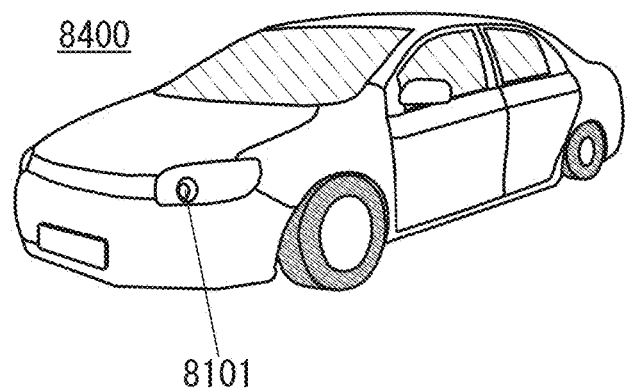
FIGS. 58A and 58B illustrate examples of electronic devices.
Figure 58B:
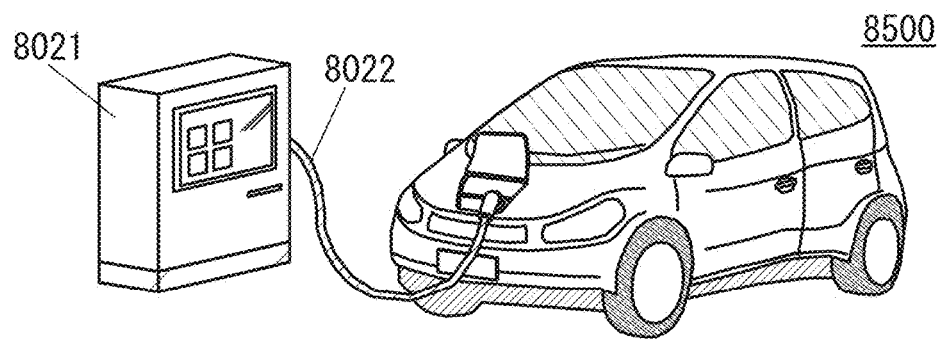

FIGS. 58A and 58B each illustrate an example of a vehicle using one embodiment of the present invention. An automobile 8400 illustrated in FIG. 58A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 58B illustrates an automobile 8500 including the power storage device. The automobile 8500 can be charged when the power storage device is supplied with electric power through external charging equipment by a plug-in system, a contactless power feeding system, or the like. In FIG. 58B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance.

Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

EXAMPLE 1

In this example, the thin storage batteries described in Embodiment 1 were fabricated as a power storage device according to one embodiment of the present invention, and the charge and discharge characteristics thereof were measured.

A pair of electrodes, the positive electrode 503 and the negative electrode 506, were used in each thin storage battery. FIGS. 26A to 26C and FIGS. 27A to 27D are top views of the positive electrode 503 and the negative electrode 506 that were used. The positive electrodes illustrated in FIGS. 26A to 26C and FIGS. 27A to 27D each include the positive electrode active material layer 502 and the tab region 281. The negative electrodes each include the negative electrode active material layer 505 and the tab region 282. FIG. 26B and FIGS. 27B and 27D are the top views each illustrating the case where the center of the positive electrode 503 except the tab region overlaps with the center of the negative electrode 506 except the tab region, that is, the ideal case where there is no positional misalignment. The description of a separator between the positive electrode 503 and the negative electrode 506 is omitted.

Figure 26A:
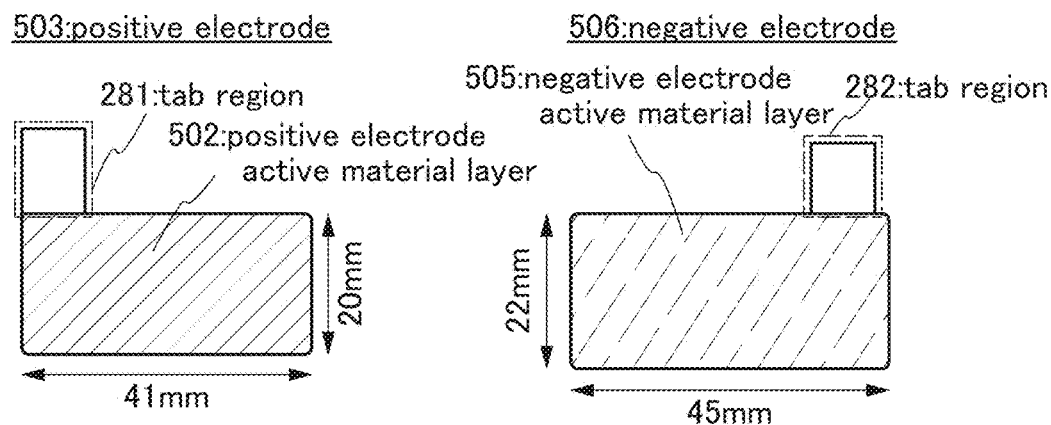
FIGS. 26A to 26C are top views of electrodes.
Figure 26B:
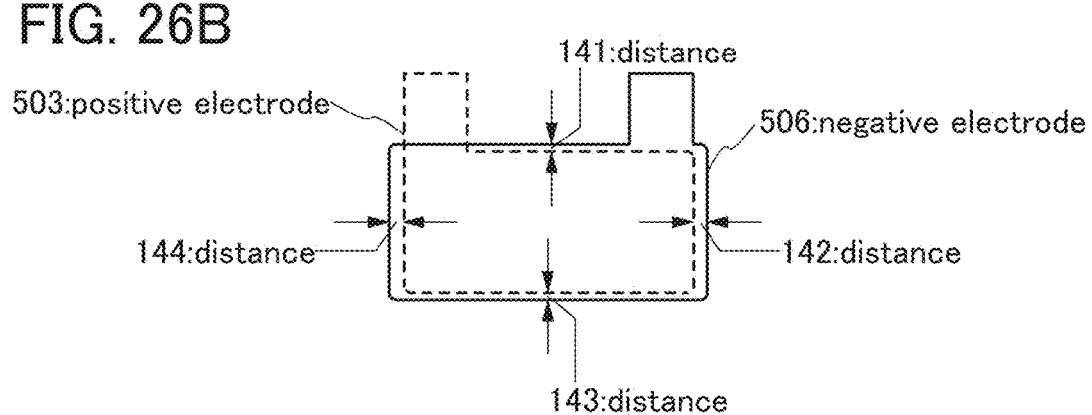

FIG. 26A is the top view of the positive electrode 503 and the negative electrode 506. FIG. 26B is the top view illustrating the case where the center of the positive electrode 503 in FIG. 26A except the tab region overlaps with the center of the negative electrode 506 in FIG. 26A except the tab region, that is, the ideal case where there is no positional misalignment. The description of the separator between the positive electrode 503 and the negative electrode 506 is omitted.

Figure 26C:
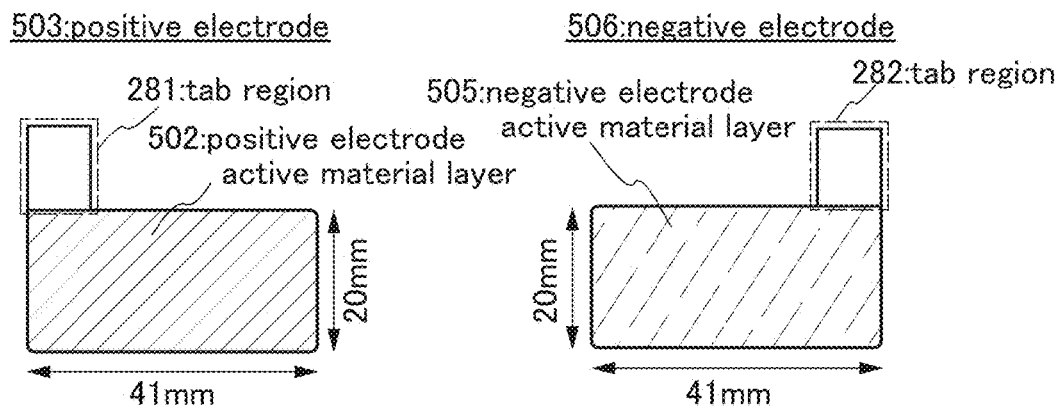

FIG. 26C is the top view illustrating the positive electrode 503 and the negative electrode 506.

Figure 27A:
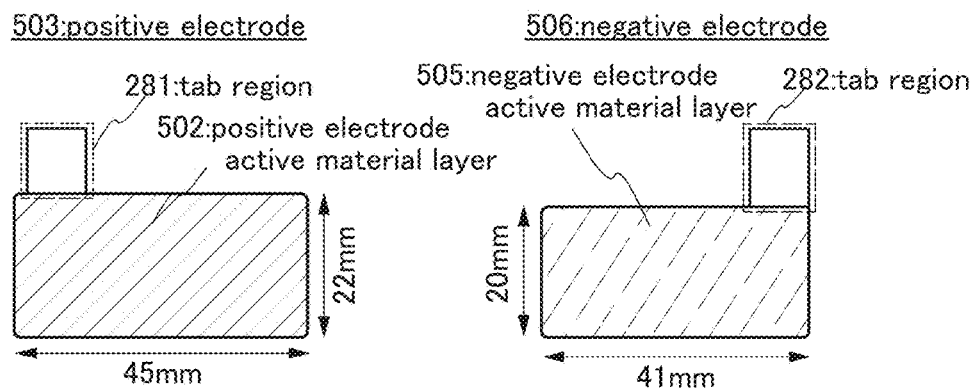
FIGS. 27A to 27D are top views of electrodes.
Figure 27B:
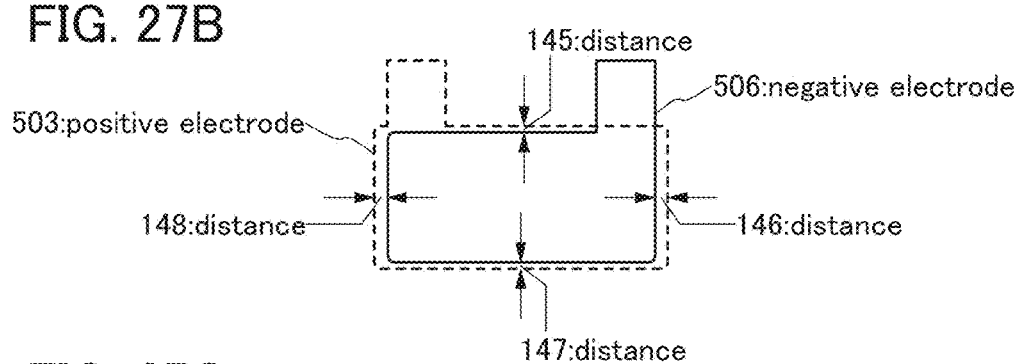

FIG. 27A is the top view illustrating the positive electrode 503 and the negative electrode 506. FIG. 27B is the top view illustrating the case where the center of the positive electrode 503 in FIG. 27A except the tab region overlaps with the center of the negative electrode 506 in FIG. 27A except the tab region.

Figure 27C:
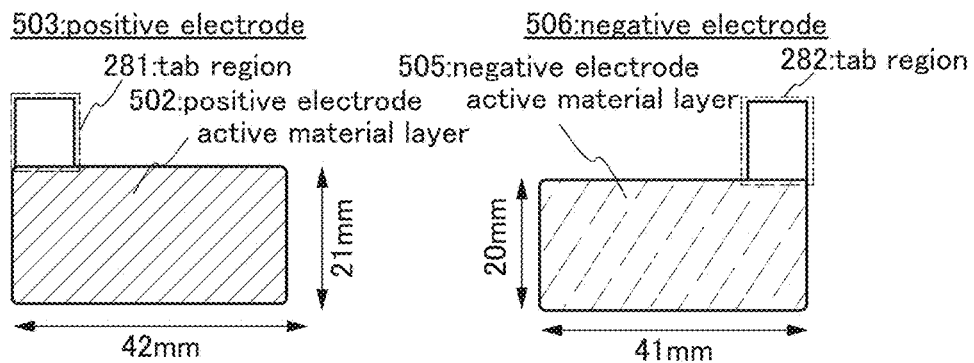
Figure 27D:
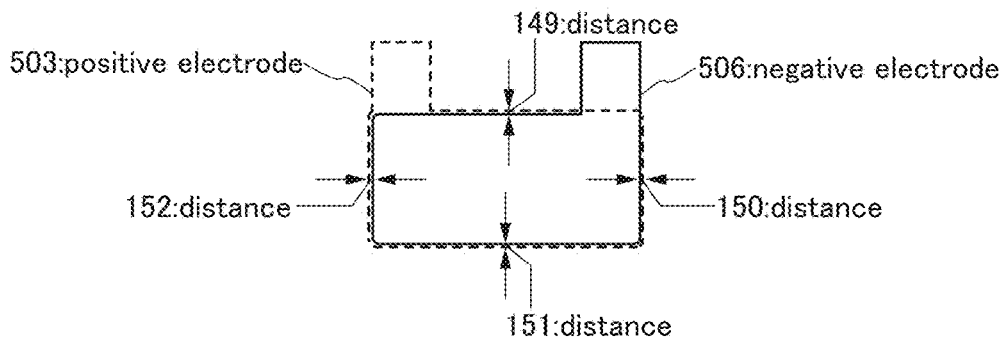

FIG. 27C is the top view illustrating the positive electrode 503 and the negative electrode 506. FIG. 27D is the top view illustrating the case where the center of the positive electrode 503 in FIG. 27C except the tab region overlaps with the center of the negative electrode 506 in FIG. 27C except the tab region.

Here, the combination of the sizes of the positive electrode and the negative electrode in FIG. 26A is referred to as Electrode Size A; the combination in FIG. 26C is referred to as Electrode Size B; the combination of the sizes of the positive electrode and the negative electrode in FIG. 27A is referred to as Electrode Size C; and the combination in FIG. 27C is referred to as Electrode Size D. In the case of Electrode Size A, the size of the negative electrode 506 except the tab region is larger than that of the positive electrode 503 except the tab region. Furthermore, the area of the negative electrode active material layer 505 is larger than that of the positive electrode active material layer 502. In the case of Electrode Size B, the size of the negative electrode 506 except the tab region is equal to that of the positive electrode 503 except the tab region. Furthermore, the area of the negative electrode active material layer 505 is equal to that of the positive electrode active material layer 502. In the cases of Electrode Size C and Electrode Size D, the size of the negative electrode 506 except the tab region is smaller than that of the positive electrode 503 except the tab region. Furthermore, the area of the negative electrode active material layer 505 is smaller than that of the positive electrode active material layer 502.

The distance between the end portions of the positive electrode 503 and the negative electrode 506 when the center of the positive electrode 503 except the tab region overlaps with the center of the negative electrode 506 except the tab region will be described. In the case of Electrode Size A, a distance 141 between end portions, a distance 142 between end portions, a distance 143 between end portions, and a distance 144 between end portions are, for example, 1 mm, 2 mm, 1 mm, and 2 mm, respectively. In the case of Electrode Size C, a distance 145 between end portions, a distance 146 between end portions, a distance 147 between end portions, and a distance 148 between end portions are, for example, 1 mm, 2 mm, 1 mm, and 2 mm, respectively. In the case of Electrode Size D, a distance 149 between end portions, a distance 150 between end portions, a distance 151 between end portions, and a distance 152 between end portions are each 0.5 mm, for example. In FIGS. 26A to 26C and FIGS. 27A to 27D, the distances 141 to 152 between the end portions of the positive electrode 503 and the negative electrode 506 are each approximately equal to the distance between end portions of the positive electrode active material layer 502 and the negative electrode active material layer 505.

[Fabrication of Electrodes]

First, fabrication of the positive electrode and the negative electrode will be described.

First, the compounding ratio and fabricating conditions of the negative electrode active material layer will be described. Spherical natural graphite having a specific surface area of 6.3 m$^2$/g and a particle size of 15 μm was used as an active material. As binders, sodium carboxymethyl cellulose (CMC-Na) and SBR were used. The polymerization degree of CMC-Na that was used was 600 to 800, and the viscosity of a 1% CMC-Na aqueous solution was in the range from 300 mPa·s to 500 mPa·s. The compound ratio of a slurry for fabricating the electrode was as follows: graphite:CMC-Na:SBR=97:1.5:1.5 (wt %).

Next, formation of the slurry for the negative electrode will be described using flow charts in FIGS. 28A and 28B. Slurries of Lot1 to Lot3 were separately formed.

Figure 28A:
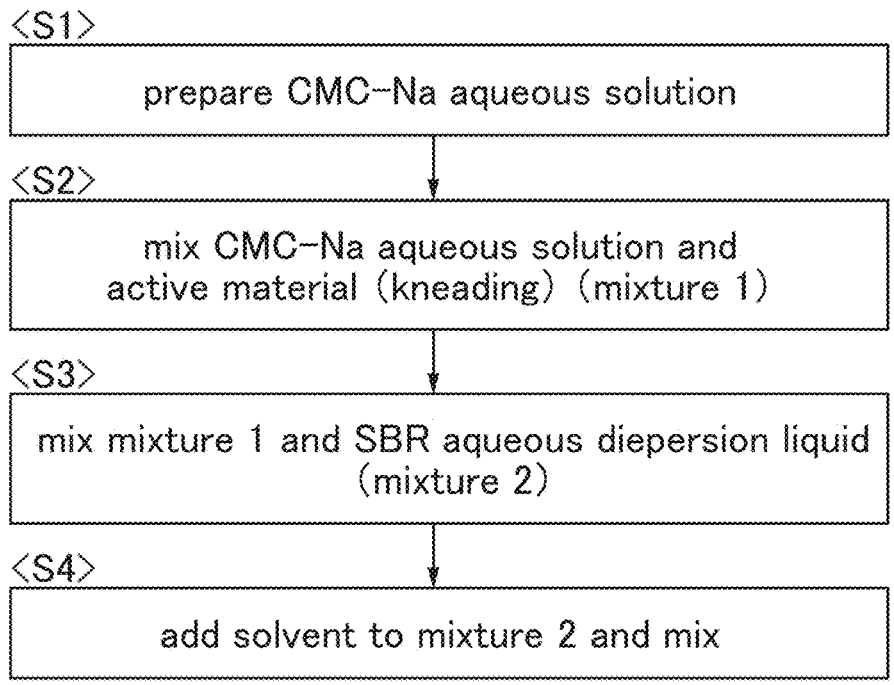
FIGS. 28A and 28B each show a method for fabricating an electrode.

FIG. 28A shows a method for forming the slurries of Lot1 and Lot2First, an aqueous solution was prepared in such a manner that CMC-Na was uniformly dissolved in pure water (Step S1).

Next, a CMC-Na aqueous solution and an active material were mixed and then kneaded using a mixer, so that Mixture 1 was obtained (Step S2). Here, kneading means mixing something so that it has a high viscosity.

Then, a 50 wt % SBR aqueous dispersion liquid was added to Mixture 1 and mixing was performed with a mixer, so that Mixture 2 was obtained (Step S3).

After that, pure water serving as a solvent was added to Mixture 2 until a predetermined viscosity was obtained, and mixing was performed (Step S4). Through the above steps, the slurry was formed.

Figure 28B:
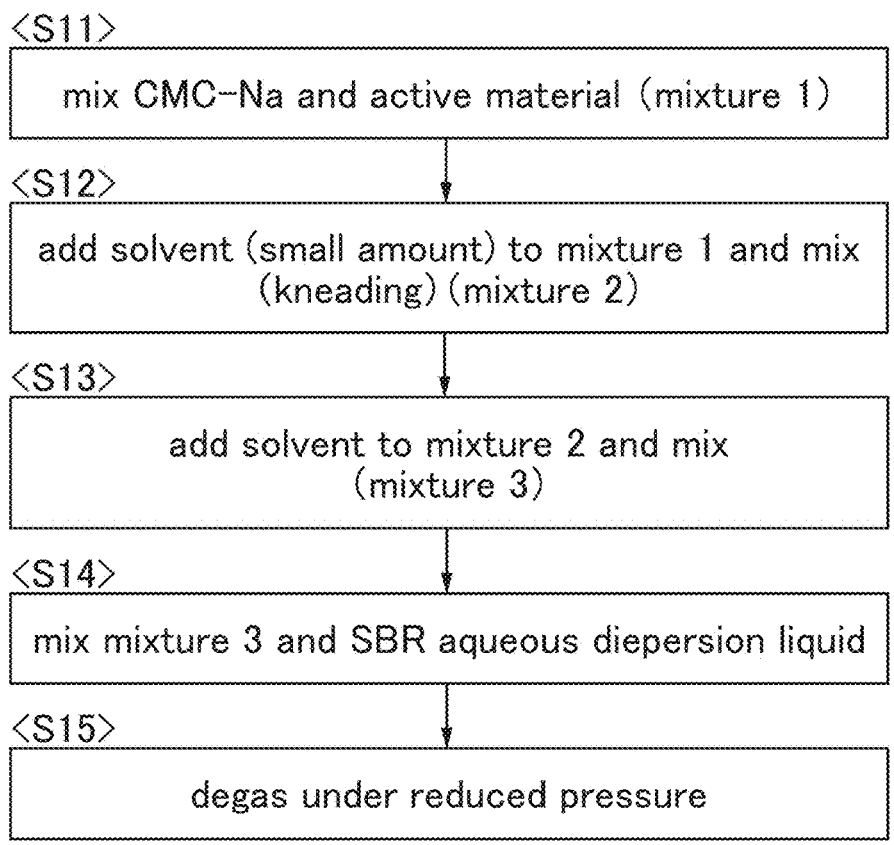

Next, FIG. 28B shows a method for forming the slurry of Lot3. First, CMC-Na powder and an active material were mixed and then kneaded with a mixer (Step S11), so that Mixture 1 was obtained.

Subsequently, a small amount of water was added as a solvent to Mixture 1 and kneading was performed, so that Mixture 2 was obtained (Step S12). At this time, water is preferably added to Mixture 1 little by little, in which case cohesion of CMC-Na and the active material can be suppressed.

Then, a solvent was further added and the mixture was kneaded using a mixer (Step S13). The viscosity is preferably decreased in advance before addition of SBR, in which case separation and precipitation of SBR due to strong stirring can be prevented in some cases. Furthermore, mixing of air bubbles by stirring can be reduced in some cases, which is preferable.

Then, a 50 wt % SBR aqueous dispersion liquid was added to the mixture, and mixing was performed with a mixer (Step S14). After that, the obtained mixture was degassed under a reduced pressure, so that a slurry for application to the electrode was obtained (Step S15).

Then, the slurries of Lot1 to Lot3 were applied.

The slurry of Lot1 was applied to a current collector by a blade method. The operating speed of the blade was set to 10 mm/sec. In the cases of the conditions shown in Tables 2 to 4, a 18-μm-thick rolled copper foil was used as the current collector. In the case of the condition shown in Table 5, a 10-μm-thick stainless steel foil (NSSC190) was used as the current collector. Tables 2 to 5 will be described in detail below.

Subsequently, the current collector to which the slurry was applied was dried using a hot plate at 50° C. in an air atmosphere for 30 minutes. After that, further drying was performed at 100° C. under a reduced pressure for 10 hours. Through the above steps, the negative electrode active material layer was formed over one surface of the current collector.

In the case of Lot2, one surface of the current collector was provided with the negative electrode active material layer by a method similar to that for Lot1 and then the other surface of the current collector was provided with the negative electrode active material layer similarly.

In the case of Lot3, the slurry was applied to one surface of a current collector with the use of a continuous coater. An 18-μm-thick rolled copper foil was used as the current collector. The coating speed was 0.5 m/min. Subsequently, the coating slurry was dried in a drying furnace. The negative electrode was dried at 50° C. in an air atmosphere for 180 seconds and then further dried at 80° C. in the air atmosphere for 180 seconds. After that, further drying was performed at 100° C. under a reduced pressure for 10 hours.

Through the above steps, the negative electrodes of Lot1 to Lot3 were fabricated.

Next, the compounding ratio and manufacturing conditions of the positive electrode will be described. $LiFePO_4$ with a specific surface area of 9.2 $m^2/g$ was used as an active material, PVdF was used as a binder, and graphene was used as a conductive additive. Note that graphene was obtained by reducing graphene oxide, which was used to form the slurry, after application of the electrode. The compounding ratio in the slurry for the electrode was set to $LiFePO_4$:graphene oxide:PVdF=94.4:0.6:5.0 (weight %).

Next, a method for forming the slurry for the positive electrode will be described using a flow chart in FIG. 29.

First, graphene oxide powder and NMP serving as a solvent were mixed with a mixer, so that Mixture 1 was obtained (Step S21).

Subsequently, the active material was added to Mixture 1 and the mixture was kneaded with a mixer, so that Mixture 2 was obtained (Step S22). By kneading the mixture, the cohesion of the active material can be weakened and graphene oxide can be dispersed highly uniformly.

Subsequently, PVdF was added to Mixture 2 and mixing was performed with a mixer, so that Mixture 3 was obtained (Step S23).

Subsequently, the solvent NMP was added to Mixture 3 and mixing was performed with a mixer (Step S24). Through the above steps, the slurry was formed.

Then, the formed slurry was applied to an aluminum current collector (with a thickness of 20 μm) subjected to undercoating in advance. The application was performed with a continuous coating device at a coating speed of 1 m/min. After that, the solvent was volatilized using a drying furnace at 80° C. for 4 minutes. Then, reduction for the electrode was performed.

For the reduction, chemical reduction was first performed, followed by thermal reduction. First, conditions for chemical reduction will be described. A solution used for the reduction was prepared as follows: a solvent in which NMP and water were mixed at 9:1 was used, and ascorbic acid and LiOH were added to the solvent to have a concentration of 77 mmol/L and 73 mmol/L, respectively. The reduction treatment was performed at 60° C. for 1 hour. After that, washing with ethanol was performed, and the solvent was volatilized in a reduced pressure atmosphere at room temperature. Next, conditions for thermal reduction will be described. After the chemical reduction, the thermal reduction was performed. The thermal reduction was performed at 170° C. in a reduced pressure atmosphere for 10 hours.

Subsequently, the positive electrode active material layer was pressed by a roll press method so as to be consolidated. Through the above steps, the positive electrode was fabricated.

Table 1 shows the active material content, the thickness, and the density of each of the negative electrode active material layers and the positive electrode active material layer that were formed. The values shown in Table 1 are the average, the maximum, and the minimum of measurement values of each of the electrodes used in fabricating storage batteries under the conditions shown in Tables 2 to 5 described later. Note that the values when the active material layers were formed such that the current collector was sandwiched therebetween are each the sum of the active material layers formed for both surfaces of the current collector.

TABLE 1

|  |  | Average | Max. | Min. |
|---|---|---|---|---|
| Positive electrode active material layer |  | | | |
|  | Thickness [μm] | 55 | 59 | 43 |
|  | Amount [mg/cm$^2$] | 9.3 | 10.0 | 8.3 |
|  | Density [g/cc] | 1.8 | 2.3 | 1.6 |
| Negative electrode active material layer | Lot1 | | | |
|  | Thickness [μm] | 58 | 76 | 42 |
|  | Amount [mg/cm$^2$] | 5.5 | 6.4 | 4.9 |
|  | Density [g/cc] | 1.0 | 1.3 | 0.8 |
|  | Lot2 | | | |
|  | Thickness [μm] | 122 | 135 | 87 |
|  | Amount [mg/cm$^2$] | 10.9 | 12.1 | 8.8 |
|  | Density [g/cc] | 0.9 | 1.0 | 0.9 |
|  | Lot3 | | | |
|  | Thickness [μm] | 56 | 77 | 51 |
|  | Amount [mg/cm$^2$] | 4.7 | 4.9 | 4.5 |
|  | Density [g/cc] | 0.9 | 1.0 | 0.8 |

Next, in an electrolytic solution, EMI-FSA represented by Structural Formula (G7) was used as a solvent and lithium bis(trifluoromethanesulfonyl)amide (Li(CF$_3$SO$_2$)$_2$N, abbreviation: LiTFSA) was used as an electrolyte. LiTFSA was dissolved in EMI-FSA, so that electrolytic solutions having concentrations of 0.5 mol/L and 1 mol/L were prepared.

Tables 2 to 5 described later show the conditions of the concentrations of lithium salts in the electrolytic solutions.

[Chemical Formula 17]

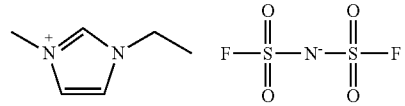

As the separator, a 50-μm-thick solvent-spun regenerated cellulosic fiber (TF40, produced by NIPPON KODOSHI CORPORATION) was used. The separator was formed to have a rectangular shape with a size of 24 mm×45 mm (in the vertical and horizontal directions) by cutting. As an exterior body, an aluminum foil covered with a resin layer was used.

[Fabrication of Storage Batteries]

Next, thin storage batteries were fabricated. Tables 2 to 5 show fabricating conditions of negative electrodes, the concentrations of lithium salts used in the electrolytic solutions, the electrode sizes, and the capacity ratios of the fabricated thin storage batteries. Here, the capacity ratios are each the ratio R of positive electrode capacity to negative electrode capacity. In the case of fabricating some storage batteries under the same condition, each storage battery is denoted as n=x (x is a natural number). For example, in the case of fabricating the same two storage batteries under Condition A-1, the respective storage batteries are denoted as Condition A-1 (n=1) and Condition A-1 (n=2).

TABLE 2

| Condition | Negative electrode current collector | Application of CMC-Na/SBR to current collector | Coating for negative electrode | LiTFSA concentration [mol/L] | Electrode size | Capacity ratio |
|---|---|---|---|---|---|---|
| A-1 | Copper | Not performed | One surface (Lot1) | 0.5 | A | 63% |
| A-2 | Copper | Not performed | One surface (Lot1) | 1 | A | 67% |
| B-1 | Copper | Rear surface | One surface (Lot1) | 0.5 | A | 64% |
| B-2 | Copper | Rear surface | One surface (Lot1) | 1 | A | 68% |
| C-1 | Copper | Rear surface and tab region | One surface (Lot3) | 0.5 | A | 76% |
| C-2 | Copper | Rear surface and tab region | One surface (Lot3) | 1 | A | 80% |
| D-2 | Copper | Not performed | Both surfaces (Lot2) | 1 | A | 70% |
| E-2 | Copper | Tab region | Both surfaces (Lot2) | 1 | A | 66% |

TABLE 3

| Condition | Negative electrode current collector | Application of CMC-Na/SBR to current collector | Coating for negative electrode | LiTFSA concentration [mol/L] | Electrode size | Capacity ratio |
|---|---|---|---|---|---|---|
| F-1 | Copper | Not performed | One surface (Lot3) | 0.5 | B | 87% |
| F-2 | Copper | Not performed | One surface (Lot3) | 1 | B | 88% |
| G-1 | Copper | Rear surface and tab region | One surface (Lot3) | 0.5 | B | 91% |
| G-2 | Copper | Rear surface and tab region | One surface (Lot3) | 1 | B | 92% |
| H-2 | Copper | Tab region | Both surfaces (Lot2) | 1 | B | 76% |

TABLE 4

| Condition | Negative electrode current collector | Application of CMC-Na/SBR to current collector | Coating for negative electrode | LiTFSA concentration [mol/L] | Electrode size | Capacity ratio |
|---|---|---|---|---|---|---|
| I-1 | Copper | Rear surface and tab region | One surface (Lot3) | 0.5 | C | 106% |
| I-2 | Copper | Rear surface and tab region | One surface (Lot3) | 1 | C | 111% |
| I-3 | Copper | Rear surface and tab region | One surface (Lot3) | 0.5 | D | 99% |

TABLE 5

| Condition | Negative electrode current collector | Application of CMC-Na/SBR to current collector | Coating for negative electrode | LiTFSA concentration [mol/L] | Electrode size | Capacity ratio |
|---|---|---|---|---|---|---|
| J-1 | Stainless steel | Not performed | One surface (Lot1) | 0.5 | A | 62% |
| J-2 | Stainless steel | Not performed | One surface (Lot1) | 1 | A | 57% |
| K-1 | Stainless steel | Rear surface | One surface (Lot1) | 0.5 | A | 60% |
| K-2 | Stainless steel | Rear surface | One surface (Lot1) | 1 | A | 61% |

Figure 30:
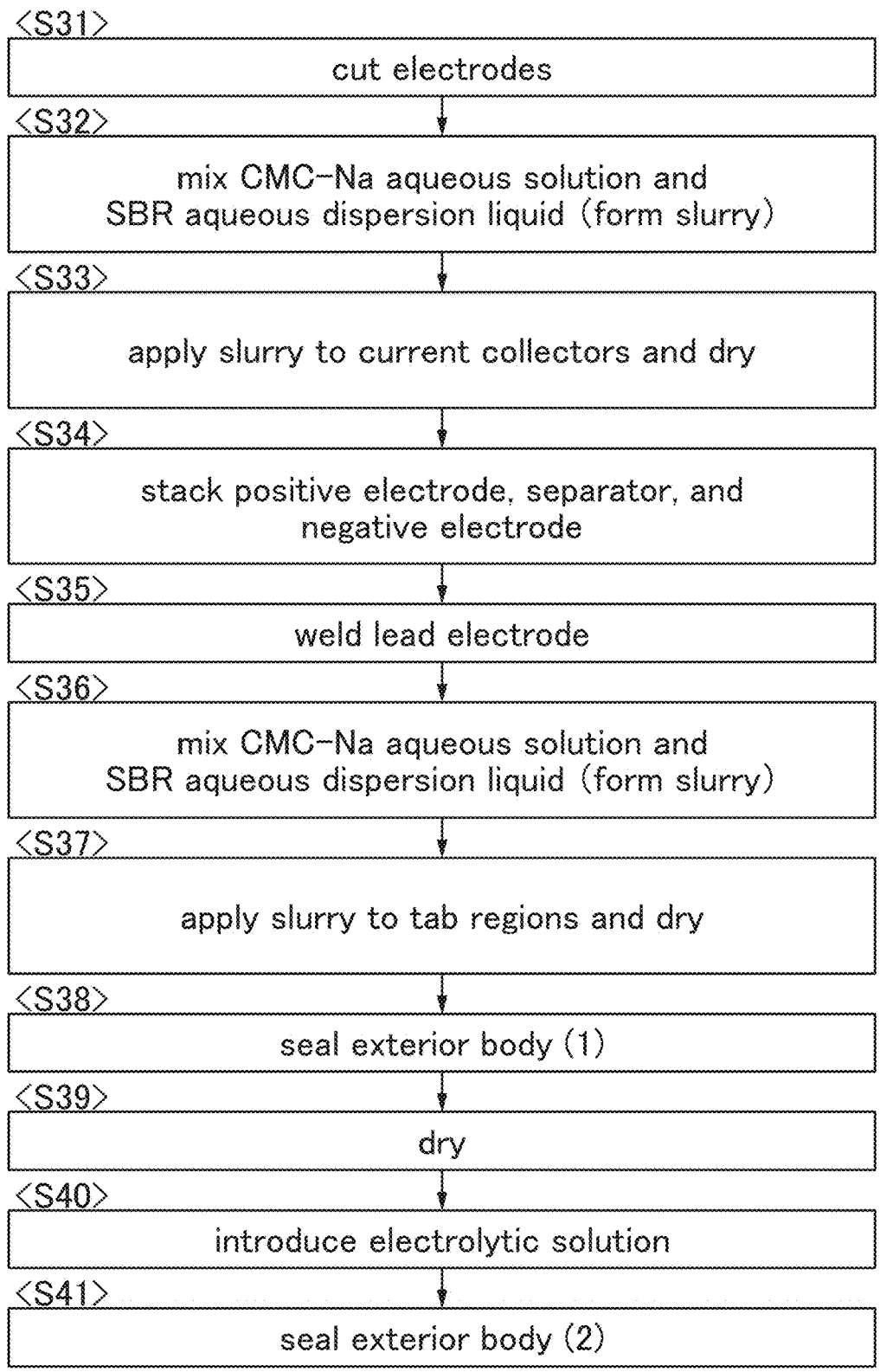
FIG. 30 shows a method for fabricating a storage battery.

A fabricating method for the thin storage battery will be described using a flow chart in FIG. 30. First, the formed positive electrode and negative electrode were cut to have shapes illustrated in FIGS. 26A and 26B and FIGS. 27A and 27B in accordance with the conditions shown in Tables 2 to 5 (Step S31). In addition, the separator was cut.

Then, the positive electrode active material and the negative electrode active material in tab regions were removed to expose the current collectors.

After that, water was added to CMC-Na powder to prepare a CMC-Na aqueous solution. Then, a 50 wt % SBR aqueous dispersion liquid was added to the prepared CMC-Na aqueous solution and stirring was performed, so that a slurry was formed (Step S32). The compounding ratio of CMC-Na to SBR was 1:1 (weight ratio).

Next, the slurry was applied to a surface of the current collector in each of the negative electrodes of Conditions C-1 to C-3, G-1 to G-3, I-1 to I-3, and K-1 and K-2 in Tables 2 to 5 that was opposite to a surface where the negative electrode active material layer was formed, in other words, a surface where the negative electrode active material layer was not formed. After that, drying was performed using a hot plate at 50° C. to form a mixed layer of CMC-Na and SBR (Step S33).

The cut positive electrode, the cut separator, and the cut negative electrode were stacked in this order and fixed with an adhesive tape (Step S34). After that, lead electrodes were welded to the tab regions of the positive electrode and the negative electrode by ultrasonic welding (Step S35). The lead electrodes were provided with sealing layers.

Next, a CMC-Na aqueous solution and an SBR aqueous dispersion liquid were mixed as in Step S32, so that a slurry was formed (Step S36).

Then, the slurry was applied to a portion of the tab region in each of the negative electrodes of Conditions C-1 to C-3, E-2 and E-3, G-1 to G-3, H-2 and H-3, and I-1 to I-3 in Tables 2 to 4. After that, drying was performed using a hot plate at 50° C. to form a mixed layer of CMC-Na and SBR (Step S37).

Subsequently, the exterior body was folded in half so that the positive electrode, the separator, and the negative electrode that were stacked were sandwiched. At this time, the positive electrode and the negative electrode were stacked such that the positive electrode active material layer and the negative electrode active material layer (a surface of one of the negative electrode active material layers in the case of both surface coating) faced each other.

Then, facing outer edges of the exterior body were bonded to each other by heating at sides except a side used for introduction of an electrolytic solution (Step S38). At this time, the sealing layers provided for the lead electrodes were positioned so as to overlap with the sealing portion of the exterior body.

After the facing outer edges of the exterior body were bonded to each other at Side A and Side B, the exterior body and the positive electrode, the separator, and the negative electrode wrapped by the exterior body were dried at 80° C. under a reduced pressure for 10 hours (Step S39).

Subsequently, an electrolytic solution was introduced into the exterior body in an argon gas atmosphere from one side that was not sealed (Step S40). After that, the one side of the exterior body was sealed by heating in a reduced pressure atmosphere (Step S41). Through the above steps, each thin storage battery was fabricated.

[Measurement 1 of Storage Batteries]

First, measurement results of the storage batteries fabricated under the conditions shown in Table 2 will be described. The electrode size was of Condition A in all the conditions in Table 2. The storage batteries were evaluated according to the flow chart in FIG. 31.

Firstly, first charging was performed at a constant current of 0.01 C until the voltage increased and reached 3.2 V (Step S51). Here, the charge rate and the discharge rate were calculated on the basis of 170 mAh per gram of the positive electrode active material.

A gas might be generated because of, for example, a reaction of the electrolytic solution around a surface of the electrode by charge of the storage battery. Thus, to remove the generated gas, the exterior body was opened by being cut at one side in a glove box in an argon atmosphere (Step S52). After that, the edges were sealed again in a reduced pressure atmosphere (Step S53).

Next, second charging was performed (Step S54). The second charging was performed at a constant current of 0.05 C until the voltage increased and reached 4 V.

Next, discharging was performed (Step S55). The discharging was performed at a constant current of 0.2 C until the voltage decreased and reached 2 V.

Then, charging and discharging in Step S56 shown in FIG. 31 were performed, and then, charging and discharging in Step S57 were performed. The charging in Steps S56 and S57 was performed under the same condition, and the discharging in Steps S56 and S57 was performed under the same condition. For the charging, constant current charging was performed at 0.2 C until the voltage increased and reached 4 V. For the discharging, constant current discharging was performed at 0.2 C until the voltage decreased and reached 2 V.

Here, Steps S51 to S57 may be referred to as aging.

Figure 33A:
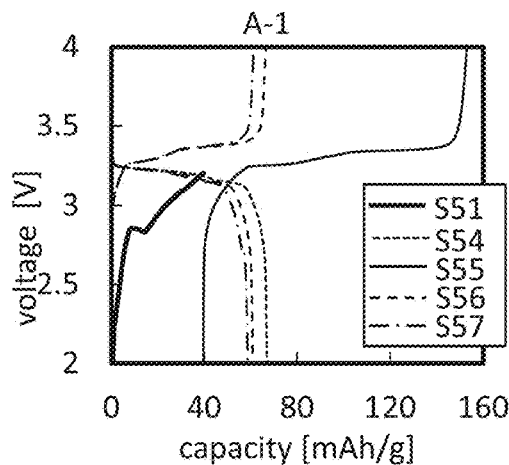
FIG. 33A to 33F are graphs each showing the characteristics of a storage battery.
Figure 33B:
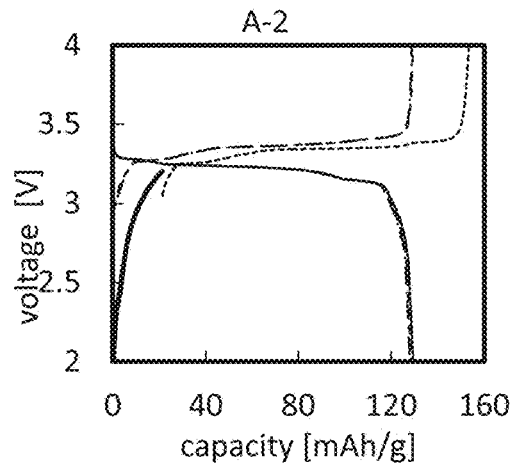
Figure 33C:
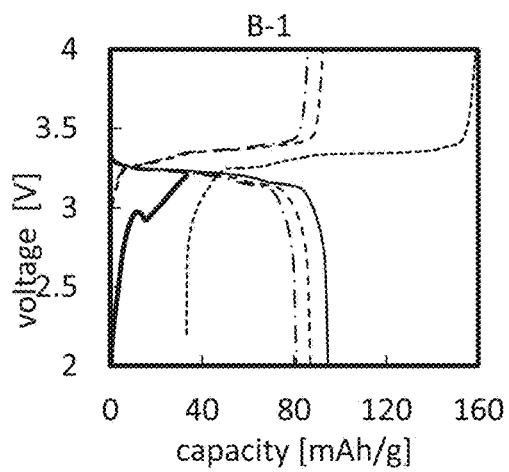
Figure 33D:
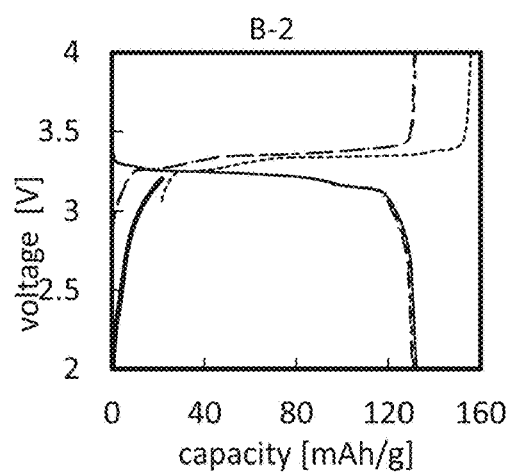
Figure 33E:
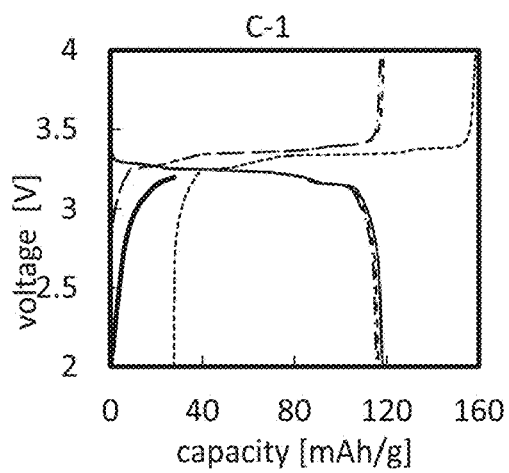
Figure 33F:
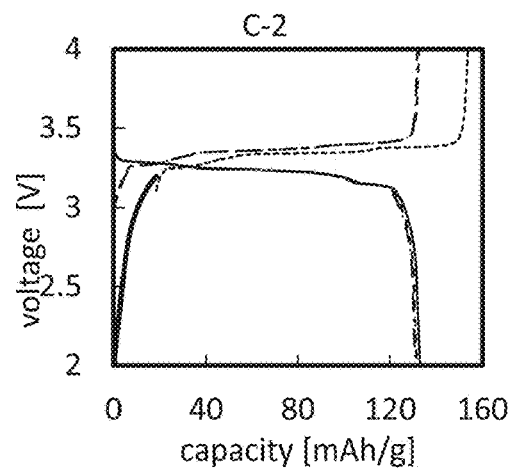
Figure 34A:
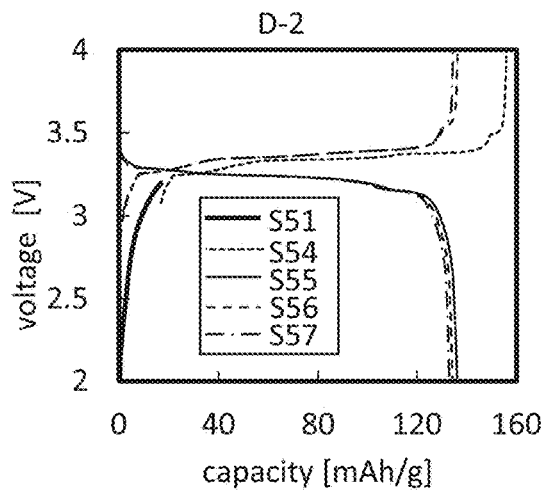
FIGS. 34A to 34F are graphs each showing the characteristics of a storage battery.
Figure 34B:
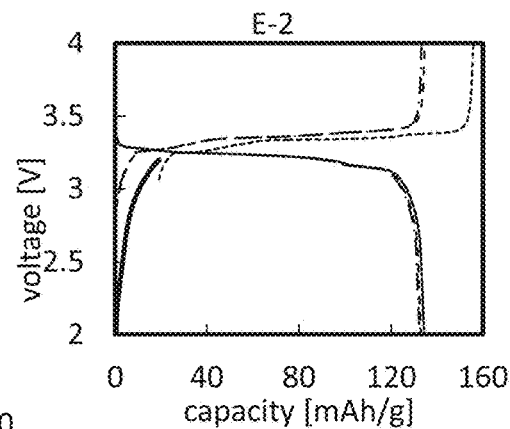
Figure 34C:
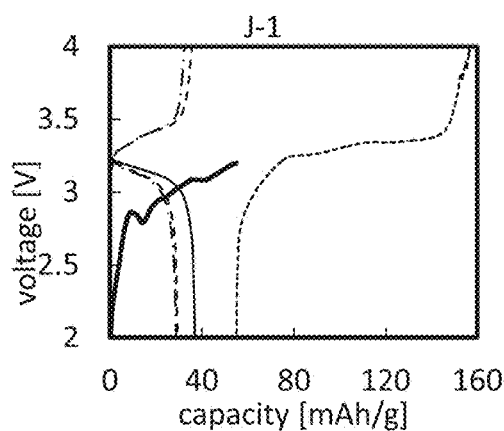
Figure 34D:
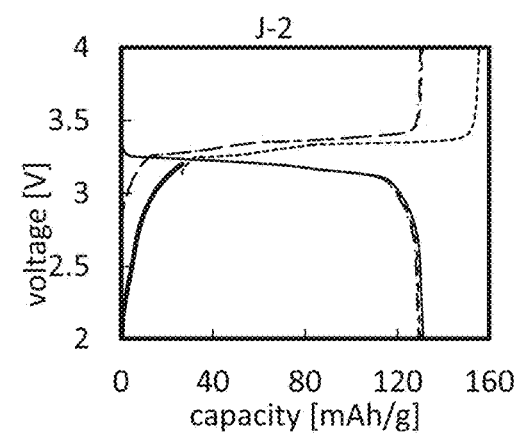
Figure 34E:
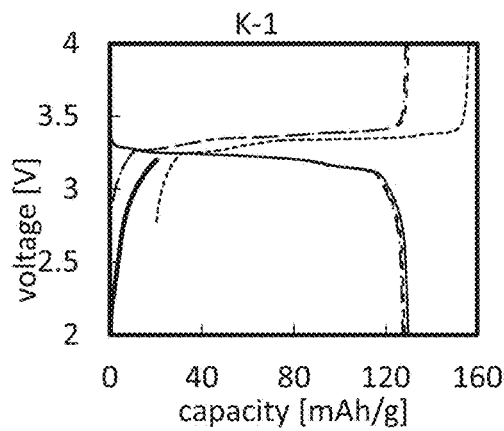
Figure 34F:
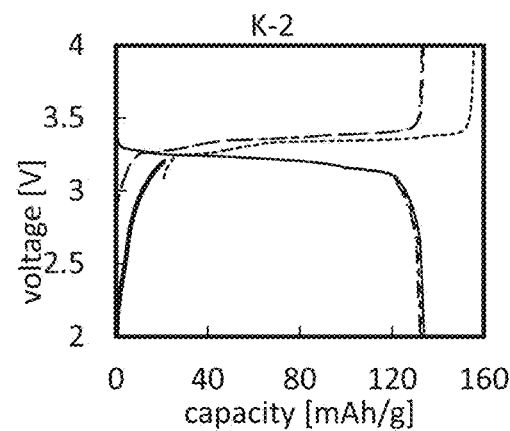
Figure 35A:
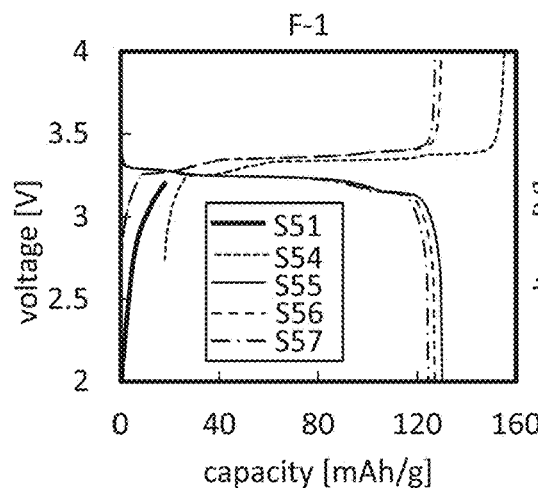
FIGS. 35A to 35E are graphs each showing the characteristics of a storage battery.
Figure 35B:
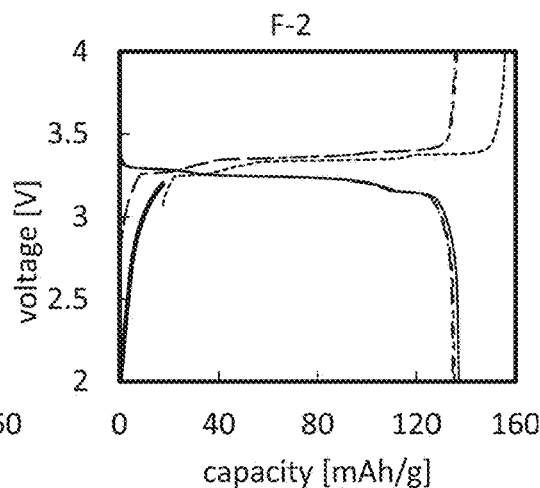
Figure 35C:
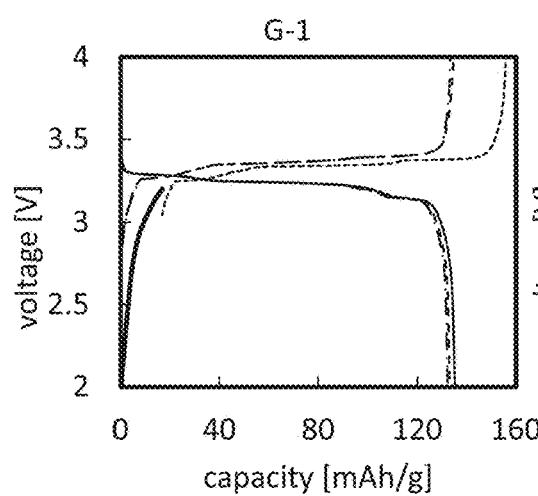
Figure 35D:
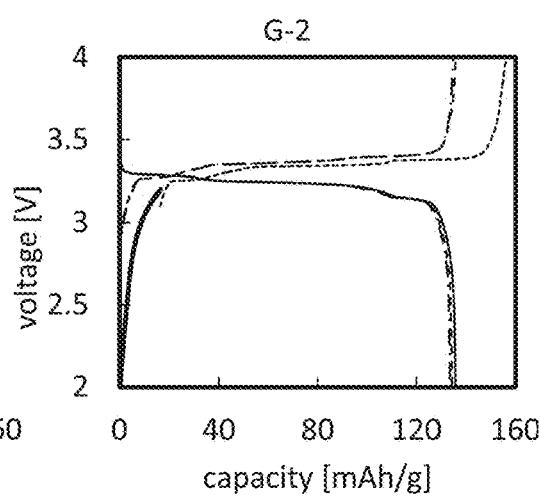
Figure 35E:
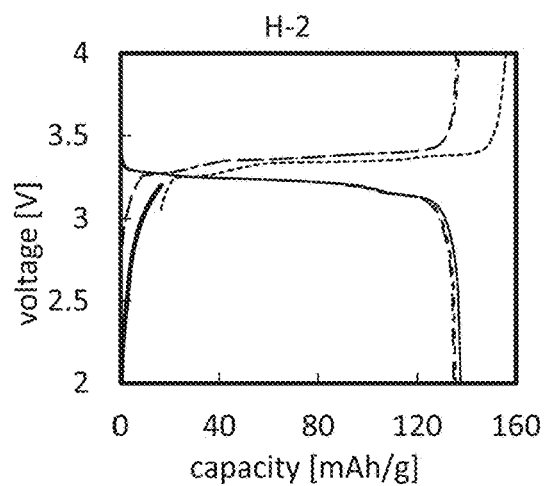
Figure 37A:
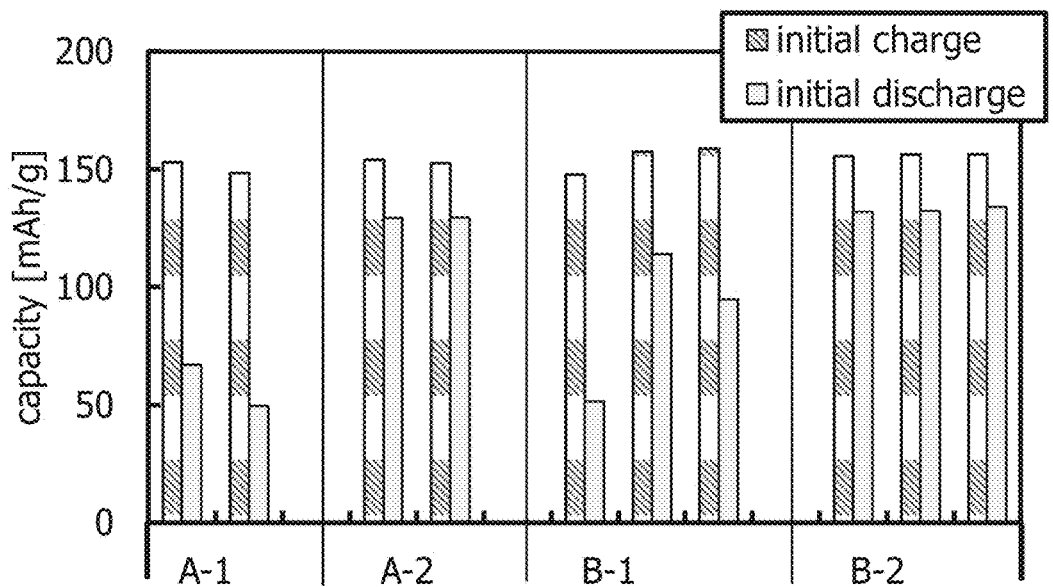
FIGS. 37A and 37B are graphs each showing the characteristics of storage batteries.
Figure 37B:
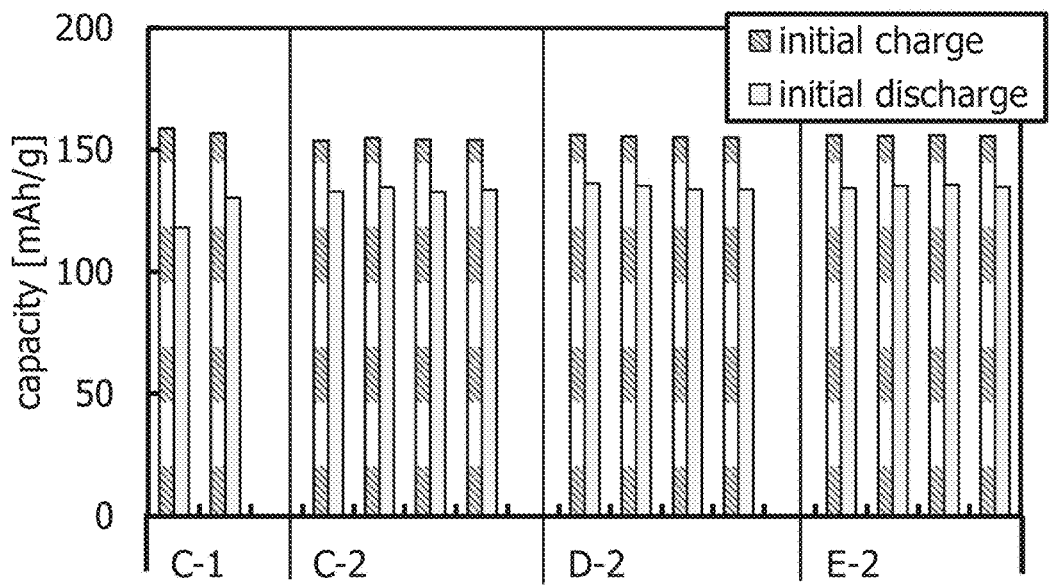

FIGS. 33A to 33F and FIGS. 34A and 34B show curves of first charging in Step S51, second charging in Step S54, discharging in Step S55, charging and discharging in Step S56, and charging and discharging in Step S57 in FIG. 31 under typical conditions. The vertical axis represents voltage, and the horizontal axis represents normalized capacity. FIGS. 33A, 33B, 33C, 33D, 33E, and 33F show the characteristics of storage batteries fabricated under Condition A-1, Condition A-2, Condition B-1, Condition B-2, Condition C-1, and Condition C-2, respectively. FIGS. 34A and 34B show the characteristics of storage batteries fabricated under Condition D-2 and Condition E-2, respectively. Here, capacity was normalized by the weight of the positive electrode active material. Note that charge capacity obtained by initial charging is the sum of charge capacities in Steps S51 and S54. The value obtained by subtracting discharge capacity in Step S55 from the sum of charge capacities in Steps S51 and S54 is referred to as initial irreversible capacity. FIGS. 37A and 37B each show initial charge capacities and initial discharge (Step S55) capacities under different conditions. For example, two pairs of charge and discharge data are shown in the case of Condition A-1; the data are of measurement results of two storage batteries (n=1 and n=2) fabricated under Condition A-1. Similarly, two storage batteries were fabricated under Condition A-2, three storage batteries were fabricated under Condition B-1, and three storage batteries were fabricated under Condition B-2.

First, as shown in FIGS. 33A, 33C, and 33E, the initial irreversible capacities of the storage batteries fabricated under the condition that the concentration of LiTFSA was 0.5 mol/L were high, whereas the initial irreversible capacities of the storage batteries fabricated under the condition that the concentration of LiTFSA was 1 mol/L were lower as shown in FIGS. 33B, 33D, and 33F, which indicates improvement in the characteristics of the storage batteries. Thus, the concentration of the lithium salt is preferably as high as possible. The concentration of the lithium salt is, for example, preferably higher than or equal to 0.5 mol/L, more preferably higher than or equal to 1 mol/L, still more preferably higher than or equal to 1.5 mol/L.

The irreversible capacities of the storage batteries each including the negative electrode whose rear surface was coated with the mixed layer of CMC-Na and SBR were lower. The irreversible capacities of the storage batteries in which the tab regions were each also coated with the mixed layer of CMC-Na and SBR were much lower. The formed mixed layer of CMC-Na and SBR presumably inhibited a reaction between the electrolytic solution and the current collector.

Figure 38:
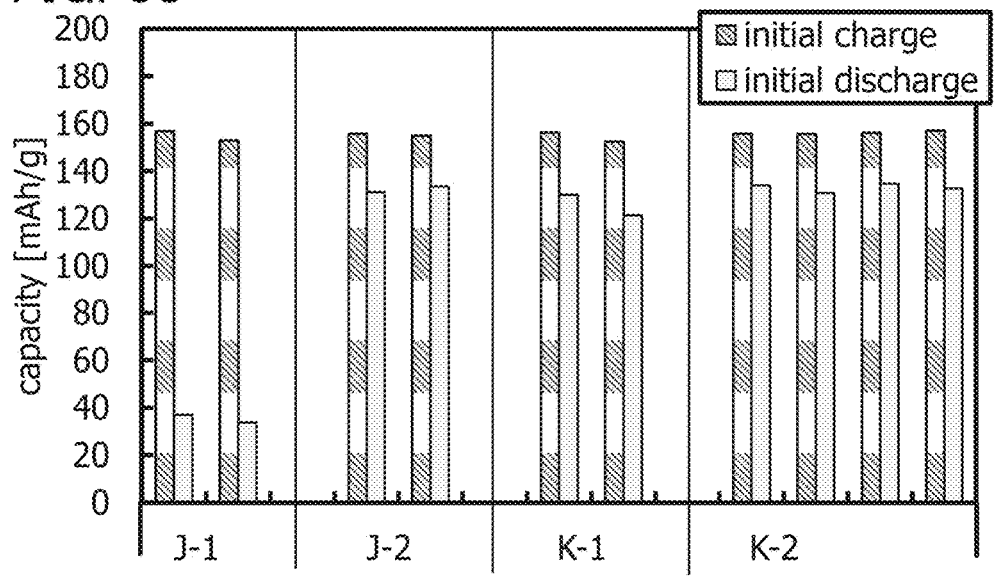
FIG. 38 is a graph showing the characteristics of storage batteries.

Next, the condition using stainless steel foil as the current collector will be described. FIGS. 34C, 34D, 34E, and 34F show typical charge and discharge curves of the storage batteries fabricated under Condition J-1, Condition J-2, Condition K-1, and Condition K-2, respectively. FIG. 38 shows the initial charge and discharge capacities of the fabricated storage batteries. It is suggested that the irreversible capacity of a storage battery in which stainless steel foil is used as a current collector and the rear surface of a negative electrode is coated with a mixed layer of CMC-Na and SBR can be lower than that of a storage battery in which copper foil is used as a current collector and the rear surface of a negative electrode is coated with a mixed layer of CMC-Na and SBR. This implies that the use of stainless steel foil instead of copper foil as a current collector may lead to inhibition of a reaction between the surface of a current collector and an electrolytic solution.

[Disassembly and Observation of Storage Batteries]

The two storage batteries having different irreversible capacities, i.e., the storage battery (n=1) fabricated under Condition A-1 and the storage battery (n=2) fabricated under Condition B-1 were disassembled and observed after charging and discharging in Step S57 were terminated. The disassembly was performed in an argon atmosphere.

Figure 44A:
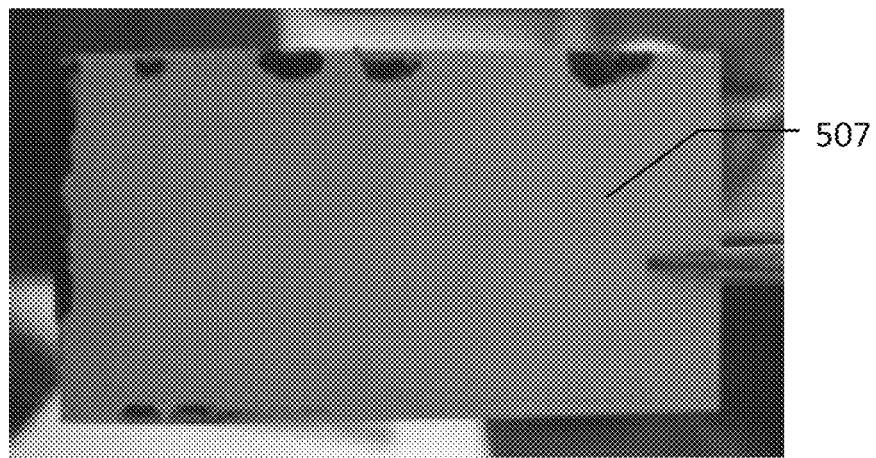
FIGS. 44A and 44B are each a photograph of a separator.
Figure 44B:
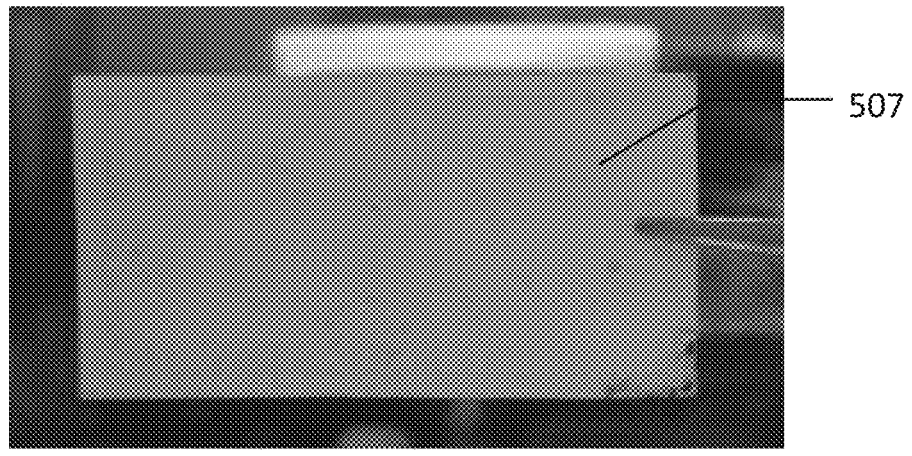

FIGS. 44A and 44B are photographs of the separators taken out of the storage batteries. FIG. 44A shows the separator for the storage battery (n=1) fabricated under Condition A-1. FIG. 44B shows the separator for the storage battery (n=2) fabricated under Condition B-1. An outer edge of the separator for the storage battery (n=1) fabricated under Condition A-1 was stained black. In contrast, significant discoloring was not observed in the separator for the storage battery (n=2) fabricated under Condition B-1.

When the separator and the negative electrode taken out of the storage battery (n=1) fabricated under Condition A-1 after the disassembly was soaked in a heavy acetonitrile solution, the heavy acetonitrile solution turned brown. In contrast, significant discoloring was not observed in the case of the storage battery (n=2) fabricated under Condition B-1.

Figure 45:
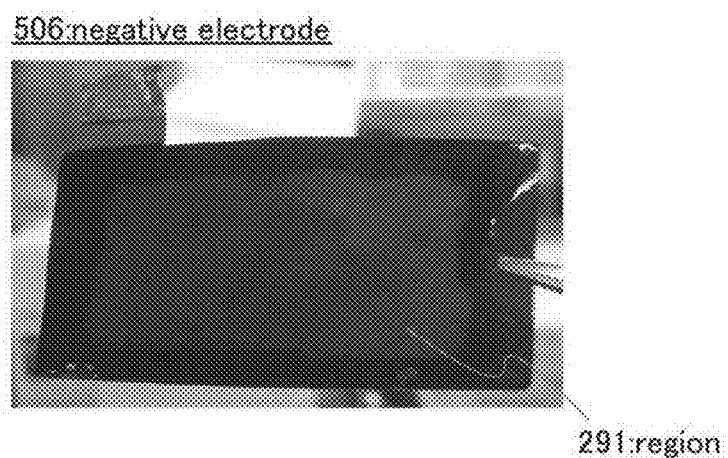
FIG. 45 is a photograph of a negative electrode.

Next, a storage battery fabricated under Condition A-1 was disassembled after second charging in Step S54 in FIG. 31 was terminated, in order to observe a negative electrode. The disassembly was performed in an argon atmosphere. FIG. 45 shows an observation result. Graphite is known to turn gold in a reacted region owing to intercalated lithium. As shown in FIG. 45, significant discoloring that suggests a reaction between graphite and lithium was observed in a region 291, which was a center portion of the negative electrode, whereas discoloring was not so significant in an outer edge of the negative electrode. These results imply that a reaction between lithium and graphite did not occur at the outer edge of the negative electrode as easily as in the center portion of the negative electrode. Furthermore, it is found that the region in which discoloring was not significant extended to not only a region not overlapping with the positive electrode but also a region on the inner side.

[Measurement 2 of Storage Batteries]

Next, storage batteries in each of which the area of a region of a negative electrode and a negative electrode active material layer that did not overlap with a positive electrode as in the storage battery of one embodiment of the present invention was reduced (ideally eliminated) were examined.

The storage batteries were fabricated under the conditions shown in Table 3 and Table 4.

In Table 3, the electrode size is Condition B. That is, the size of the positive electrode except a tab region was equal to that of the negative electrode except a tab region.

In Table 4, the electrode sizes are Conditions C and D. That is, the size of the negative electrode except a tab region was smaller than that of the positive electrode except a tab region.

Figure 36A:
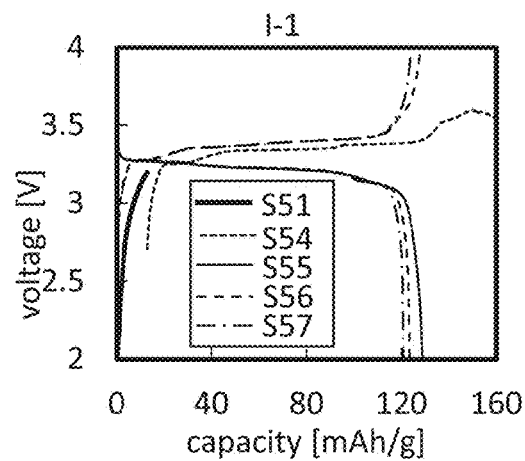
FIGS. 36A to 36C are graphs each showing the characteristics of a storage battery.
Figure 36B:
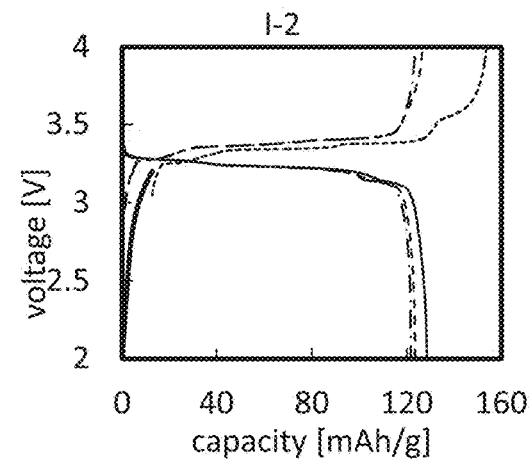
Figure 36C:
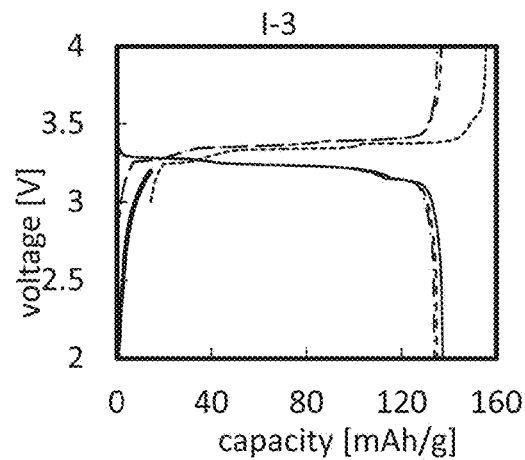
Figure 39A:
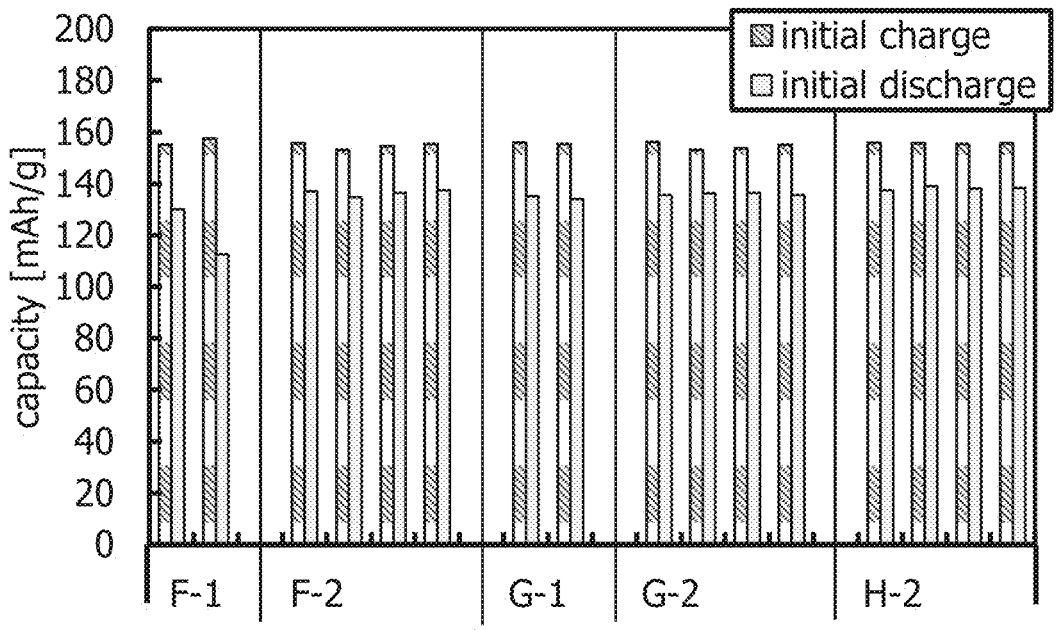
FIGS. 39A and 39B are graphs each showing the characteristics of storage batteries.
Figure 39B:
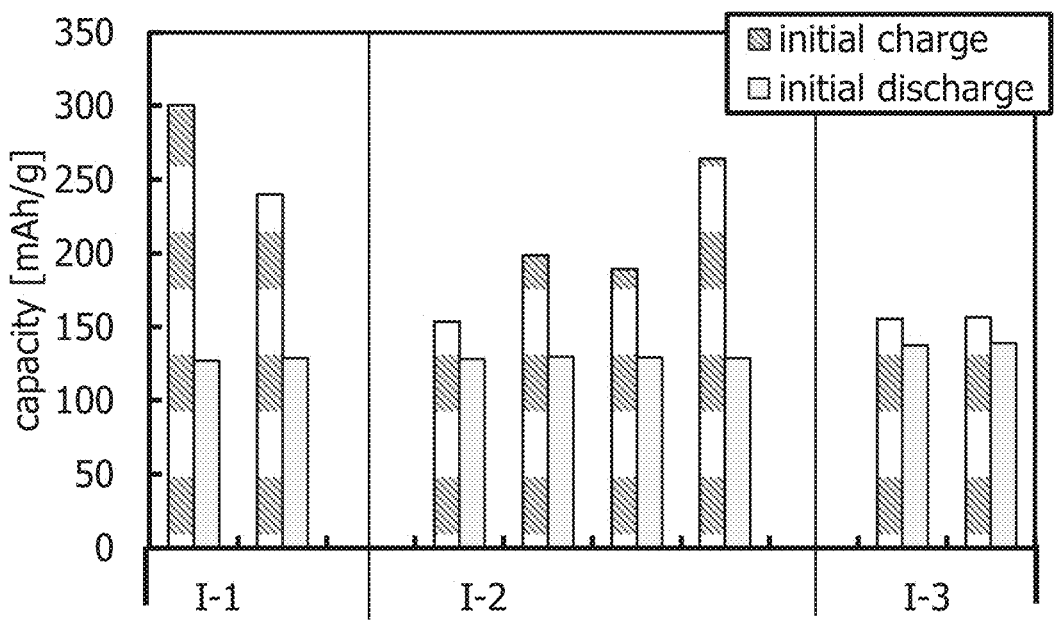

The storage batteries were similarly evaluated according to the flow chart in FIG. 31. FIGS. 35A to 35E and FIGS. 36A to 36C show curves of first charging in Step S51, second charging in Step S54, discharging in Step S55, charging and discharging in Step S56, and charging and discharging in Step S57. Here, FIGS. 35A, 35B, 35C, 35D, and 35E show the characteristics of storage batteries fabricated under Condition F-1, Condition F-2, Condition G-1, Condition G-2, and Condition H-2, respectively. FIGS. 36A, 36B, and 36C show the characteristics of storage batteries fabricated under Condition I-1, Condition I-2, and Condition I-3, respectively. FIGS. 39A and 39B each show initial charge capacities (the sum of capacities of first charging in Step S51 and second charging in Step S54) and initial discharge (Step S55) capacities under different conditions.

From FIGS. 35A to 35E and FIG. 39A, the irreversible capacities of the storage batteries fabricated using Electrode Size B were lower than those of the storage batteries fabricated using Electrode Size A. This suggests that an irreversible reaction easily occurred at the region of the negative electrode that did not overlap with the positive electrode. In the case of Electrode Size A, the distance between end portions of the positive electrode and the negative electrode was presumably approximately 1 mm to 2 mm, and the area of the region of the negative electrode that did not overlap with the positive electrode was large.

The distance between the end portions of the positive electrode and the negative electrode is, for example, preferably 0.5 mm or less, more preferably 0.2 mm or less, still more preferably 0.1 mm or less.

According to FIGS. 36A to 36C and FIG. 39B, the initial irreversible capacities of the storage batteries fabricated using Electrode Size D were lower than those of the storage batteries fabricated using Electrode Size C, which is preferable.

[Measurement 3 of Storage Batteries: Cycle Performance]

Storage batteries were fabricated under the conditions using Electrode Size A (Condition A-2, Condition B-2, Condition C-2, Condition D-2, and Condition E-2), the conditions using Electrode Size B (Condition F-2, Condition G-2, and Condition H-2), and the condition using Electrode Size C (Condition I-2). Variations in discharge capacity with respect to the number of cycles (hereinafter referred to as charge and discharge cycle performance) were measured. Note that one pair of charging and discharging when charging and discharging are repeated is counted as one cycle. In addition, the number of cycles refers to the number of pairs of charging and discharging.

Figure 32:
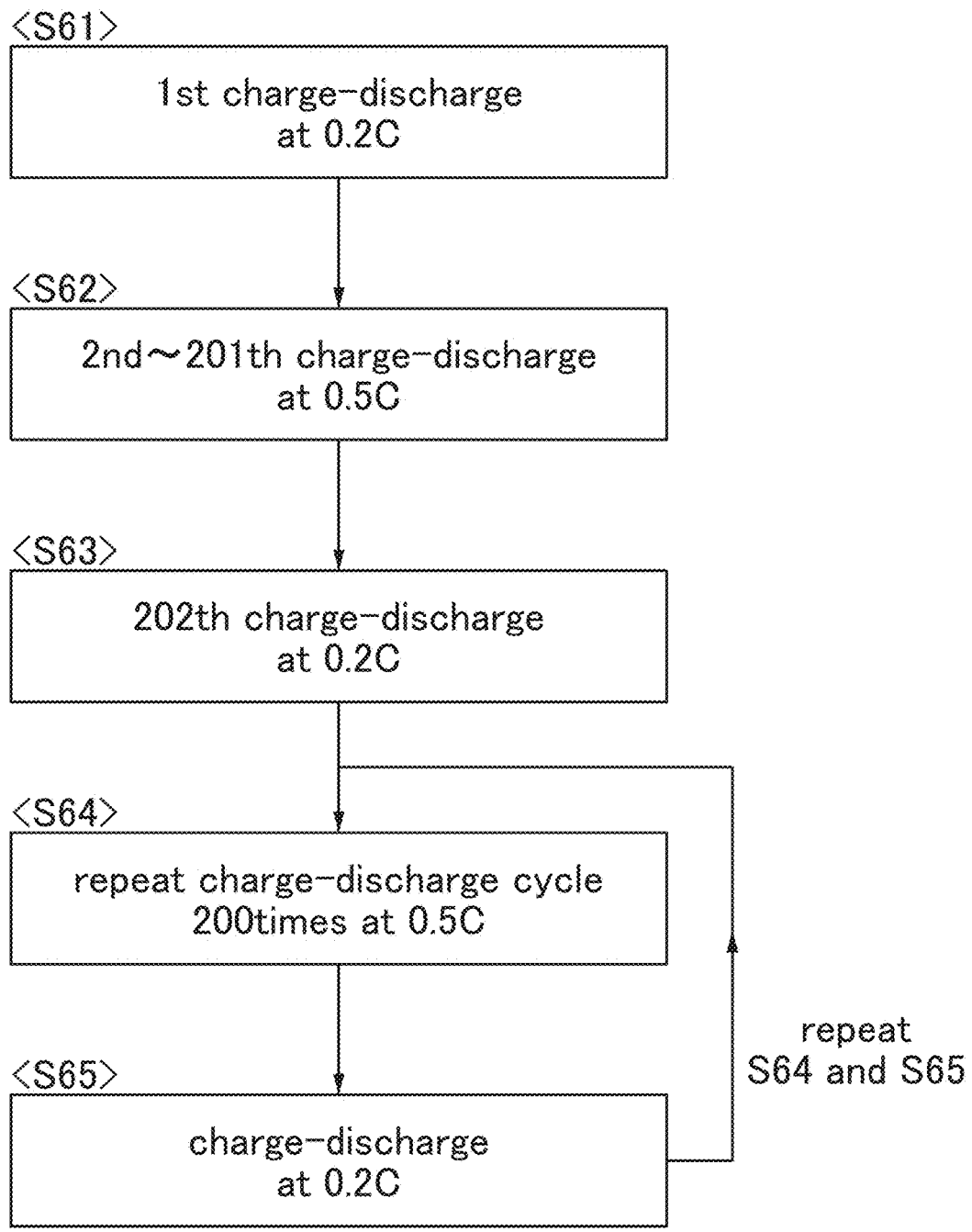
FIG. 32 shows a method for evaluating a storage battery.

Charge and discharge cycles were measured at 60° C. according to a flow chart shown in FIG. 32. For charging, constant current charging was performed until the voltage increased and reached 4 V. For discharging, constant current discharging was performed until the voltage decreased and reached 2 V.

Firstly, first charging and discharging were performed at a rate of 0.2 C (Step S61). Then, second to 201st charging and discharging were performed at a rate of 0.5 C (Step S62). Then, 202nd charging and discharging were performed at a rate of 0.2 C (Step S63).

After that, charging and discharging at 0.5 C were performed 200 times (Step S64). Then, charging and discharging at 0.2 C were performed once (Step S65). After that, Step S64 and Step S65 were alternately repeated.

Figure 40A:
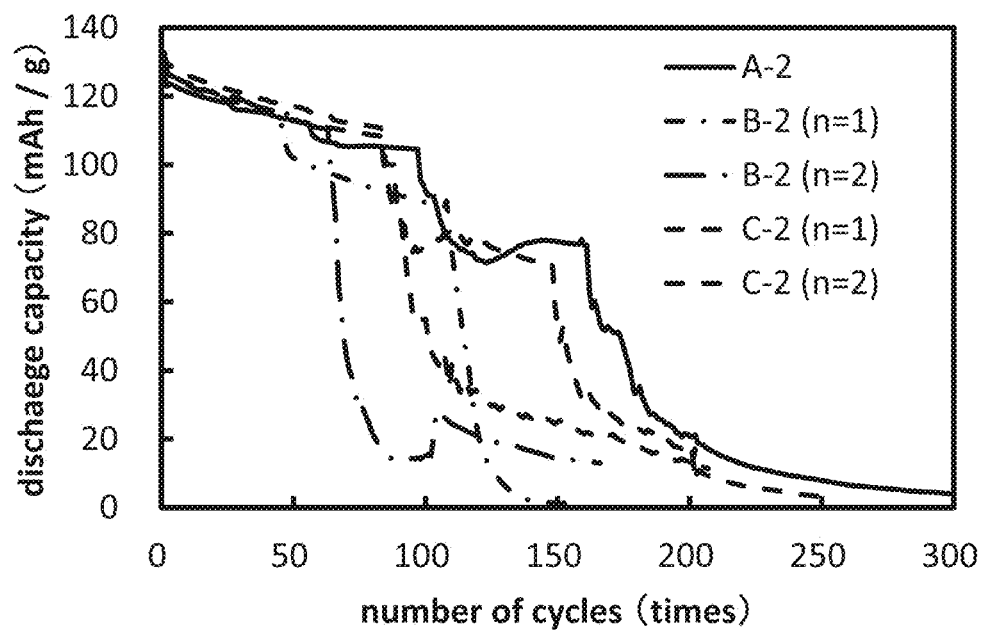
FIGS. 40A and 40B are graphs each showing the charge and discharge cycle performances of storage batteries.
Figure 40B:
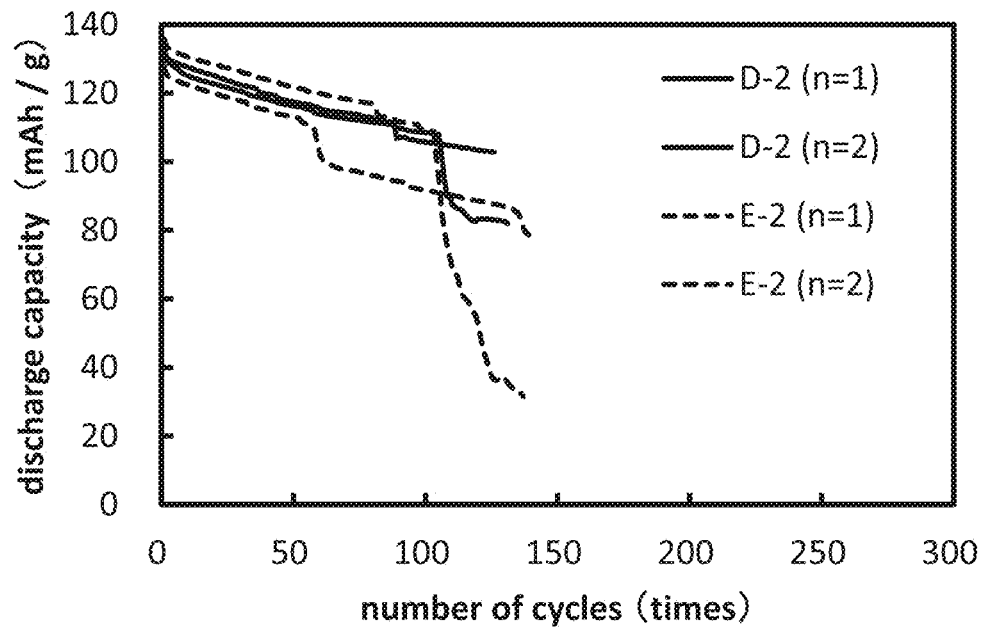
Figure 41A:
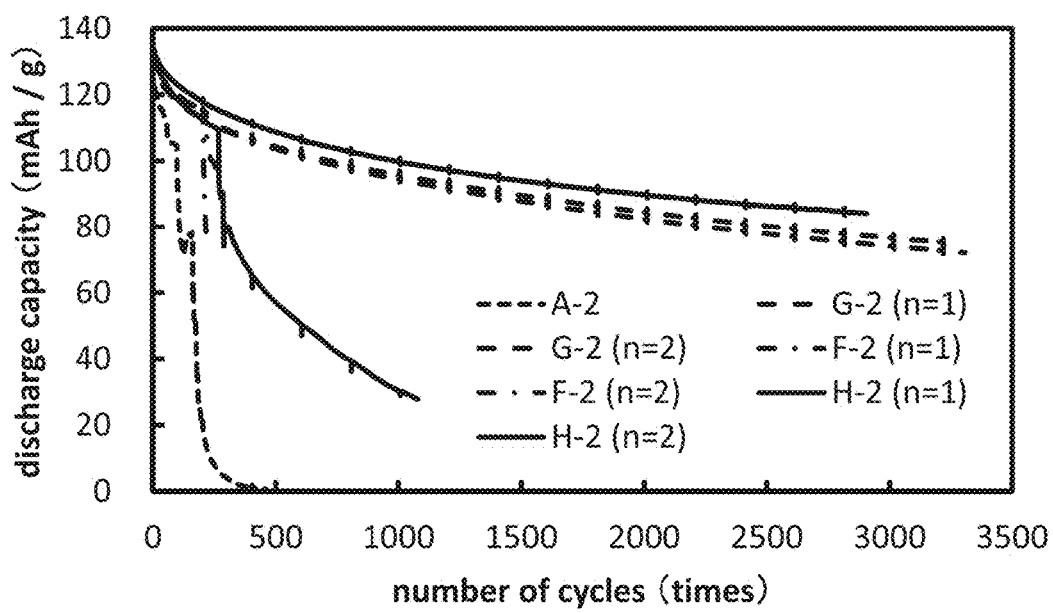
FIGS. 41A and 41B are graphs each showing the charge and discharge cycle performances of storage batteries.
Figure 41B:
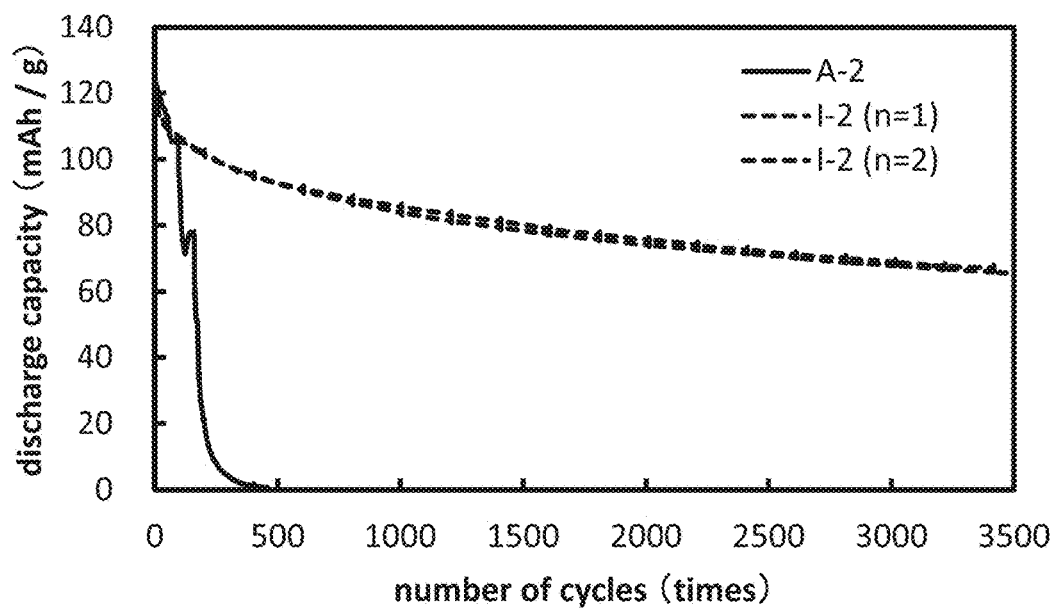
Figure 42A:
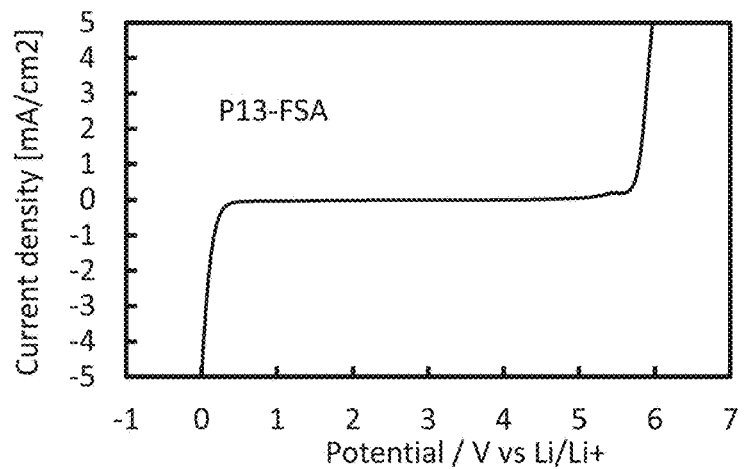
FIGS. 42A to 42C are linear sweep voltammograms showing measurement results of ionic liquids.
Figure 42B:
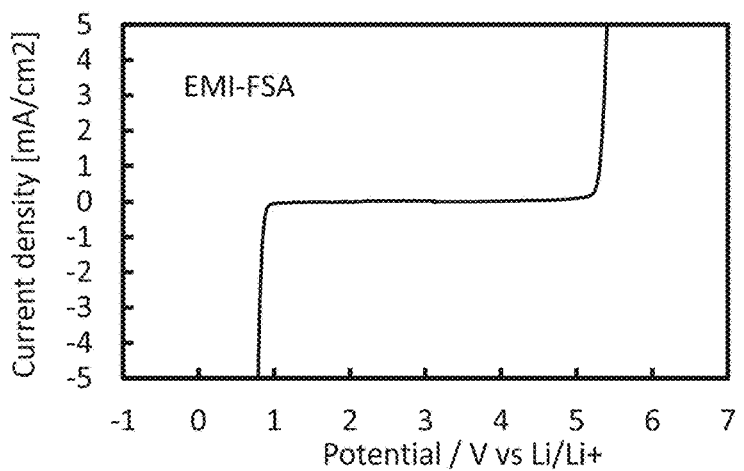
Figure 42C:
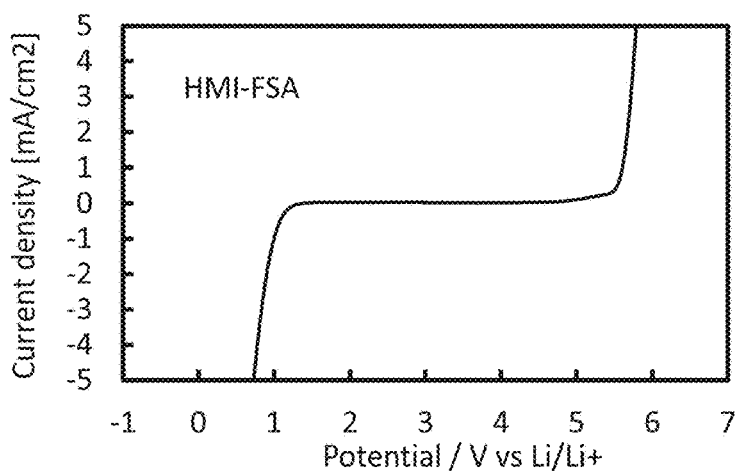
Figure 43A:
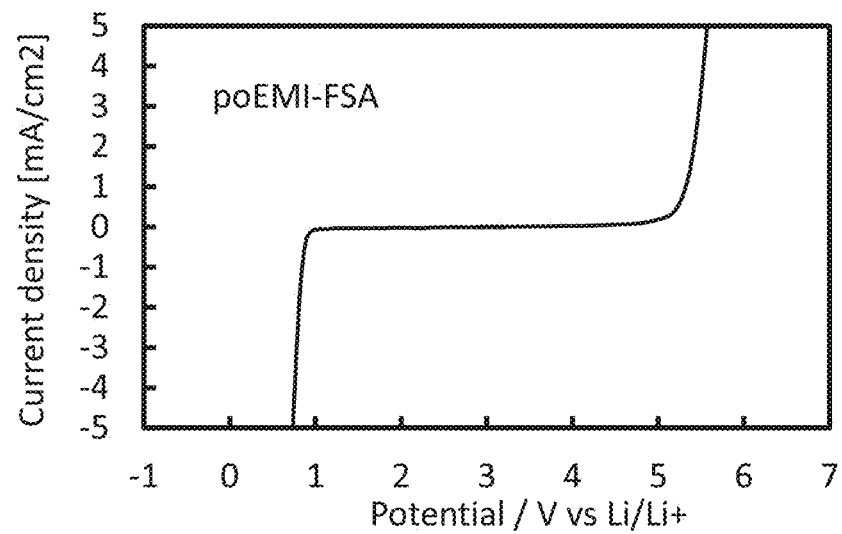
FIGS. 43A and 43B are linear sweep voltammograms showing measurement results of ionic liquids.
Figure 43B:
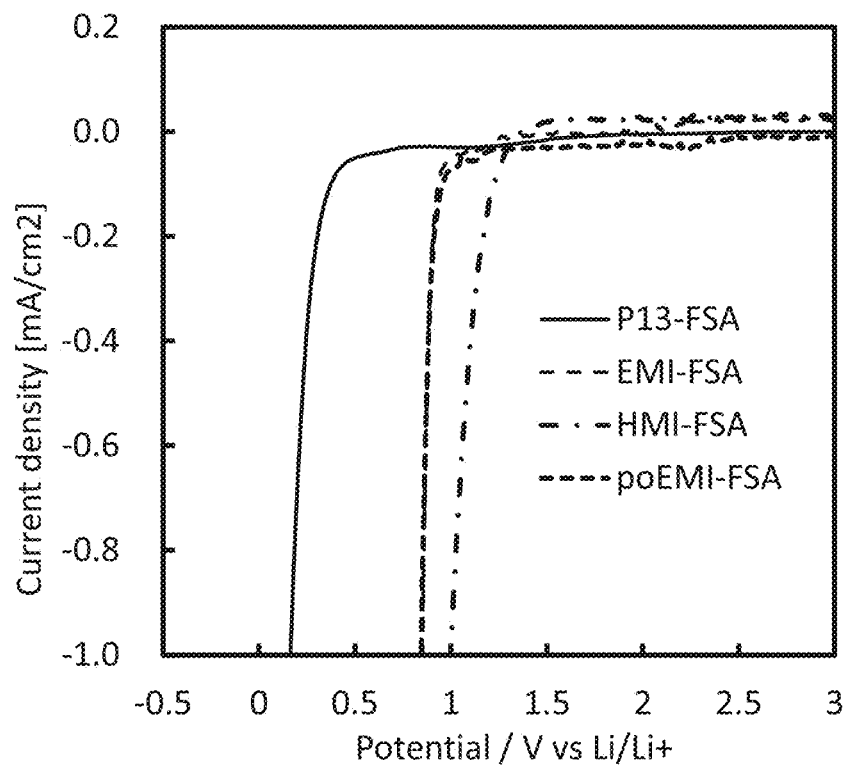

FIG. 40A shows the charge and discharge cycle performances of the storage batteries fabricated under Condition A-2, Condition B-2, and Condition C-2. FIG. 40B shows the charge and discharge cycle performances of the storage batteries fabricated under Condition D-2 and Condition E-2. FIG. 41A shows the charge and discharge cycle performances of the storage batteries fabricated under Condition A-2, Condition F-2, Condition G-2, and Condition H-2. FIG. 41B shows the charge and discharge cycle performances of the storage batteries fabricated under Condition A-2 and Condition I-2. The horizontal axis represents the number of cycles, and the vertical axis represents discharge capacity.

The charge and discharge cycle performances of all the storage batteries fabricated under the conditions using Electrode Size A have inflection points at which capacities greatly decrease during cycles. In the cases of the storage battery in which the mixed layer of CMC-Na and SBR was formed over the surface of the tab region, the number of cycles until when an inflection point is observed was able to be increased.

Also in the case of the storage battery in which both surfaces of the current collector were provided with the negative electrode active material layers, the number of cycles until when an inflection point is observed was able to be increased. These results imply that a reaction between the current collector and the electrolytic solution can be inhibited by providing the active material layers for both surfaces of the current collector and/or providing the mixed layer of CMC-Na and SBR over the exposed region of the current collector.

The charge and discharge cycle performances of all the storage batteries using Electrode Size B and Electrode Size C have no inflection point at which the capacity sharply decreases and thus are favorable. Furthermore, decreases in the capacities of the storage batteries using Electrode Size B and Electrode Size C with respect to the number of cycles, that is, the slopes of the curves, are smaller than decreases in the capacities of the storage batteries using Electrode Size A in cycles before an inflection point is observed.

The above results suggest that some side effect is likely to occur at a region of a negative electrode or a negative electrode active material layer that does not overlap with a positive electrode or a positive electrode active material layer. This side effect is believed to be a significant cause of a decrease in the capacity of a power storage device. For example, the area of a region of a negative electrode or a negative electrode active material layer that does not overlap with a positive electrode is preferably reduced, in which case a decrease in the capacity of a power storage device can be reduced.

The initial irreversible capacity of the storage battery using Electrode Size D was lower than the initial irreversible capacities of the storage batteries using Electrode Size C. The initial irreversible capacities of the storage batteries using Electrode Size B were much lower. Thus, the area of a region of a negative electrode or a negative electrode active material layer that does not overlap with a positive electrode or a positive electrode active material layer is preferably as small as possible. The distance between end portions of the positive electrode and the negative electrode is, for example, preferably 3 mm or less, more preferably 0.5 mm or less, still more preferably 0.1 mm or less. The distance between end portions of the positive electrode active material layer and the negative electrode active material layer is, for example, preferably 3 mm or less, more preferably 0.5 mm or less, still more preferably 0.1 mm or less.

EXAMPLE 2

In this example, the oxidation potentials and reduction potentials of ionic liquids were measured using linear sweep voltammetry. As the ionic liquids, an ionic liquid containing a quaternary ammonium cation and an ionic liquid containing a five-membered heteroaromatic ring were used.

As the ionic liquid containing a quaternary ammonium cation, 1-methyl-1-propylpyrrolidinium bis(fluorosulfonyl)amide (abbreviation: P13-FSA) represented by Structural Formula (G6) was used. As the ionic liquids each containing a cation having a five-membered heteroaromatic ring, the following three kinds of ionic liquids were used: 1-ethyl-3-methylimidazolium bis(fluorosulfonyl)amide (abbreviation: EMI-FSA) represented by Structural Formula (G7); 1-hexyl-3-methylimidazolium bis(fluorosulfonyl)amide (abbreviation: HMI-FSA) represented by Structural Formula (G8); and 1-methyl-3-(2-propoxyethyl)imidazolium bis(fluorosulfonyl)amide (abbreviation: poEMI-FSA) represented by Structural Formula (G9).

[Chemical Formula 18]

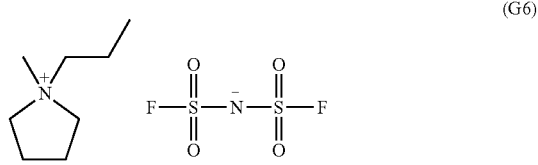

(G6)

-continued

[Chemical Formula 19]

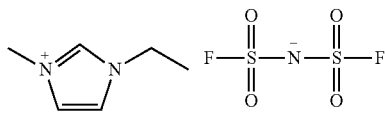
(G7)

[Chemical Formula 20]

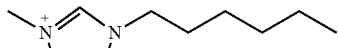
(G8)

[Chemical Formula 21]

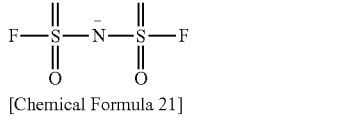
(G9)

First, ionic liquids were prepared. As EMI-FSA, HMI-FSA, and P13-FSA, those produced by KANTO CHEMICAL CO., INC. were used.

Synthesis of
1-methyl-3-(2-propoxyethyl)imidazolium chloride

Into a 100-mL three-neck flask were put 8.27 g (101 mmol) of 1-methylimidazole, 13.4 g (109 mmol) of 2-chloroethylpropyl ether, and 5 mL of acetonitrile. This solution was stirred at 80° C. in a nitrogen stream for 6 hours and at 100° C. for 8 hours. After the stirring, ethyl acetate was added to the solution and the obtained solution was further stirred. Then, the supernatant fluid was removed and washing was performed. To the obtained liquid were added 100 mL of acetonitrile and 5.27 g of activated carbon, and the solution was stirred for 20 hours. The mixture was subjected to suction filtration through Celite (produced by Wako Pure Chemical Industries, Ltd., Catalog No. 537-02305), and the obtained filtrate was concentrated to give a solution. Water was added to the obtained solution, and an aqueous layer was washed with ethyl acetate. This aqueous layer was concentrated and dried, so that 17.0 g of the target yellow liquid was obtained with a yield of 82%.

[Chemical Formula 22]

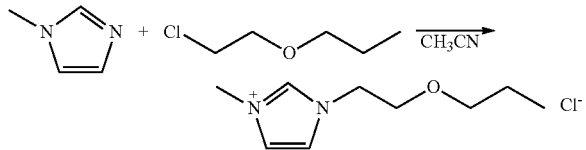

<Synthesis of poEMI-FSA

Into a 100-mL recovery flask were put 17.0 g (83.1 mmol) of 1-methyl-3-(2-propoxyethyl)imidazolium chloride, 20.1 g (91.7 mmol) of potassium bis(fluorosulfonyl)amide, and 20 mL of water. The resulting solution was stirred for 20 hours at room temperature. After the stirring, water was added to the obtained mixture, and an aqueous layer of this mixture was subjected to extraction with dichloromethane. The extracted solution and an organic layer were washed with water, and then, the organic layer was dried with magnesium sulfate. The mixture was gravity filtered, and the obtained filtrate was concentrated to give a liquid. This liquid was dried, so that the 26.2 g of the target yellow liquid was obtained with a yield of 90%.

[Chemical Formula 23]

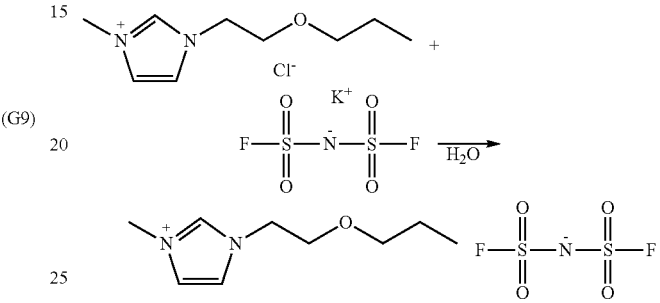

The compound obtained by synthesis through the above steps was identified as poEMI-FSA, which was the target compound, by nuclear magnetic resonance (NMR).

The $^1$H NMR data of the obtained compound are shown below.

$^1$H NMR (1,1,2,2-tetrachloroethane-d$_2$, 300 MHz): δ=0.90 (t, J=7.5 Hz, 3H), 1.53-1.65 (m, 2H), 3.44 (t, J=6.9 Hz, 2H), 3.74-3.77 (m, 2H), 3.96 (s, 3H), 4.33-4.36 (m, 2H), 7.22-7.23 (m, 1H), 7.40-7.41 (m, 1H), 8.58 (s, 1H).

The results indicate that poEMI-FSA was synthesized.

Next, measurement by linear sweep voltammetry was performed. The measurement was performed using the electrochemical measurement system HZ-5000 produced by HOKUTO DENKO CORPORATION in a glove box in an argon atmosphere. A glassy carbon electrode was used as a working electrode and a platinum wire was used as a counter electrode. A silver wire soaked in a solution in which silver trifluoromethanesulfonate was dissolved in 1-ethyl-3-methylimidazolium bis(trifluoromethanesulfonyl)amide at a concentration of 0.1 mol/L was used as a reference electrode. The reduction potentials of samples were corrected based on the redox potential of lithium (Li/Li$^+$).

In linear sweep voltammetry, an oxidation potential is a potential at which a current density of 1 mA/cm$^2$ was detected while the potential was scanned. A reduction potential is a potential at which a current density of −1 mA/cm$^2$ was detected while the potential was scanned.

FIGS. 42A to 42C and FIGS. 43A and 43B are linear sweep voltammograms.

It is found from FIGS. 42A to 42C and FIGS. 43A and 43B that the reduction potentials of EMI-FSA, HMI-FSA, and poEMI-FSA each containing a cation having an aromatic ring are higher than 0.5 V (vs. Li/Li$^+$). When one embodiment of the present invention and any of these ionic liquids each containing a cation having an aromatic ring are used, a decomposition reaction of the ionic liquid can presumably be inhibited, increasing the capacity of a power storage device. Similarly, when one embodiment of the present invention and P13-FSA having a lower reduction potential are used in an environment where an electrolytic solution is more easily decomposed, for example, at a high temperature, a decomposition reaction of the ionic liquid can presumably be inhibited, increasing the capacity of a power storage device.

EXPLANATION OF REFERENCE

115: sealing layer, 118: bonding portion, 119: inlet, 131: distance, 132: distance, 133a: distance, 133b: distance, 133c: distance, 134a: distance, 134b: distance, 141: distance, 142: distance, 143: distance, 144: distance, 145: distance, 146: distance, 147: distance, 148: distance, 149: distance, 150: distance, 151: distance, 152: distance, 261: region, 262: region, 271: layer, 281: tab region, 281a: tab region, 282: tab region, 282a: tab region, 283a: region, 284a: region, 285: region, 291: region, 300: storage battery, 301: positive electrode can, 302: negative electrode can, 303: basket, 304: positive electrode, 305: positive electrode current collector, 306: positive electrode active material layer, 307: negative electrode, 308: negative electrode current collector, 309: negative electrode active material layer, 310: separator, 500: power storage device, 501: positive electrode current collector, 502: positive electrode active material layer, 502a: positive electrode active material layer, 502b: positive electrode active material layer, 503: positive electrode, 503a: positive electrode, 503c: positive electrode, 504: negative electrode current collector, 505: negative electrode active material layer, 505a: negative electrode active material layer, 505b: negative electrode active material layer, 506: negative electrode, 506a: negative electrode, 506b: negative electrode, 506c: negative electrode, 507: separator, 508: electrolytic solution, 509: exterior body, 510: positive electrode lead electrode, 511: negative electrode lead electrode, 512: bonding portion, 513: curved portion, 514: bonding portion, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 610: basket, 611: PTC element, 612: safety valve mechanism, 900: circuit board, 910: label, 911: terminal, 912: circuit, 913: storage battery, 914: antenna, 915: antenna, 916: layer, 917: layer, 918: antenna, 919: terminal, 920: display device, 921: sensor, 922: terminal, 951: terminal, 952: terminal, 981: film, 982: film, 990: storage battery, 991: exterior body, 994: negative electrode, 995: positive electrode, 996: separator, 997: lead electrode, 998: lead electrode, 1122: charger, 1123: load, 1700: curved surface, 1701: plane, 1702: curve, 1703: radius of curvature, 1704: center of curvature, 1800: center of curvature, 1801: film, 1802: radius of curvature, 1803: film, 1804: radius of curvature, 7100: portable display device, 7101: housing, 7102: display portion, 7103: operation button, 7104: power storage device, 7200: portable information terminal, 7201: housing, 7202: display portion, 7203: band, 7204: buckle, 7205: operation button, 7206: input output terminal, 7207: icon, 7300: display device, 7304: display portion, 7400: mobile phone, 7401: housing, 7402: display portion, 7403: operation button, 7404: external connection port, 7405: speaker, 7406: microphone, 7407: power storage device, 7408: lead electrode, 7409: current collector, 8000: display device, 8001: housing, 8002: display portion, 8003: speaker portion, 8004: power storage device, 8021: charging apparatus, 8022: cable, 8024: power storage device, 8100: lighting device, 8101: housing, 8102: light source, 8103: power storage device, 8104: ceiling, 8105: wall, 8106: floor, 8107: window, 8200: indoor unit, 8201: housing, 8202: air outlet, 8203: power storage device, 8204: outdoor unit, 8300: electric refrigerator-freezer, 8301: housing, 8302: door for refrigerator, 8303: door for freezer, 8304: power storage device, 8400: automobile, 8401: headlight, 8500: automobile, 9600: tablet terminal, 9625: switch, 9626: switch, 9627: power switch, 9628: operation switch, 9629: fastener, 9630: housing, 9630a: housing, 9630b: housing, 9631: display portion, 9631a: display portion, 9631b: display portion, 9632a: region, 9632b: region, 9633: solar cell, 9634: charge and discharge control circuit, 9635: power storage unit, 9636: DC-DC converter, 9637: converter, 9638: operation key, 9639: button, and 9640: movable portion This application is based on Japanese Patent Application serial no. 2014-073556 filed with Japan Patent Office on Mar. 31, 2014, the entire contents of which are hereby incorporated by reference.

The invention claimed is:

1. A power storage device comprising:
a positive electrode comprising a first current collector with a first active material layer;
a separator;
a negative electrode comprising a second current collector with a second active material layer, wherein the second active material layer facing the first active material layer with the separator therebetween; and
an electrolytic solution at least between the positive electrode and the negative electrode,
wherein the negative electrode includes a first region in which the second active material layer is provided in contact with at least one surface of the second current collector and a second region in which a layer comprising a rubber material and a water-soluble polymer is provided in contact with at least one surface of the second current collector,
wherein the layer is thinner and has a higher resistance than the second active material layer, and
wherein the layer is not in contact with an upper surface of the second active material layer.

2. The power storage device according to claim 1, wherein the electrolytic solution comprises an alkali metal solute and an ionic liquid.

3. The power storage device according to claim 2, wherein the ionic liquid contains a cation having a heteroaromatic ring.

4. The power storage device according to claim 2, wherein the ionic liquid contains an imidazolium cation.

5. The power storage device according to claim 2, wherein the ionic liquid comprises an organic cation and an anion.

6. The power storage device according to claim 1, wherein the second active material layer comprises a carbon-based material.

7. The power storage device according to claim 1, wherein at least part of an end portion of the second active material layer is located inside a region between opposite end portions of the first active material layer.

8. The power storage device according to claim 1, wherein the second active material layer has a smaller width than the first active material layer.

9. The power storage device according to claim 1, wherein a distance between an end portion of the positive electrode and an end portion of the negative electrode is smaller than or equal to 0.5 mm.

10. The power storage device according to claim 1, wherein an area of the positive electrode is more than or equal to 98% of an area of the negative electrode.

11. A power storage device comprising:
- a positive electrode comprising a first current collector and a first active material layer over the first current collector;
- a separator;
- a negative electrode comprising a second current collector and a second active material layer over the second current collector, the second active material layer facing the first active material layer with the separator therebetween; and
- an electrolytic solution comprising an alkali metal salt and an ionic liquid, the electrolytic solution in contact with the positive electrode and the negative electrode,
- wherein at least part of the first active material layer overlaps with the second active material layer,
- wherein at least part of an end portion of the second active material layer is located inside a region between opposite end portions of the first active material layer,
- wherein the second active material layer comprises an active material comprising a carbon-based material,
- wherein the negative electrode includes a first region in which the second active material layer is provided in contact with at least one surface of the second current collector and a second region in which a layer is provided in contact with at least one surface of the second current collector,
- wherein the layer is thinner and has a higher resistance than the second active material layer,
- wherein the layer is not in contact with an upper surface of the second active material layer, and
- wherein the layer comprises a rubber material and a water-soluble polymer.

12. The power storage device according to claim 11, wherein the second active material layer has a smaller width than the first active material layer.

13. The power storage device according to claim 11, wherein the ionic liquid contains a cation having a heteroaromatic ring.

14. The power storage device according to claim 11, wherein the ionic liquid contains an imidazolium cation.

15. The power storage device according to claim 11, wherein the ionic liquid comprises an organic cation and an anion.

16. An electronic device comprising the power storage device according to claim 11.

* * * * *